Oct. 3, 1950 I. MOLNAR 2,524,131

AUTOMATIC TELEPHONE SYSTEM INCORPORATING MIXED SERVICE CONNECTORS

Filed Oct. 18, 1946 6 Sheets-Sheet 1

Inventor
Imre Molnar

By Davis, Lindsey, Smith & Shonts

Attorneys

Inventor
Imre Molnar
By
Davis, Lindsey, Smith & Shonts
Attorneys

Oct. 3, 1950 I. MOLNAR 2,524,131

AUTOMATIC TELEPHONE SYSTEM INCORPORATING MIXED SERVICE CONNECTORS

Filed Oct. 18, 1946 6 Sheets-Sheet 3

Inventor
Imre Molnar
By
Davis, Lindsey, Smith & Shonts
Attorneys

Oct. 3, 1950

I. MOLNAR 2,524,131

AUTOMATIC TELEPHONE SYSTEM INCORPORATING MIXED SERVICE CONNECTORS

Filed Oct. 18, 1946

6 Sheets-Sheet 4

INVENTOR.
Imre Molnar

BY

Davis, Lindsey, Smith & Shonts

Attorneys

Inventor
Imre Molnar
By
Davis, Lindsey, Smith & Shonts
Attorneys

Oct. 3, 1950  I. MOLNAR  2,524,131

AUTOMATIC TELEPHONE SYSTEM INCORPORATING MIXED SERVICE CONNECTORS

Filed Oct. 18, 1946  6 Sheets-Sheet 6

Inventor
Imre Molnar
By
Davis, Lindsey, Smith & Shonts
Attorneys

Patented Oct. 3, 1950 2,524,131

UNITED STATES PATENT OFFICE 2,524,131

AUTOMATIC TELEPHONE SYSTEM INCORPORATING MIXED SERVICE CONNECTORS

Imre Molnar, Chicago, Ill., assignor to Automatic Electric Laboratories, Inc., Chicago, Ill., a corporation of Delaware Application October 18, 1946, Serial No. 704,170

24 Claims. (Cl. 179—27)

The present invention relates in general to automatic telephone systems and has for one of its objects the provision of new and improved automatic switching apparatus of the type known as mixed service connectors. As to certain features, this invention may be considered as an improvement over the connector disclosed in the Lomax application Serial No. 702,846, filed October 11, 1946, now Patent No. 2,513,426, granted July 4, 1950.

It is another object of the invention to provide in a system of the character described, an improved mixed service connector arranged to indicate the busy condition of a called line either at the end of the last digit or at the end of the penultimate digit of the directory number, depending upon the character or class of station originating the connection.

One of the features of the invention relates to a novel arrangement whereby certain tone signals, indicative of corresponding conditions encountered by the connector, are transmitted over a circuit including a winding of an answer relay.

Another feature of the invention relates to an arrangement whereby audible tone signals are transmitted to calling subscribers to indicate certain conditions encountered by the connector during the setting up of a connection and whereby audible tone and visual flashing signals are transmitted to a calling operator to indicate such conditions.

A further feature of the invention relates to an arrangement whereby a busy relay is utilized to transmit a busy tone signal in the event a busy condition is encountered during the setting up of a connection and is also utilized to determine the conductor of a called line over which the signaling current is to be transmitted.

The invention both as to its organization and method of operation, together with other objects and features thereof, will best be understood by reference to the specification taken in connection with the accompanying drawings, in which Figs. 1 to 6, inclusive, when arranged from left to right in consecutive order with the interconnecting lines in alignment, illustrate an automatic telephone system having incorporated therein certain of the features of the invention briefly referred to above.

Figure 1:
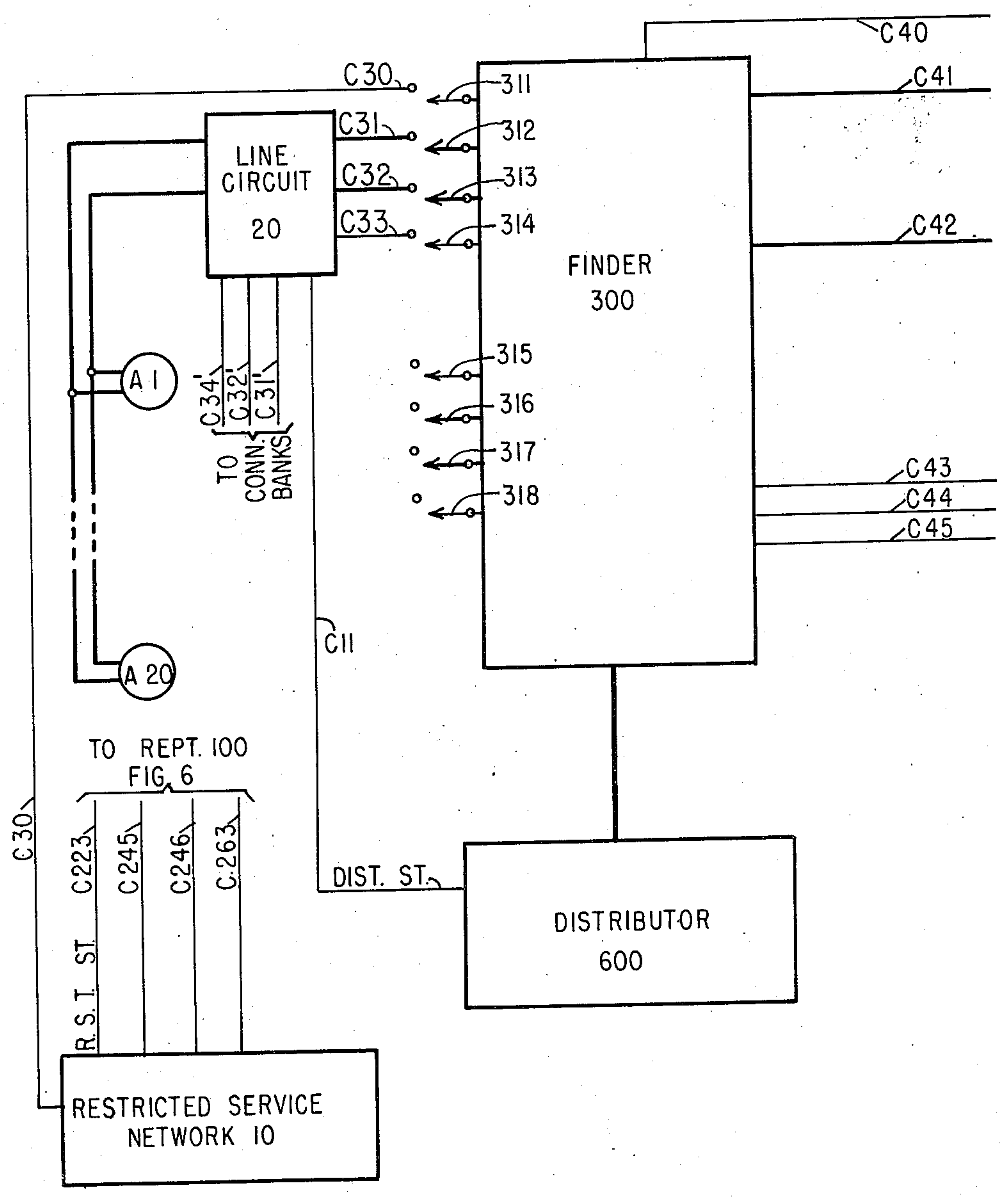
Figure 2:
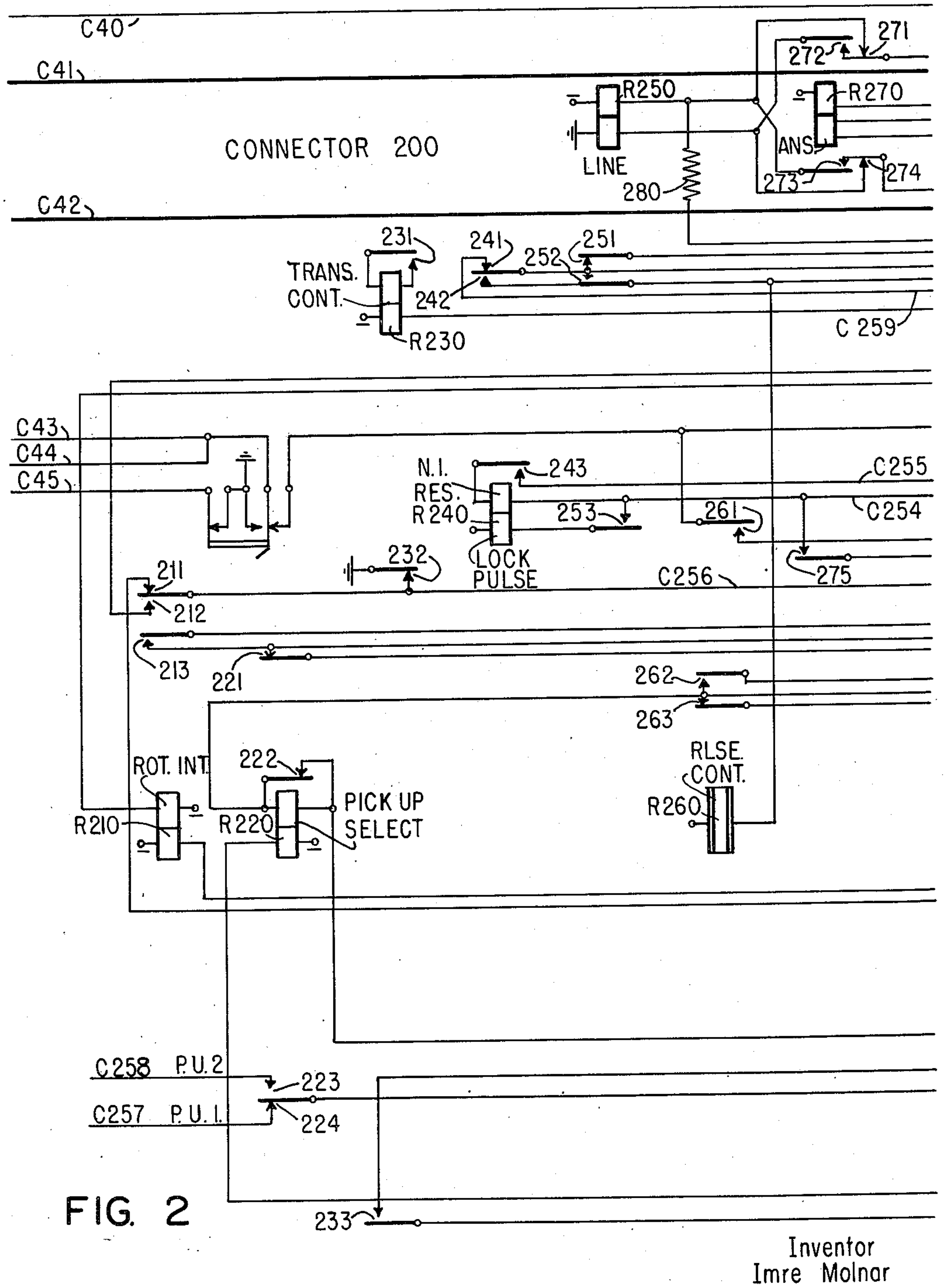
Figure 3:
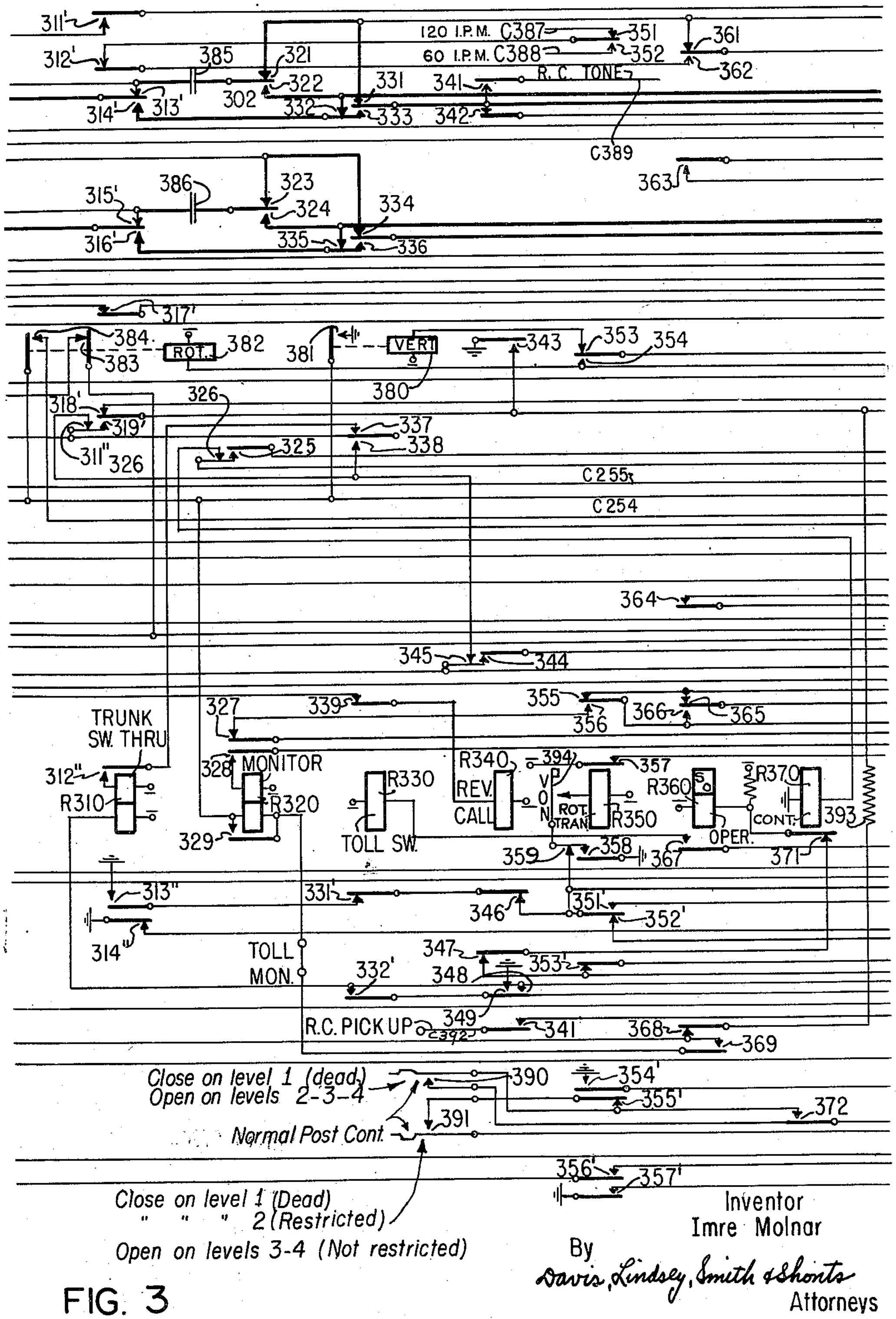
Figure 4:
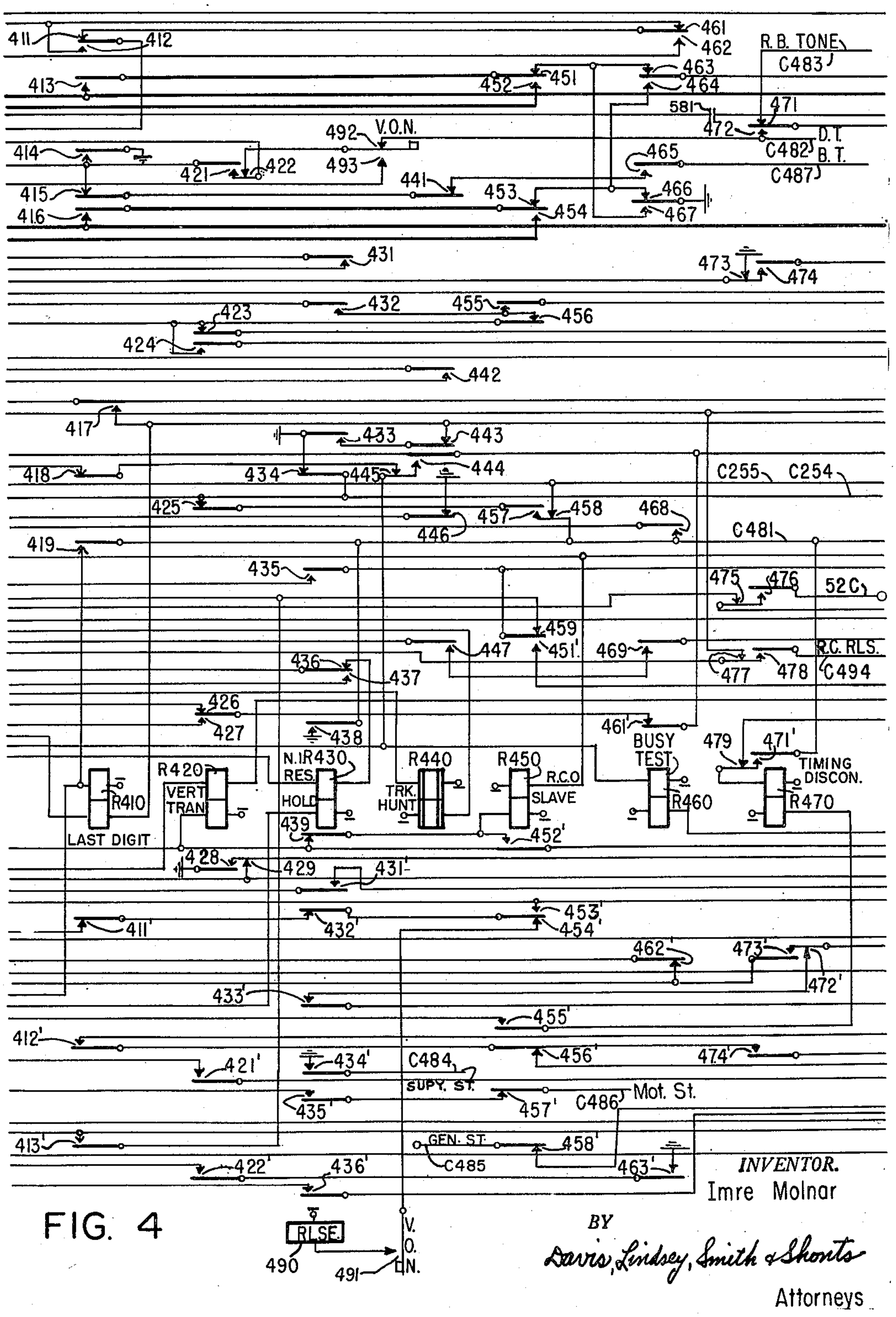
Figure 5:
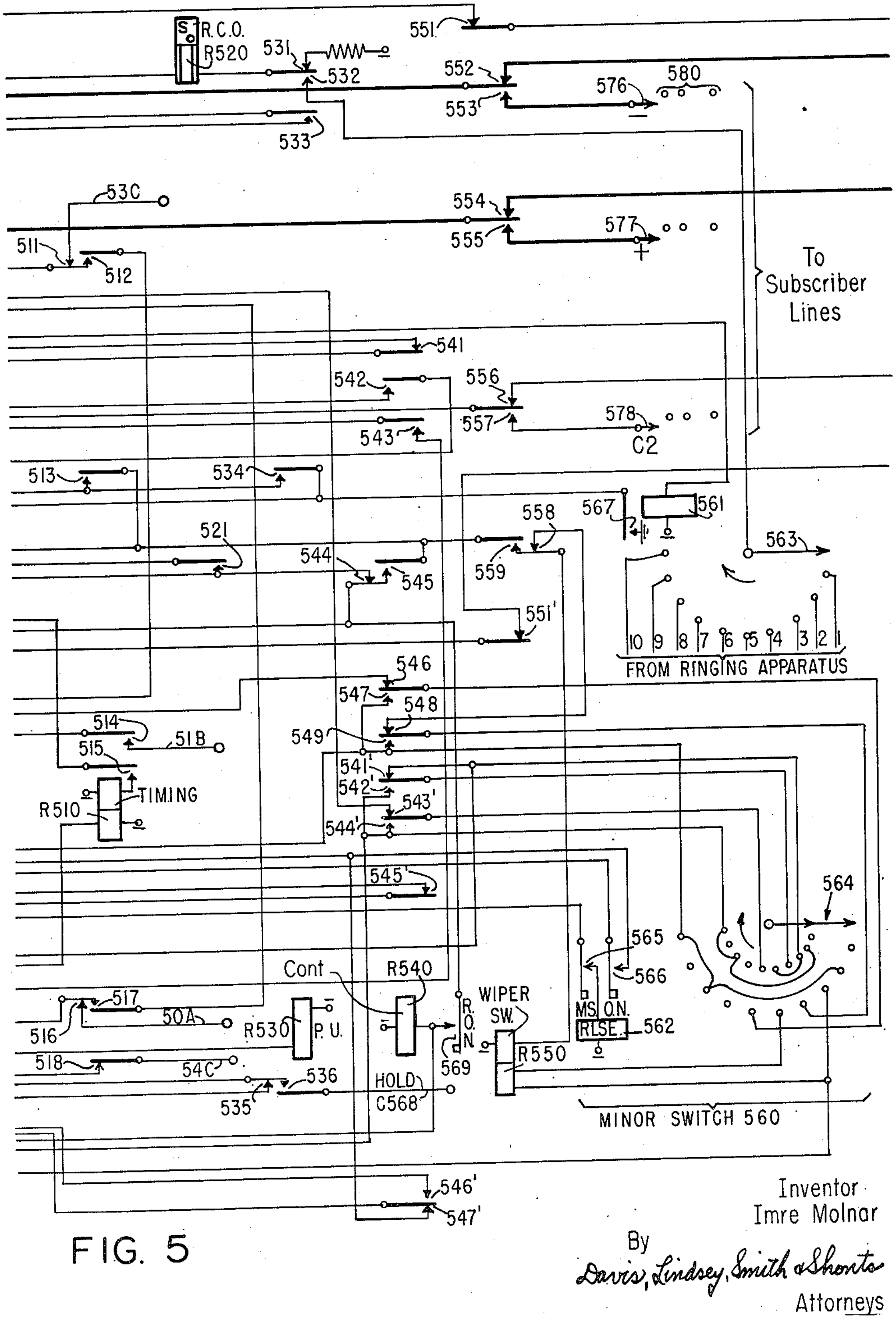

Referring now more particularly to the drawings, Fig. 1 shows a party line terminating in a line circuit 20 which, in turn, is accessible to any one of a plurality of two hundred line finders, such as the line finder 300. The illustrated party line is common to twenty subscriber substations A1 to A20, inclusive, which are arranged for code ringing. It should be understood, however, that the system may, on the other hand, be provided with ten party lines arranged for either bridged or divided code ringing or provided with ten party lines arranged for either bridged ringing or harmonic ringing. In order to assign idle finders, such as the finder 300, to the use of calling lines, a distributor 600 is provided, which is controlled in response to a call on any one of the calling lines to control the assigned finder to connect with the calling line. The finders, such as the finder 300, are of the well known Strowger type employing a Strowger switching mechanism, the contact field of which is divided into ten levels of bank contacts, each of which contains ten rows of contacts, whereby each of two wiper sets, comprising the wipers 311 to 314, inclusive, and 315 to 318, inclusive, has access to one hundred individual bank contacts. With this arrangement one hundred subscriber lines or trunks may be terminated in the set of bank contacts accessible to the first wiper set comprising the wipers 311 to 314, inclusive, and another hundred subscriber lines or trunks may be terminated in the second group of bank contacts accessible to the wipers 315 to 318, inclusive. A restricted service network 10 has also been provided, whereby certain tandem office subscribers, paying a lower service charge for their telephone service, may be restricted from extending calls to subscriber lines terminating in certain of the outlying suboffices served by the tandem office. The detailed circuits and the description of operation of the line circuit 20, the finder 300, the distributor 600 and the restricted service network 10, are fully covered in the copending Lomax application Serial No. 702,846, filed October 11, 1946. Accordingly, for the sake of brevity these circuits are only schematically illustrated herein.

The connector 200 illustrated in Figs. 2 to 5, inclusive, has incorporated therein the features of the invention briefly referred to above and is one of a plurality of such connectors which may be controlled by a calling subscriber to extend connections to a local subscriber, to any one of a plurality of automatic suboffices, or to the toll operator at a central office. More specifically, the connector 200 is directly connected by way of the conductors C40 to C45, inclusive, to the finder 300, thereby to form a finder-connector link. Accordingly, it will be understood that a like number of finders and connectors are provided in order to form sufficient finder-connector links to handle the telephone traffic through the illustrated telephone exchange. The connector 200 is of the Strowger type and is provided with two sets of wipers comprising, respectively, the wipers 571 to 575, inclusive, and 576 to 578, inclusive. Each wiper has access to a contact field arranged in ten vertical levels and wherein each level includes ten radially disposed contacts. Depending upon the energized or deenergized condition of the wiper switching relay R550, the respective first or second wiper set will be utilized in extending a connection through the connector 200. The wiper sets are carried by a wiper shaft (not shown) which is movable in a vertical direction under control of a vertical magnet 380, is movable in a rotary direction under control of a rotary magnet 382, and is automatically restored to its normal starting or resting position under control of a release magnet 490. The connector 200 also comprises a minor switch 560 which includes the wipers 563 and 564 and associated bank contacts, the minor switch stepping magnet 561 for driving the wipers one step in a clockwise direction in response to each energization thereof, and a minor switch release magnet 562 which, upon energization, causes the wipers 563 and 564 to be returned in a counterclockwise direction to their normal starting positions.

The first four lowermost levels of the bank contacts in the first hundred group 570 accessible to the wipers 570 to 575, inclusive, of the connector 200 are utilized to terminate four different groups of interoffice trunks inter-connecting the instant office with the outlying automatic suboffices and the central office. The tenth or uppermost level of the bank contacts in the first hundred group 570 terminates the P. B. X or private branch exchange trunks. The fifth to the ninth levels of bank contacts in the first hundred group 570 and the ten levels of bank contacts in the second hundred group 580 are utilized to terminate the various subscriber lines. Finally, in order to make full use of the bank contacts in the four lowermost levels in the first hundred group 570, which do not terminate trunk lines, the connector is arranged so that subscriber lines may also be terminated on such contacts.

Figure 6:
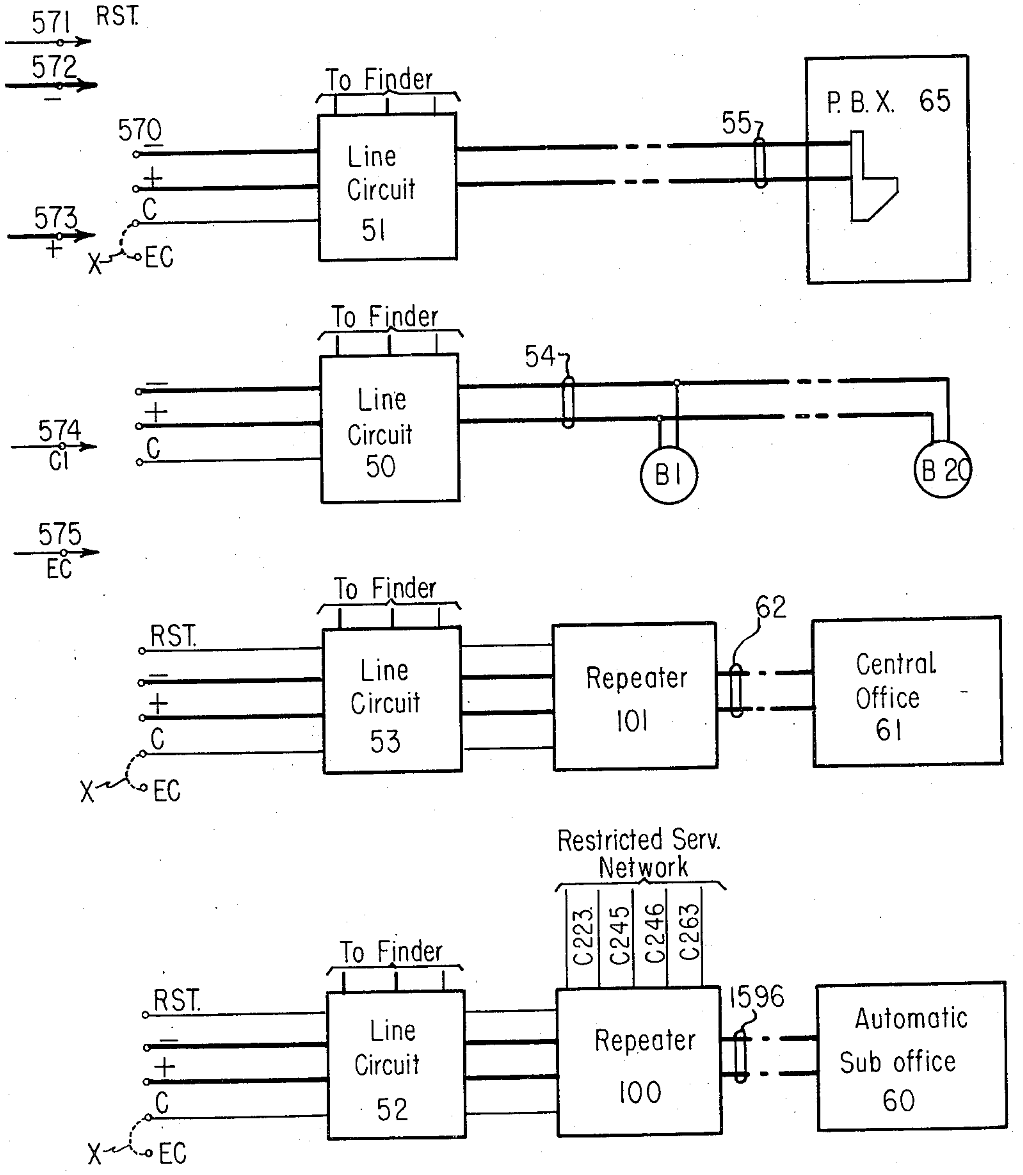

Fig. 6 illustrates one of a plurality of subscriber lines accessible to the connector 200 by way of the line circuit 50 and the party line 54. This party line is common to twenty subscriber substations B1 to B20, inclusive, which may be signaled by the connector 200 in accordance with a predetermined ringing code. The line circuit 50 is also provided with three conductors which are terminated in the bank contacts of the finders, such as the finder 300, so that the substation B1 to B20, inclusive, may initiate calls in the same manner as the subscribers at substations A1 to A20. There is also disclosed in Fig. 6 one of a plurality of P. B. X trunks extending to the P. B. X switchboard 65. The illustrated P. B. X trunk includes the line circuit 51 and the trunk 55 over which connections may be extended to the P. B. X operator by way of the connector 200 and over which calls may be extended by the P. B. X operator to a subscriber in the tandem exchange. Furthermore, Fig. 6 illustrates one of a plurality of trunk lines extending to an automatic suboffice 60. The illustrated trunk line includes the line circuit 52, the repeater 100 and the trunk line 1596 which is accessible to the calling subscribers in the tandem exchange not restricted from making calls to the suboffice 60. The repeater 100 and the trunk line 1596 have been illustrated and described in detail in the above-mentioned copending Lomax application, and reference is made thereto for a complete understanding of the operation thereof. The subscribers in the automatic suboffice 60 may extend connections either to the tandem exchange subscribers or to the toll operator at the central office 61 via the trunk line 1596, the repeater 100, the line circuit 52 and the tandem exchange finder-connector links, in the manner described in the above-mentioned Lomax application. The operation of the connector 200, however, is described in detail herein. Finally, there is illustrated in Fig. 6 one of a plurality of toll trunks interconnecting the tandem exchange and the central office 61. The illustrated toll trunk 62 includes the line circuit 53, the repeater 101, and the central office 61 over which connections may be established under control of the connector 200. It should be understood that while only one group of trunks has been illustrated extending to the automatic suboffice 60, additional groups of trunk lines may be provided, which are similar to those mentioned, extending to other suboffices. More specifically, the group of trunk lines extending to the automatic suboffice 60 may be accessible by way of the third level in the first hundred group 570 of bank contacts in the connector 200 and two additional groups of trunks may be accessible respectively by way of the first and second levels of the first hundred group 570 of bank contacts in the connector 200; and, finally, the group of toll trunks similar to the toll trunk 62 extending to the central office 61 may be accessible by way of the fourth level of the first hundred group 570 of bank contacts in the connector 200.

DIRECTORY NUMBERING ARRANGEMENT

In order to facilitate understanding of the following detailed description of operation of the system, it is necessary to consider first the directory numbering scheme which is utilized in designating the various lines terminated in the bank contacts of the various connectors. In this regard it will be arbitrarily assumed that each of the interoffice trunk groups, the toll trunk group and the P. B. X trunk group includes ten trunks. It should be understood, however, that if the interoffice trunk traffic or the toll trunk traffic is insufficient to utilize the full complement of ten trunks in the groups, the number of trunks therein may be reduced accordingly. If the interoffice trunk or toll trunk traffic is insufficient to require the full complement of ten trunks the vacant contacts included in the first four levels in the first hundred group 570 of bank contacts in the connector 200 may be utilized to terminate subscriber lines. Based on the foregoing assumption, the following directory numbers may be assigned to the subscriber lines of the different types and to the various trunk groups, but it should be noted that the indefinite character "X" may be any number from "1" to "9" and "0."

Single digit 7—
: Interoffice trunks terminated in the first level of the first hundred group 570 bank contacts of the connectors.

Single digit 8—
: Interoffice trunks terminated in the second level of the first hundred group 570 bank contacts of the connectors.

Single digit 9—
Interoffice trunks terminated in the third level of the first hundred group 570 bank contacts of the connectors.

Single digit 0—
Toll trunks terminated in the fourth level of the first hundred group 570 bank contacts of the connectors.

2011—
Private branch exchange trunks terminated in the tenth level of the first hundred group 570 bank contacts of the connectors and arranged for selection through an automatic trunk hunting operation. For night service the individual P. B. X trunks may be selected by substituting the digit "3" for the first digit "2" and then dialing the remaining three digits in accordance with the individual trunk numbers.

251X to 259X and 250X, 351X to 359X and 350X—
Ten subscriber lines of the twenty party type terminated in the fifth level of the first hundred group 570 bank contacts of the connectors.

261X to 269X and 260X, 361X to 369X and 360X—
Ten subscriber lines of the twenty party type terminated in the sixth level of the first hundred group 570 bank contacts of the connectors.

271X to 279X and 270X, 371X to 379X and 370X—
Ten subscriber lines of the twenty party type terminated in the seventh level of the first hundred group 570 bank contacts of the connectors.

281X to 289X and 280X, 381X to 389X and 380X—
Ten subscriber lines of the twenty party type terminated in the eighth level of the first hundred group 570 bank contacts of the connectors.

291X to 299X and 290X, 391X to 399X and 390X—
Ten subscriber lines of the twenty party type terminated in the ninth level of the first hundred group 570 bank contacts of the connectors.

411X to 419X and 410X, 511X to 519X and 510X—
Ten subscriber lines of the twenty party type terminated in the first level of the second hundred group 580 bank contacts of the connectors.

421X to 429X and 420X, 521X to 529X and 520X—
Ten subscriber lines of the twenty party type terminated in the second level of the second hundred group 580 bank contacts of the connectors.

431X to 439X and 430X, 531X to 539X and 530X—
Ten subscriber lines of the twenty party type terminated in the third level of the second hundred group 580 bank contacts of the connectors.

441X to 449X and 440X, 541X to 549X and 540X—
Ten subscriber lines of the twenty party type terminated in the fourth level of the second hundred group 580 bank contacts of the connectors.

451X to 459X and 450X, 551X to 559X and 550X—
Ten subscriber lines of the twenty party type terminated in the fifth level of the second hundred group 580 bank contacts of the connectors.

461X to 469X and 460X, 561X to 569X and 560X—
Ten subscriber lines of the twenty party type terminated in the sixth level of the second hundred group 580 bank contacts of the connectors.

471X to 479X and 470X, 571X to 579X and 570X—
Ten subscriber lines of the twenty party type terminated in the seventh level of the second hundred group 580 bank contacts of the connectors.

481X to 489X and 480X, 581X to 589X and 580X—
Ten subscriber lines of the twenty party type terminated in the eighth level of the second hundred group 580 bank contacts of the connectors.

491X to 499X and 490X, 591X to 599X and 590X—
Ten subscriber lines of the twenty party type terminated in the ninth level of the second hundred group 580 bank contacts of the connectors.

401X to 409X and 400X, 501X to 509X and 500X—
Ten subscriber lines of the twenty party type terminated in the tenth level of the second hundred group 580 bank contacts of the connectors.

From the above outline of the directory numbering scheme it will be noted that the directory numbers differing only in the first digit thereof may be utilized to designate the same subscriber line. For example, the first digit "2" or "3" determines that the particular called subscriber party line terminates in the first hundred group 570 bank contacts of the connectors and also determines whether one of the first group of ten ringing codes or one of the second group of ten ringing codes is to be ultimately selected to signal a particular called subscriber on the selected party line. Furthermore, the first digit "4" or "5" determines that the particular called subscriber partly line terminates in the second hundred group 580 bank contacts of the connectors and also determines whether one of the first group of ten ringing codes or one of the second group of ten ringing codes is to be ultimately selected to signal a particular called subscriber on the selected party line.

The second and third digits of any directory number dialed into one of the connectors effect, respectively, the vertical and the rotary movement of the associated Strowger switch wipers. The fourth digit is used to effect the code selection and the side of the line over which ringing code is to be transmitted during the ringing operation. More specifically, odd numbered fourth digits, when dialed into a connector following a first digit "2" or "4," serve to effect the selection of the corresponding codes in the first group of ten codes and to select the negative side of the selected line for ringing current transmission. Even numbered fourth digits, when dialed into a connector following a first digit "2" or "4," serve to effect the selection of the corresponding codes in the first group of ten codes and to select the positive side of the selected line for ringing current transmission. Odd numbered fourth digits when dialed into a connector following the first digit "3" or "5" serve to effect the selection of the corresponding codes in the second group of ten codes and to select the negative side of the selected line for ringing current transmission. Finally, even numbered fourth digits when dialed into a connector following a first digit "3" or "5" serve to effect the selection of the corresponding codes in the second group of ten codes and to select the positive side of the selected line for ringing current transmission.

LOCAL CALLS

In considering the operation of the system to set up a connection it will be assumed that the subscriber at substation A1 desires to extend a connection to a called subscriber at substation B1. When the handset provided at the calling substation A1 is removed from its supporting hook or cradle, a circuit is completed for controlling the line circuit 20, and the latter circuit initiates the operation of the distributor 600 over the distributor start conductor C11. The distributor 600, in turn, having preselected an idle finder, such as the finder 300, initiates the operation of the finder to find and select the contacts in its contact bank terminating the conductors of the calling line. More specifically, as soon as the finder is started by the distributor 600, a temporary loop circuit, including the conductors C41 and C42, is completed for energizing the line relay R250 in the connector 200. Also, the finder 300 applies ground potential to the conductor C43, whereupon the connector 200 is controlled in the manner to be described below. If the conductors C30 to C33, inclusive, individual to the calling subscriber line terminate in the bank contacts accessible to the set of wipers comprising the wipers 311 to 314, inclusive, when these wipers engage the said contacts the finder 300 switches through and extends the calling subscriber loop circuit by way of the line circuit 20, the conductors C31 and C32, the wipers 312 and 313, and the conductors C41 and C42 to the windings of the line relay R250 in the connector 200. For a more detailed explanation of the operation of the line circuit 20, the distributor 600 and the finder 300, reference should be made to the above-mentioned copending Lomax application.

Referring now to the connector 200 illustrated in Figs. 2 to 5, inclusive, it will be noted that when the above-mentioned temporary loop circuit is completed by the finder 300 the line relay R250 is energized over a circuit which may be traced from ground by way of the lower winding of relay R250, the contacts 274 and 315′, the temporary loop circuit including the positive conductor C42, the finder 300 and the negative conductor C41, the contacts 313′ and 271, and the upper winding of relay R250, to battery. The relay R250 operates when the above-mentioned circuit is completed and, at its contacts 252, completes an operating circuit for the release control relay R260, which may be traced from ground by way of the contacts 473 and 252, and the winding of the relay R260, to battery. Furthermore, at its contacts 253, the relay R250 also completes a circuit for energizing the lower winding of the lock-pulse relay R240, which may be traced from ground by way of the contacts 434, the conductor C254, the contacts 253, and the lower winding of the relay R240, to battery. Thus when the above-mentioned circuits are completed the relays R260 and R240 immediately operate. When the relay R240 operates, at its contacts 242, it completes a multiple energizing circuit for the release control relay R260 and, at its contacts 243, it prepares a locking circuit for itself which includes its upper non-inductive resistance winding, the contacts 243 and the conductor C255. Finally, at its contacts 241, the relay R240 interrupts a point in the impulsing circuit, including the conductor C259, for subsequently controlling the minor switch stepping magnet 561, in the manner to be described hereinafter.

When the release control relay R260 operates, at its contacts 261, it applies ground potential to the conductor C43 by way of the winding of the control relay R370 in order to maintain a holding ground potential upon the control conductor C43 after the finder 300 switches the calling line through to the connector 200. Furthermore, at its contacts 262, the relay R260 completes an operating circuit for the hold relay R430 which extends from the grounded conductor C43 by way of the contacts 311″, 345, 262 and 222 and the lower winding of the hold relay R430, to battery. Finally, at its contacts 263, the relay R260 interrupts a point in the circuit for controlling the reverting call relay R340. It will be recalled that the finder 300 applies direct ground potential to the conductor C43 when the connector 200 is seized and, consequently, the winding of the control relay R370 is short-circuited at the time the abovementioned circuit is completed for the lower winding of the hold relay R430.

Upon operating, the relay R430, at its contacts 437, completes a locking circuit for itself which is independent of the contacts 262 and which may be traced from the grounded conductor C43 by way of the contacts 311″, 345, 437 and 222 and the lower winding of the relay R430, to battery. Furthermore, the relay R430, at its contacts 431, prepares a circuit including the resistor 280 for pre-energizing the upper winding of the relay R250 each time the latter relay restores to normal; at its contacts 432, it prepares a point in the pulsing circuit including the conductor C259 for subsequently controlling the minor switch stepping magnet 561; at its contacts 433, it prepares a point in the circuit for controlling the operator relay R360 in the event the call has been initiated by the toll operator at the central office; and, at its contacts 434, it removes ground potential from the conductor C254. When ground potential is removed from the conductor C254, the shunt circuit is removed from around the upper non-inductive resistance winding of the lock-pulse relay R240 and the latter relay is maintained in its operated position over a circuit which may be traced from ground by way of the contacts 438 of the operated relay R430, the contacts 458, the conductor C255, the contacts 243, the upper non-inductive resistance winding of R240, the contacts 253 and the lower winding of R240, to battery. The resistance included in the above-mentioned locking circuit for the relay R240 is such that the current flow through the lower winding of the relay is just sufficient to maintain the contacts 242 and 243 in their closed positions and thus enables the relay to quickly restore as soon as the locking circuit is interrupted. Also, at its contacts 436, the relay R430 disconnects the resistance battery potential applied to the conductor C43. This circuit includes the conductor C43, the contacts 311″, 345 and 436, the upper non-inductive resistance winding of the relay R430, the contacts 357 and battery. By way of explanation, it is to be noted that the resistance battery is normally applied to the conductor C43 in order to mark the connector 200 as idle when it is utilized in a system employing battery searching selectors of the type illustrated in Fig. 4 of the above-mentioned Lomax application. Furthermore, at its contacts 439, which contacts are the last to be opened when the relay is operated, the relay R430 interrupts a point in the circuit for controlling the lower winding of the ring cutoff slave relay R450; at its contacts 431′, it prepares a point in the incomplete circuit for controlling the rotary transfer relay R350; at its contacts 432′, it interrupts a point in the incomplete circuit for the Strowger release magnet 490; at its contacts 433', it prepares a point in the timing circuit for the timing relay R510; and, at its contacts 434', it applies ground potential to the supervisory start conductor C484. The latter circuit is completed in order to initiate the operation of the supervisory apparatus (not shown). Also, at its contacts 435', the relay R430 prepares a point in a circuit for applying ground potential to the motor start conductor C486, whereby a motor driven timing interrupter common to the switching apparatus provided in the exchange is started. The latter apparatus is not shown and it should be understood that it may be of the type illustrated and described in the Lomax and Bakker Patent No. 2,385,715, granted September 25, 1945. Finally, at its contacts 436', the relay R430 prepares a point in a circuit, traced hereinafter, for applying ground potential to the generator start conductor C485, whereby the ringing apparatus (not shown) is started in order to generate the answer ringing current for signaling the desired called substations.

When the finder 300 finds the calling line and switches through in the manner mentioned above, the calling subscriber loop circuit, including the conductors of the calling line, the line circuit 20, the conductors C31 and C32 and the wipers 312 and 313, is extended through the finder 300 to the conductors C41 and C42 extending to the connector 200. Furthermore, the direct ground potential applied to the control conductor C43 by the finder 300 is removed therefrom and the conductor C43 is extended by way of the wiper 314 and the conductor C33 to the line circuit 20. When the last-mentioned operation occurs the previously mentioned circuit, including the winding of the control relay R370 of the connector 200, is extended to the finder 300 and to the line circuit 20, thereby to maintain the finder 300 in its operated position and to maintain the cutoff relay (not shown) in the line circuit 20 in its operated position. It should be understood that the last-mentioned relay marks the calling line as busy to the connectors having access thereto. The relay R370 now operates and, at its contacts 371, interrupts a point in the circuit for the operator relay R360 and, at its contacts 372, it prepares a point in the circuit for controlling the control relay R540.

As soon as the calling subscriber line is switched through, in the manner mentioned above, a dial tone signal, transmitted by the connector 200, is heard by the calling subscriber, to indicate that the dialing of the called subscriber number may be initiated. The circuit for transmitting the dial tone signal to the calling subscriber may be traced from the dial tone conductor C482 by way of the vertical off-normal contacts 492, the contacts 422, the lower winding of the answer relay R270, the contacts 323, and the condenser 386, one branch extending by way of the contacts 274 and the lower winding of the line relay R250 to ground and the other branch extending by way of the positive conductor C42 to the calling subscriber. Due to the high impedance of the lower winding of the line relay R250, the branch of the circuit including this winding has no effect upon the tone signal and, consequently, the subscriber, upon hearing the dial tone signal, may proceed to dial the directory digits of the desired called subscriber number. By transmitting the dial tone signal through a winding of the answer relay R270 instead of through a winding of the line relay R250, as is the usual practice, a more uniform tone signal is obtained and the impulsing circuit for the line relay R250 is rendered more efficient.

*Dialing the first digit*

When the connector 200 is seized and conditioned for further operation, in the manner described above, the relays R240, R250, R260, R370 and R430 are in their operated positions. Assuming that the directory number designating the desired called substation B1 is "2543," the first digit dialed by the calling subscriber at sub-station A1 will necessarily comprise two impulses. Consequently, when the calling subscriber actuates the dial of his telephone instrument in accordance with the digit "2," the impulse springs thereof interrupt the loop circuit including the windings of the line relay R250, in a well known manner, and the line relay momentarily restores to normal two times. The first time the line relay R250 restores, at its contacts 252, it interrupts a point in the previously traced multiple circuit for the release control relay R260; at its contacts 251, it completes a preenergizing circuit for its upper winding over a circuit including ground at the contacts 473, the contacts 251 and 431, and the resistor 280, whereby the line relay R250 will be quickly operated when the loop circuit, including the calling subscriber line, is closed at the end of the first impulse; and finally, at its contacts 253, it interrupts a point in the previously traced holding circuit including the upper non-inductive resistance winding and the lower operating winding of the lock-pulse relay R240. The lock-pulse relay R240 quickly restores to normal inasmuch as the locking circuit including the non-inductive resistance winding is such that the relay in its locked position is just on the verge of restoring.

When the lock-pulse relay R240 restores to normal, at its contacts 242, it interrupts the remaining point in the previously traced multiple circuit for the release control relay R260. The latter relay, however, is of the slow-to-release type and, consequently, remains in its operated position during pulsing. At its contacts 243, the relay R240 opens a further point in the previously traced locking circuit for itself and, finally, at its contacts 241, it completes a circuit for energizing the stepping magnet 561 of the minor switch 560 in multiple with the lower winding of the transfer control relay R230. This circuit may be traced from ground by way of the contacts 473 and 241, the impulsing conductor C259, and the contacts 317', 432 and 456, one path extending by way of the contacts 423 and the winding of the stepping magnet 561, to battery, and the other path extending by way of the lower winding of the transfer control relay R230, to battery. Thus it will be seen that upon the first restoration of the line relay R250 the lock-pulse relay R240 restores to normal and it, in turn, completes an operating circuit for the transfer control relay R230 and the minor switch stepping magnet 561.

The transfer control relay R230, upon operating, at its contacts 231, short-circuits its upper winding in order to render the relay slow to release and thus it is retained in its operated position during pulsing. Finally, at its contacts 232, the relay R230 removes ground potential from the conductor C255 in order to prevent certain relays from inadvertently being operated while impulses are being transmitted to the connector 200.

In response to the first impulse transmitted over the conductor C259 the minor switch stepping magnet 561, upon energizing, advances its wipers 563 and 564 one step in a clockwise direction into engagement with the first contacts in the associated banks, and in addition thereto, at its contacts 567, the magnet 561 applies ground potential to the conductor C254 to prepare a circuit for reenergizing the lower winding of the lock-pulse relay R240 as soon as the line relay R250 is reoperated at the end of the first pulse. In view of the fact that the restoration of the lock-pulse relay R240 completed, at its contacts 241, the circuit for operating the minor switch stepping magnet 561, the latter circuit cannot be interrupted upon the reenergization of the line relay R250 until the magnet 561 has fully operated to complete the circuit for the lower winding of the lock-pulse relay R240. As soon as the wipers 563 and 564 of the minor switch 560 are advanced from their normal resting positions the minor switch off-normal contacts 565 and 566 are closed. The minor switch off-normal contacts 565 prepare a point in the incomplete circuit for the minor switch release magnet 562, and the minor switch off-normal contacts 566 prepare a point in the incomplete circuit for controlling the lower winding of the vertical transfer relay R420.

At the end of the first pulse the impulse springs of the dial at the calling subscriber substation are reclosed in order to again complete the loop circuit for reenergizing the line relay R250. Since the upper winding of the relay R250 has been preenergized over the above-mentioned circuit including the resistor 280, it immediately operates to again control the previously traced circuits by way of its associated contacts 251 to 253, inclusive. More specifically, upon reoperating, the relay R250, at its contacts 251, interrupts a point in the preenergizing circuit for its upper winding; at its contacts 252, it recompletes the energizing circuit for the slow-to-release control relay R260; and finally, at its contacts 253, it completes the operating circuit for the lower winding of the lock-pulse relay R240. The lock-pulse relay R240 reoperates thereby to interrupt, at its contacts 241, the previously traced circuit for energizing the minor switch stepping magnet 561 in multiple with the transfer control relay R230; at its contacts 242, it completes a multiple circuit for the release control relay R260; and finally, at its contacts 243, it prepares point in the locking circuit for itself. When the pulsing circuit, including the conductor C259, is thus interrupted, the minor switch stepping magnet 561 immediately restores but the transfer control relay R230, due to the short-circuit around its upper winding, is rendered slow to release and remains energized for a short period after the circuit for the lower winding is interrupted. When the magnet 561 restores, at its contacts 567, it opens the circuit including the conductor C254 for energizing the lower winding of the lock-pulse relay R240, but the latter winding is now maintained energized over the above-mentioned locking circuit including its upper non-inductive resistance winding. Subsequent impulses transmitted to the line relay R250 control the lock-pulse relay R240, the transfer control relay R230 and the minor switch stepping magnet 561, in the same manner as has been described above. Since the first digit dialed by the calling subscriber at substation A1 is the digit "2" the minor switch wipers 563 and 564 are positioned into engagement with the second contacts in the associated contact banks, and the line relay R250 and the lock-pulse relay R240 remain in their operated positions at the end of the second impulse of the digit "2."

Referring now to the transfer control relay R230, it is to be noted that at the end of the second impulse of the digit "2," that is during the interdigital pause, the relay slowly restores to normal and, at its contacts 232, reapplies ground potential to the conductor C256 and, at its contacts 231, it interrupts a point in the shunting circuit for its upper winding. When ground potential is reapplied to the conductor C256 an energizing circuit is completed for the lower winding of the vertical transfer relay R420, which may be traced from ground by way of the contacts 232, 211 and 429, the minor switch off-normal contacts 566, and the lower winding of the relay R420, to battery. The relay R420 operates over the above-traced circuit and, at its contacts 428, completes a locking circuit for its lower winding, which is independent of its initial energizing circuit; furthermore, at its contacts 429, it simultaneously interrupts a point in the previously traced initial energizing circuit for its lower winding. Furthermore, at its contacts 421, the relay R420 prepares a point in the incomplete circuit for transmitting a busy tone signal to the calling subscriber in the event the called line is busy, and simultaneously therewith, at its contacts 422, it interrupts a point in the previously traced circuit for transmitting the dial tone signal to the calling subscriber. In addition thereto, at its contacts 423, the relay R420 interrupts a point in the above-traced impulsing circuit for controlling the minor switch stepping magnet 561; at its contacts 424, it transfers the impulsing circuit to the vertical magnet 380; at its contacts 426, it interrupts a point in the incomplete circuit for the upper winding of the trunk hunting relay R440; at its contacts 427, it prepares a point in the incomplete circuit for the lower winding of the last digit relay R410; at its contacts 421′, it prepares a point in the incomplete circuit for controlling the pickup relay R530; and finally, at its contacts 422′, it prepares a point in an incomplete circuit for applying resistance ground potential to the control wiper C574 or C578 in the event a reverting call is made by the calling subscriber.

In view of the foregoing it will be understood that, as a result of the dialing of the first digit "2," the minor switch wipers 563 and 564 are positioned into engagement with the second contacts in their associated contact banks and the vertical transfer relay R420 is operated in order to transfer the impulsing circuit, including the conductor C259 from the minor switch stepping magnet 561 to the vertical magnet 380 and to prepare a point in the circuit for the pickup relay R530, whereby the latter relay can be subsequently controlled by a pickup pulse transmitted over the PU—1 conductor C257. The connector 200 is now in condition to receive the second digit of the called subscriber directory number dialed by the calling subscriber at substation A1.

Before discussing further operation of the connector 200 as a result of the dialing of the second digit of the called subscriber number, a further explanation will be given of the operation thereof in the event that the first digit dialed is the digit "3." In the event that the first digit dialed into the connector 200 is the digit "3," the relays R250 and R240 operate, in the manner previously described, so that three pulses are transmitted over the impulsing conductor C259 to the minor switch stepping magnet 561 and, in multiple therewith, to the transfer control relay R230. As a result of the three pulses transmitted to the magnet 561, the wipers 563 and 564 of the minor switch 560 are advanced into engagement with the third contacts in the associated contact banks. Shortly after the third pulse the transfer control relay R230 restores to normal, in the manner previously explained, and, at its contacts 232, reapplies ground potential to the conductor C256. When ground potential is applied to the conductor C256 the previously traced circuit is completed for energizing the lower winding of the vertical transfer relay R420 and, in multiple therewith, a circuit is also completed by way of the third contacts engaged by the wiper 564 for energizing the lower winding of the pickup select relay R220. The latter circuit may be traced from ground, by way of the contacts 232, the conductor C256, the contacts 211, 545′, 431′ and 352′, the third contacts engaged by the wiper 564 of the minor switch 560 and the lower winding of the relay R220, to battery. As a result of the above-traced circuit for its lower winding, the relay R220 operates and, at its contacts 221, interrupts a point in the incomplete circuit including the EC wiper 575; at its contacts 222, it interrupts the shunting circuit around its upper winding so that the relay is now held in a series locking circuit which includes its upper winding and the lower winding of the hold relay R430. The latter circuit may now be traced from the grounded conductor C43, by way of the contacts 311″, 345 and 262 and, in multiple therewith, by way of the contacts 437, the upper winding of the relay R220 and the lower winding of the relay R430, to battery. Thus, it will be seen that the pickup select relay R220 and the hold relay R430 remain in their operated positions over the above-traced locking circuit. As a further result of the operation of the relay R220, at its contacts 224, it disconnects the PU—1 conductor C257 from the previously mentioned incomplete circuit for the pickup relay R530 and substitutes in place thereof, at its contacts 223, the PU—2 conductor C258. The circuit operations performed as a result of the operation of the vertical transfer relay R420 are exactly the same as have been described above and, consequently, the impulsing conductor C259 is transferred from the circuit including the minor switch stepping magnet 561 to the circuit including the vertical magnet 380. Thus, it will be seen that as a result of the operation of the connector 200 in response to the dialing of a first digit "3" thereof, the incomplete circuit for controlling the pickup relay R540 includes the PU—2 conductor C258 instead of the PU—1 conductor C257, as is the case when the first digit "2" is dialed thereinto. Accordingly, a ringing code in the second group of ten ringing codes will be selected in response to the dialing of the final digit of the called number.

In the event that the first digit dialed into the connector 200 is the digit "4," the line relay R250 and the lock-pulse relay R240 respond in the manner previously described, whereupon four impulses are transmitted over the impulsing conductor C259 and the minor switch stepping magnet 561 advances the wipers 563 and 564 into engagement with the fourth contacts in the associated contact banks. When the transfer control relay R230 restores shortly after the fourth impulse of the digit "4," ground potential is reapplied to the conductor C256 thereby to cause the operation of the vertical transfer relay R420, in the manner previously explained. Since the wiper 564 of the minor switch 560 is now in engagement with the fourth contacts in its associated contact bank, a circuit is completed for energizing the upper winding of the wiper switching relay R550. This circuit may be traced from ground by way of the contacts 232, 211, 545′, 431′, 352′ and 541′, the fourth contacts engaged by the wiper 564, the contacts 548 and 558, and the upper winding of the relay R550, to battery. As a result of the above-traced circuit the relay R550 operates and, at its contacts 551, 552, 554, 556 and 551′, it disconnects the first set of wipers comprising the wipers 571 to 575, inclusive, from the associated conductors of the connector 200 and, at its contacts 553, 555 and 557, it connects the second set of wipers comprising the wipers 576 to 578, inclusive, to the associated conductors of the connector 200; and finally, at its contacts 558 and 559, it simultaneously interrupts the initial energizing circuit for its upper winding and completes a locking circuit therefor, including the grounded conductor C481. Thus it will be understood that when the first digit dialed into the connector 200 is the digit "4," the wiper switching relay R550 is operated to disconnect the first set of wipers and to connect the second set of wipers so that a connection may be established to a called subscriber line terminating in the second hundred group 580 of bank contacts. It should be noted that the vertical transfer relay R420, in addition to transferring the impulsing circuit from the minor switch stepping magnet 561 to the vertical magnet 380, also, at its contacts 421′, prepares the previously mentioned circuit, whereby the pickup relay R530 may be controlled over the PU—1 conductor C257. Accordingly, a ringing code in the first group of ten ringing codes will be selected in response to the dialing of the final digit of the called number.

In the event that the first digit dialed into the connector 200 is the digit "5," the relays R250 and R240 operate, in the manner previously described, to transmit five pulses over the impulsing conductor C259 to the minor switch stepping magnet 561. The minor switch stepping magnet 561 advances its wipers 563 and 564 into engagement with the fifth contacts in the associated contact banks. When the transfer control relay R230 restores to normal shortly after the fifth impulse of the digit "5," ground potential is reapplied to the conductor C256 in order to complete the previously mentioned circuit for operating the vertical transfer relay R420. In addition thereto, a circuit is completed for energizing the lower winding of the wiper switching relay R550 in series with the lower winding of the pickup select relay R220. This circuit may be traced from ground by way of the contacts 232, the conductor C256, the contacts 211, 545′, 431′ and 352′, the fifth contacts engaged by the wiper 564 of the minor switch 560, the lower winding of the wiper switching relay R550, and the lower winding of the pickup select relay R220, to battery. The relays R550 and R220 operate in series when the above traced circuit is completed. The wiper switching relay R550, upon operating, at its contacts 559, completes the previously mentioned locking circuit for its upper winding which includes the grounded conductor C481, and it also disconnects the first set of wipers and connects the second set of wipers, in the manner described above. The pickup select relay R220, upon operating, locks itself over a circuit including its upper winding in series with the lower winding of the hold relay R430, in the manner previously described. Furthermore, at its contacts 223 and 224, the relay R220 disconnects the PU—1 conductor C257 from the incomplete circuit for controlling the pickup relay R530, and connects the PU—2 conductor C258 thereto. Thus, it will be seen that when the first digit "5" is dialed into the connector 200 the connection will be established over the second set of wipers comprising the wipers 576 to 578, inclusive, instead of over the first set of wipers comprising the wipers 571 to 575, inclusive, and the circuit for the pickup relay R530 is prepared so that it will be controlled over the PU—2 conductor C258 instead of over the PU—1 conductor C257.

*Dialing the second digit*

When the second digit "5" of the called subscriber directory number is dialed by the calling subscriber at substation A1, the line relay R250 and the lock-pulse relay R240 cooperate, in the manner previously described, whereupon five pulses are transmitted over the impulsing conductor C259 to the vertical magnet 380 and in multiple therewith to the lower winding of the transfer control relay R230. Thus, when the lock-pulse relay R240 restores at the beginning of the first pulse, at its contacts 241, it completes a circuit which may be traced from ground by way of the contacts 473 and 241, the impulsing conductor C259, and the contacts 317', 432 and 456, one branch extending to the lower winding of the relay R230, and the other branch extending by way of the contacts 424, 541 and 353 and the winding of the vertical magnet 380, to battery. The transfer control relay R230 operates, in the manner described hereinbefore, to disconnect, at its contacts 232, ground potential from the conductor C256. The vertical magnet 380 operates over the above-traced circuit and, at its contacts 381, applies ground potential to the conductor C254 in order to prepare a point in the circuit for energizing the lower winding of the lock-pulse relay R240 as soon as the line relay R250 reoperates to close its contacts 253. When this occurs the lock-pulse relay R240 reoperates and, at its contacts 241, interrupts a point in the above-traced impulsing circuit, thereby to cause the vertical magnet 380 to restore to normal. When the vertical magnet 380 restores, at its contacts 381, it removes ground potential from the conductor C254, whereupon the lock-pulse relay R240 locks itself in series with its upper non-inductive resistance winding to the grounded conductor C255. Incident to the operation of the vertical magnet 380, the wiper shaft (not shown) is advanced one step in a vertical direction to position the wipers 571 to 578, inclusive, opposite the first level of the associated bank contacts. As soon as the wiper shaft advances the wipers of the connector 200 in a vertical direction away from its normal resting position, the vertical off-normal contacts 394, 491 and 493 are closed and the vertical off-normal contacts 492 are opened. When the vertical off-normal contacts 492 are opened the previously traced circuit including the dial tone conductor C482 is interrupted, thereby to terminate the transmission of the dial tone signal to the calling subscriber. When the vertical off-normal contacts 493 are closed a further point in the circuit is prepared for transmitting a busy tone signal to the calling subscriber. When the vertical off-normal contacts 491 are closed a point in the circuit is prepared for controlling the Strowger release magnet 490. Finally, when the vertical off-normal contacts 394 are closed, a point in an incomplete circuit is prepared for controlling the rotary transfer relay R350 at the end of the fifth impulse of the second digit 5 transmitted to the connector 200.

Each time the vertical magnet 380 is energized in response to the restoration of the lock-pulse relay R240, it advances the wipers of the connector 200 an additional step in the vertical direction until, at the conclusion of the fifth impulse, the line relay R250 and the lock-pulse relay R240 remain in their operated positions. Since five impulses have been transmitted corresponding to the digit "5," the vertical magnet 380 has now positioned the wipers of the connector 200 opposite the fifth levels of their associated contact banks. Shortly after the last impulse of the digit "5" has been transmitted to the transfer control relay R230 it restores to normal and, at its contacts 232, reapplies ground potential to the conductor C256. When ground potential is reapplied to the conductor C256 the above-mentioned circuit is completed for energizing the rotary transfer relay R350 over a path which may be traced from ground by way of the contacts 232, the conductor C256, the contacts 211, 545', 431' and 359, the vertical off-normal contacts 394 and the winding of the relay R350, to battery. Upon operating, the relay R350, at its contacts 358, completes an obvious locking circuit for itself and, simultaneously therewith, at its contacts 359, it interrupts its above-traced initial energizing circuit, and, at its contacts 357', it completes an alternative locking circuit for the lower winding of the vertical transfer relay R420, which may be traced from ground by way of the contacts 357', 436' and 547' and the lower winding of relay R420, to battery. At its contacts 351', the relay R350 completes an operating circuit for the minor switch release magnet 562, which may be traced from ground by way of the contacts 232, the conductor C256, the contacts 211, 545', 431' and 351', the minor switch off-normal contacts 565, and the winding of the release magnet 562, to battery. When the above-mentioned circuit is completed for operating the minor switch release magnet 562, the magnet attracts its associated holding pawl (not shown), thereby to permit the wipers 563 and 564 to be automatically restored in a counter-clockwise direction to their illustrated normal positions. Incident to the restoration of the wipers 563 and 564 to their normal resting positions, the minor switch off-normal contacts 565 are opened in order to interrupt the circuit for the release magnet 562, which now restores to normal, and the minor switch off-normal contacts 566 are opened in order to interrupt the previously traced locking circuit for the lower winding of the relay R420, including the contacts 428 and the minor switch off-normal contacts 566. However, the relay R420 now remains in its operated position over the above-mentioned alternative locking circuit. As a further result of the operation of relay R350, at its contacts 352, it prepares a point in the circuit for transmitting 60 I. P. M. ground pulses from the conductor C388 to the answer relay R270; at its contacts 353, it disconnects the impulsing circuit from the vertical magnet 380; at its contacts 354, it prepares a point in the impulsing circuit for controlling the rotary magnet 382; at its contacts 355, it interrupts a point in the incomplete circuit for controlling the upper winding of the trunk hunting relay R440; at its contacts 356, it prepares a point in the incomplete circuit for controlling the lower winding of the last digit relay R410; at its contacts 353', it interrupts a point in the incomplete circuit for controlling the lower winding of the trunk switch-through relay R310; at its contacts 354', it completes the previously mentioned circuit including the contacts 435' and 457' for grounding the motor start conductor C486 in order to initiate operation of the interrupter (not shown); and, at its contacts 356', it prepares an additional point in the incomplete circuit for applying resistance ground potential to the C wiper 574 or 578 in the event a reverting call is made. Following the operations just described the connector 200 is conditioned to respond to the impulses of the third digit "4" of the directory number of the called subscriber at substation B1.

*Dialing the third digit*

During the dialing of the third digit "4" by the calling subscriber at substation A1 the line relay R250 and the lock-pulse relay R240 cooperate in the manner previously described, and the latter relay, at its contacts 241, transmits four current pulses over the impulsing conductor C259 to the Strowger rotary magnet 382, and in parallel therewith to the transfer control relay R230. When the line relay R250 and the lock-pulse relay R240 restore at the beginning of the first pulse, a circuit is completed from ground by way of the contacts 473 and 241, the impulsing conductor C259, the contacts 317', 432, 456, 424, 541 and 354, and the winding of the rotary magnet 382, to battery. In multiple therewith a circuit is also completed for the lower winding of the transfer control relay R230. The transfer control relay R230 operates in response to the above-traced circuit and remains in its operated position during pulsing. As a further result of the operation of relay R230, at its contacts 232, it removes ground potential from the conductor C256. The rotary magnet 382 operates when the above-traced circuit is completed therefor and rotates the wiper shaft (not shown) in a well known manner to advance the wipers 571 to 578, inclusive, of the connector 200 into engagement with the first set of contacts in its associated fifth level. Also upon operating, the rotary magnet 382, at its contacts 384, prepares a point in a circuit for energizing the lower winding of the lock-pulse relay R240 as soon as the line relay R250 energizes at the end of the first impulse. This circuit may be traced from ground by way of the contacts 446, 384 and 253, and the lower winding of the lock-pulse relay R240, to battery. The relay R240 now operates and, at its contacts 241, interrupts the previously traced circuit for energizing the rotary magnet 382 and the lower winding of the transfer control relay R230. The magnet 382 now restores to normal and, at its contacts 384, interrupts the previously traced circuit for energizing the lower winding of the relay R240. However, the relay R240 now locks in its energized position over a circuit including its upper non-inductive resistance winding and the grounded conductor C255. As a further result of the operation of the rotary magnet 382, at its contacts 383, it interrupts a point in the incomplete circuit for controlling the upper winding of the rotary interrupter relay R210. This circuit, however, is not effective in the present call since it is only utilized when it is necessary automatically to rotate the wipers of the connector 200 during a trunk hunting operation.

Each time the lock-pulse relay R240 and the line relay R250 restore, a pulse is transmitted over the impulsing conductor C259 in the manner described above, in order to control the rotary magnet 382 to advance the wipers an additional step in the rotary direction so that at the conclusion of the third digit "4" the wipers stand in engagement with the fourth set of contacts in the selected fifth level. In the present case the contacts engaged by the wipers 572, 573 and 574 terminate respectively the negative, positive and C conductors extending to the line circuit 50 individual to the called subscriber line. Furthermore, each time the rotary magnet 382 operates it completes, at its contacts 384, the above-mentioned circuit for energizing the lock-pulse relay R240. As soon as the wiper shaft (not shown) is rotated away from its normal rotary position, the rotary off-normal contacts 569 are closed in order to prepare a point in the incomplete circuit for the control relay R540.

Shortly after the last impulse of the third digit "4" has been transmitted to the transfer control relay R230 the relay restores to normal and, at its contacts 232, reapplies ground potential to the conductor C256. Incident to the last-mentioned operation a circuit is completed for operating the control relay R540 over a circuit which may be traced from ground, by way of the contacts 232, the conductor C256, the contacts 235 and 544, the rotary off-normal contacts 569 and the winding of the relay R540, to battery. When this circuit is completed the relay R540 operates and, at its contacts 544, it interrupts its initial energizing circuit and, simultaneously therewith, at its contacts 545, it completes a locking circuit for itself which includes the grounded conductor C481. Also upon operating, the relay R540, at its contacts 541, interrupts a point in the previously traced impulsing circuit over which the vertical magnet 380 was controlled in response to the second digit and over which the rotary magnet 382 was controlled in response to the third digit. At its contacts 547', the relay R540 interrupts a point in the previously mentioned alternative locking circuit for the lower winding of the vertical transfer relay R420, which relay now restores to normal. At its contacts 546', the relay R540 completes a circuit including the contacts 357', 436', 546' and 458' for grounding the generator start conductor C485, thereby to initiate operation of the ringing current generator; at its contacts 545', it interrupts a further point in the previously traced circuit for controlling the release magnet 562; at its contacts 547, 549, 542' and 544', it prepares points in the incomplete circuits including certain bank contacts accessible to the wiper 564 of the minor switch 560; at its contacts 543, it prepares a point in the incomplete circuit for controlling the operator relay R360 but, since this call has been initiated by a calling subscriber, this circuit is interrupted at the contacts 371 of the control relay R370; and finally, at its contacts 542, it connects the upper winding of the trunk hunting relay R440 to the C1 wiper 574 over a circuit which may be traced from this wiper by way of the contacts 556, 318', 542, 461', 426 and 365, and the upper winding of the trunk hunting relay R440, to battery. If the particular called line is idle when the wipers of the connector 200 are in engagement therewith, battery potential will be applied to the wiper 574, thus short-circuiting the upper winding of the relay R440 and preventing its operation. However, if the particular called line is busy at this time ground potential is applied to the wiper 574, thereby to complete an energizing circuit for the relay R440.

Referring now to the relay R420, which restored to normal when its locking circuit was opened by the contacts 547′, at its contacts 421 and 422, it transfers the incomplete circuit for transmitting a busy tone signal to the calling subscriber from a path including the contacts 421 to a path including the contacts 422. At its contacts 423, the relay R420 again prepares a point in the impulsing circuit for the minor switch stepping magnet 561; at its contacts 424, it interrupts a further point in the previously traced impulsing circuit for controlling, respectively, the vertical magnet 380 and the rotary magnet 382; at its contacts 426, it completes a point in the above-traced circuit for the upper winding of the trunk hunting relay R440; at its contacts 429, it again prepares a point in the circuit over which it may be subsequently reoperated; at its contacts 421′, it interrupts a further point in the incomplete circuit for controlling the pickup relay R530; and, at its contacts 422′, it interrupts a further point in the circuit for applying a resistance ground potential to the C wiper 574 or 578, in the event a reverting call is made.

Particular attention is now directed to the fact that the relay R440 remains in its unoperated position in the event that the called line is idle at the present time, and it will be in its operated position in the event that the called line is busy.

*Busy test*

It will be assumed that the called line is busy at the time it is selected in the manner just explained and, consequently, the C conductor extending to the line circuit 50 is grounded to indicate the busy condition of the called line. This ground potential is encountered by the wiper 574 when it engages the associated bank contact terminating the above-mentioned C conductor and causes the operation of the trunk hunting relay R440 over the circuit traced above. Upon operating, at its contacts 441, the relay R440 interrupts a point in the incomplete circuit for transmitting a busy tone signal from the conductor C487 to the calling subscriber; at its contacts 442, it prepares a point in the circuit for controlling the rotary magnet 382 in the event that automatic trunk hunting is utilized; at its contacts 443, it interrupts a point in the previously mentioned incomplete circuit for controlling the operator relay R360; at its contacts 446, it interrupts a point in the incomplete circuit which is utilized for controlling automatic trunk hunting; and, at its contacts 447, it prepares a point in an incomplete circuit over which the EC wiper 575 is connected to a circuit including the upper winding of the rotary interrupter relay R210. The last-mentioned two circuits, including respectively the contacts 446 and 447, are ineffective in the present call inasmuch as the automatic trunk hunting is not utilized on calls to subscriber lines. Finally, at its contacts 444, the relay R440 completes a circuit for energizing the upper winding of the busy test relay R460. This circuit may be traced from the grounded wiper 574, the contacts 556, 318′, 542 and 444, and the upper winding of the relay R460, to battery. Upon operating, the relay R460, at its contacts 462, prepares a point in the circuit for transmitting a 60 I. P. M. flash signal to the upper winding of the answer relay R270; at its contacts 464 and 467, it prepares points in the circuit whereby the ringing code is transmitted over the positive wiper 573 instead of over the negative wiper 572 to the called line; at its contacts 461′, it interrupts the circuit for the upper winding of the trunk hunting relay R440, which now restores to normal; and, at its contacts 468, it completes a locking circuit for itself which may be traced from ground by way of the contacts 438, 468, 326, 418 and 445, and the upper winding of the relay R460, to battery. Thus it will be seen that the relay R440 operates when a busy line is encountered and completes a circuit for energizing the busy test relay R460. The latter relay, in turn, upon operating, interrupts the circuit for the trunk hunting relay R440 which restores to normal and completes, at its contacts 445, the above-mentioned locking circuit for the busy test relay R460. Particular attention is called to the fact that the locking circuit for the relay R460 is entirely independent of its initial energizing circuit, including the C wiper 574. The effect upon the various circuits, as a result of the actuation of the contacts 469, 462′ and 463′, is of no importance at the present time.

From the foregoing description of operation of the relays R440 and R460, it is noted that a circuit is prepared, at the contacts 441 and 465, for transmitting a busy tone signal from the conductor C487 to the called subscriber line, but this signal is withheld until the calling subscriber has dialed the fourth and final digit of the called subscriber number, inasmuch as the vertical transfer relay R420 is in its restored position at this time. Attention is also directed to the fact that neither the relay R440 nor the relay R460 will be energized when the wipers engage the contacts terminating the called line at a time when such line is idle. The connecter 200 is now conditioned to receive the fourth digit "3" of the called subscriber number, regardless of whether the called line is busy or idle, as has been noted above.

*Dialing the fourth digit*

When the calling subscriber at substation A1 dials the fourth digit "3" designating the particular ringing code assigned to the called substation B1, the line relay R250 and the lock-pulse relay R240 function in the manner previously described, whereby three current pulses are transmitted over the impulsing conductor C259 to the minor switch stepping magnet 561 and, in multiple therewith, to the lower winding of the transfer control relay R230. This impulsing circuit may be traced from ground by way of the contacts 473 and 241, the impulsing conductor C259, the contacts 317′, 432 and 456, to the lower winding of the transfer control relay R230 and battery, and in multiple therewith, by way of the contacts 423, to the winding of the magnet 561, and battery. The magnet 561 operates in the manner previously described in connection with the dialing of the first digit and advances its wipers 563 and 564 into engagement with the third contacts in the associated contact banks. Each time the magnet 561 is operated, at its contacts 567, it applies ground potential to the conductor C254 in order to reoperate the lock-pulse relay R240 as soon as the line relay R250 is operated at the end of each received impulse. Incident to the off-normal movement of the wipers 563 and 564 the minor switch off-normal contacts 565 and 566 are reclosed, the former to prepare a point in an incomplete circuit for operating the minor switch release magnet 562, the latter to prepare a point in the circuit for reoperating the vertical transfer relay R420.

Shortly following the last impulse of the fourth digit "3" the transfer control relay R230 restores and, at its contacts 232, reapplies ground potential to the conductor C256, thereby to complete a circuit including the contacts 211 and 429, the minor switch off-normal contacts 566, and the lower winding of the vertical transfer relay R420 and battery for reoperating this relay. Upon reoperating, the relay R420, at its contacts 428 and 429, completes a locking circuit for its lower winding which is independent of a portion of its initial energizing circuit. As a further result of the reoperation of the relay R420, at its contacts 421, it prepares or completes a point in the circuit for transmitting a busy tone signal to the calling subscriber line, depending upon the position of the contacts 441 and 465; at its contacts 423, it interrupts a point in the previously traced circuit for controlling the minor switch stepping magnet 561; and, at its contacts 427, it prepares a point in the circuit for controlling the last digit relay R410.

In the event the called line is busy when the wipers of the connector are advanced into engagement therewith, the relays R440 and R460 are operated in the order named, in the manner previously described, and the relay R460, in turn, interrupts the circuit for the relay R440 which restores to normal. Consequently, at the end of the fourth digit and when the relay R420 is operated, a busy tone signal is transmitted to the calling subscriber at the substation A1, over a circuit which includes the busy tone conductor C487, the contacts 465, 441, 415 and 421, the lower winding of the answer relay R270, the contacts 323, the condenser 386, the contacts 315' and the positive conductor C42. The resulting busy tone signal serves to inform the calling subscriber at substation A1 that the desired connection cannot be obtained at the present time. In view of the foregoing it will be understood that the connector 200 operates to transmit a busy tone signal to the calling subscriber at substation A1 when a busy called line is encountered after the fourth or last digit of the called subscriber directory number has been dialed. Upon hearing the busy tone signal, the calling subscriber should replace his receiver upon the associated switchhook in order to release the switching apparatus involved in the connection thus far established. The manner in which the connector 200 is restored to normal, in response to the release by a calling subscriber, will be described hereinafter.

Before discussing the operation of the connector when the called line is idle, it is noted that when the wiper 563 of the minor switch 560 is in engagement with the third contact in its associated contact bank, the third ringing code transmitted by the ringing apparatus is extended to the make contact of the contacts 532. This ringing current is not applied to the busy called line in the present call inasmuch as the circuit for the pickup relay R530 cannot be closed. The latter circuit is opened, at the contacts 412' of the deenergized last digit relay R410, and consequently the pickup pulses applied to the PU—1 conductor C257 cannot control the relay R530. In this manner the ringing current is prevented from being transmitted to the called subscriber line when the same is busy.

*Idle test*

It will now be assumed that the called subscriber line is idle at the time it is selected, in the manner explained above, in response to the dialing of the third digit into the connector 200. When this condition exists on the called subscriber line, battery potential is encountered by the C wiper 574, which potential shunts the upper winding of the trunk hunting relay R440. This prevents operation of the relay R440 and therefore, in turn, prevents operation of the busy test relay R460. The latter relay, at its contacts 465, interrupts a point in the circuit traced above for transmitting a busy tone signal to the calling subscriber at substation A1. Inasmuch as the relays R440 and R460 are in their normal positions when the last digit "3" of the called subscriber number is dialed into the connector 200, the minor switch stepping magnet 561 advances the wipers 563 and 564 into engagement with the third contacts in the associated contact banks and the relay R420 operates and locks itself in its operated position as soon as the transfer control relay R230 restores to normal at the end of the last impulse. When the vertical transfer relay R420 operates, in the manner described above, at its contacts 423, it interrupts a point in the pulsing circuit for the minor switch stepping magnet 561 in order to prevent the latter magnet from being inadvertently operated as a result of accidental interruption of the loop circuit by the calling subscriber at substation A1. Furthermore, at its contacts 427, the vertical transfer relay R420 now completes a circuit for operating the last digit relay R410. This circuit may be traced from battery potential applied to the C wiper 574 through the winding of the cutoff relay (not shown) individual to the line circuit 50, by way of the contacts 556, 318', 542, 461', 427, 356 and 327, the lower winding of the last digit relay R410, and the contacts 443 and 433, to ground. Relay R410 operates when the above-traced circuit is completed and, at its contacts 419, completes a locking circuit for itself which includes its upper winding and the contacts 419 and 438. As a further result of the operation of the vertical transfer relay R420, at its contacts 421', it prepares a point in the circuit for transferring a pickup pulse from the PU—1 conductor C257, which circuit is completed to the pickup relay R530 as soon as the contacts 412' are closed upon the operation of relay R410. As a further result of the operation of the last digit relay R410, at its contacts 412, 413, 414 and 416, it prepares points in the circuits over which ringing current is transmitted to the called subscriber line and over which the answer relay R270 is controlled when the called subscriber answers. Furthermore, at its contacts 417, the relay R410 completes a circuit including ground, the contacts 433, 443, 417, 318' and 556, the wiper 574 and the engaged contact terminating the C conductor extending to the line circuit 50 of the called subscriber line, thereby to operate the cutoff relay therein (not shown). As a further result of the closing of the contacts 417, the previously mentioned circuit including the lower winding of the relay R410 is shunted, but inasmuch as the relay is locked in a circuit including its upper winding it is retained in its operated position. At its contacts 418, the relay R410 interrupts a point in the previously traced circuit for energizing the upper winding of the busy test relay R460; at its contacts 411', it interrupts a further point in the incomplete circuit for controlling the release magnet 490; and finally, at its contacts 413', it completes a circuit including the contacts 232, the conductor C256, and the contacts 435, 459 and 413', whereby ground potential is applied to the even numbered contacts of the inside row of bank contacts associated with the wiper 564. Inasmuch as the wiper 564 is in engagement with an odd numbered contact (3), the application of ground potential to the even numbered contacts has no function to perform in the present call.

Digressing for a moment from the present call, attention is directed to the fact that if the wiper 564 had positioned into engagement with an even numbered contact in the inside row of bank contacts, a circuit would have been completed for the lower winding of the busy test relay R460. Under this condition the busy test relay R460 would operate and, at its contacts 464 and 467, would prepare a point in the circuits for transmitting the selected ringing code signal over the positive conductor of the selected called line instead of over the negative conductor thereof, as is the case when the busy test relay R460 is in its normal position.

Continuing with the present call, it is noted that the busy test relay R460 has not been operated to reverse the manner in which ringing current is applied to the conductors of the called line. Since the first digit dialed by the calling subscriber in order to extend the connection to the subscriber at substation B1 is the digit "2," the pickup select relay R220 is in its normal position and, consequently, the pickup PU—1 conductor C257 will be connected to the winding of the pickup relay R530. A ground pulse is transmitted over the PU—1 conductor C257 by the ringing interrupter (not shown) just preceding the time when the complete ten different ringing codes of the first group of ten ringing codes are applied to the ten different bank contacts accessible to the wiper 563 of the minor switch 560. With this arrangement the pickup relay R530 will be operated to complete a ringing circuit to the called subscriber line at a time when a full complement of the particular selected ringing code may be transmitted thereto, and this prevents mutilation or partial transmission of any particular selected ringing code. The circuit for operating the pickup relay R530 extends from the grounded pickup PU—1 conductor C257 by way of the contacts 224, 421', 535, 456' and 412', and the winding of the pickup relay R530, to battery. As has been mentioned above, this pickup pulse occurs just prior to the beginning of each of the available ten ringing codes in the first group of ten ringing codes. On the other hand, if the pickup select relay R220 is in its energized position the ground pulse for controlling the operation of the pickup relay R530 will be applied to the pickup PU—2 conductor C258, whereby the ten codes of a second group of ten ringing codes, which are different from the codes of the first-mentioned group, are applied to the ten ringing conductors connected to the bank contacts accessible to the wiper 563 of the minor switch 560. The pickup relay R530 operates when the ground pulse is received over the PU—1 conductor C257 and, at its contacts 536, it completes a locking circuit for itself, including the grounded hold conductor C568, which conductor extends to the ringing interrupter. Ground potential is maintained upon the hold conductor C568 by the ringing interrupter during a ringing cycle and, at the end of each ringing cycle, ground potential is removed therefrom in order to restore the pickup relay R530 to normal and thus transfer its control back to the initial energizing circuit, including the PU—1 conductor C257. Thus, just prior to the beginning of each ringing cycle, the pickup relay R530 is operated and is retained in its operated position until the ringing cycle is completed. At its contacts 534, the relay R530 connects ground potential by way of the contacts 438, the conductor C481, the contacts 458, the conductor C255, and the contacts 534 to the conductor C254, in order to provide a reoperating circuit for the lock-pulse relay R240, in the event that the latter relay should be inadvertently restored to normal due to a momentary interruption of the circuit of the line relay R250. At its contacts 532, the relay R530 completes the circuit for transmitting the selected ringing code to the called subscriber line and, at its contacts 533, it completes a circuit for transmitting a ring-back tone signal to the calling subscriber. As a result of the closing of the contacts 532, the selected third code ringing signal is transmitted by way of the wiper 563, the contacts 532, the winding of the ring cutoff relay R520, the contacts 463, 451, 413 and 552, and the wiper 572 in engagement with the contact terminating the negative conductor of the called party line 54, to the grounded ringers at the various substations on the party line connected to the negative line conductor. The ringers at the various substations respond to the ringing code transmitted over the above-traced circuit, but since the selected code is indicative of a call for the subscriber at substation B1 the subscriber thereat answers the call by removing his receiver from the associated telephone switchhook. Before describing the operation of the connector 200 in response to the answering of a call by the subscriber at substation B1, attention is directed to the fact that at the end of each ringing code cycle the pickup relay R530 is restored, in the manner described above, to interrupt the ringing circuit, at its contacts 532, and to apply a resistance battery potential by way of the contacts 531 to the negative conductor of the called line in order to discharge the ringing condensers included in the substation circuits of each of the subscribers on the called line. Furthermore, in order to indicate to the calling subscriber at substation A1 that the desired called subscriber is being signaled, the relay R530, upon each operation thereof, at its contacts 533, transmits a ring-back tone signal by way of the conductor C483, the contacts 471 and 533, the ring-back tone condenser 581, the contacts 342, 331 and 321, the condenser 385, the contacts 313', and the conductor C41 connected to the calling subscriber at substation A1. Attention is also directed to the fact that ground potential is applied by way of the contacts 466, 453, 416 and 554, and the wiper 573 and the engaged contact in the associated contact bank terminating the positive conductor of the called party line. Since, in the present call, it has been assumed that the called line is arranged for divided ringing with the grounded ringers at the respective substations connected either to the negative or to the positive line conductors, the ground potential connected over the above-traced circuit has no function to perform in the present call. This circuit is normally utilized in providing a return path for the ringing current transmitted over a selected called line when the ringers at the various substations thereon are bridged between the negative and positive conductors of said line.

When the called subscriber at substation B1 answers the call a direct current bridge circuit is established between the negative and positive conductors of the called party line 54 in order to terminate the transmission of the selected ringing code sigal. This circuit may be traced from ground by way of the contacts 466, 453, 416 and 554, the wiper 573, and the direct current bridge circuit including the positive and negative conductors of the called party line 54. The return path for this circuit includes the wiper 572, the contacts 552, 413, 451 and 463, the winding of the ring cutoff relay R520, and either by way of the contacts 532 to the battery connected ringing generator or by way of the contacts 531 to resistance battery, depending upon whether the called subscriber has answered during a silent period of the ringing code cycle or during a ringing period of said cycle. In either case the ring cutoff relay R520 operates and, at its contacts 521, completes a circuit for operating the ring cutoff slave relay R450. The latter circuit may be traced from ground, by way of the contacts 232, the conductor 256, the contacts 435 and 521, and the upper winding of the ring cutoff slave relay R450, to battery. The relay R450, upon operating, at its contacts 452′, completes a locking circuit for itself which includes its lower winding, the contacts 452′, the minor switch off-normal contacts 566, and ground at the contacts 428. As a further result of the operation of the relay R450, at its contacts 451 and 453, it interrupts points in the circuit for the ring cutoff relay R520 and also interrupts the circuit over which the ringing code signal is transmitted to the called subscriber line. At its contacts 452 and 454, the relay R450 connects the previously described direct current circuit, including the called subscriber party line, to the circuit including the upper and lower windings of the answer relay R270. This circuit may be traced from ground by way of the contacts 414 and 421, the lower winding of the answer relay R270, the contacts 334, 454, 416 and 554, the wiper 573 and the direct current loop including the called party line 54, the wiper 572, the contacts 552, 413, 452, 331 and 412 and the upper winding of the relay R270, to battery, whereupon the relay R270 operates.

In addition to disconnecting the ringing current in operating the answer relay R270, in the manner described above, the relay R450, at its contacts 455, prepares a point in an incomplete circuit for controlling the lower winding of the timing relay R510; at its contacts 456, it interrupts a point in the previously traced impulsing circuit for the lower winding of the transfer control relay R230 and the minor switch stepping magnet 561; at its contacts 458, it interrupts a point in the circuit for applying ground potential to the conductor C255, whereupon the lock-pulse relay R240 restores to normal; at its contacts 451′, it prepares a point in the circuit for applying ground potential to the release control relay R260 in the event the timing relay R510 and the timing disconnect relay R470 are in their operated positions; at its contacts 455′, it prepares a point in an incomplete circuit for controlling the lower winding of the timing disconnect relay R470 in the event a reverting call has been extended by the calling subscriber; at its contacts 456′, it interrupts a point in the circuit for the pickup relay R530 to prevent further operation of the latter relay under control of a ground pulse transmitted over the PU—1 conductor C257; and finally, at its contacts 457′ and 458′, it interrupts points in the previously traced circuits for applying ground potential respectively to the motor start conductor C486 and the generator start conductor C485, thus terminating further operation of the ringing interrupter and the ringing current generator.

When the answer relay R270 is operated, in the manner described above, at its contacts 271 to 274, inclusive, it reverses the battery and ground connection, including the upper and lower windings of the line relay R250, to the negative and positive conductors C41 and C42 extending to the calling subscriber line. Since the present call originated at a subscriber substation, the reversal of the direction of current flow over the calling line has no function to perform at the present time. However, it should be understood that if the call had originated at an operator position the reversal of current would be utilized to give the calling operator the usual answering supervisory signal. As a further result of the operation of the relay R270, at its contacts 275, it provides a circuit whereby the ring cutoff slave relay R450 may be operated in the event a subscriber on a called party line removes his receiver before the operator has dialed the final digit of the desired called number. In the present call this circuit has no function to perform since the call was initiated by a regular subscriber. When the lock-pulse relay R240 restores to normal, at its contacts 241, it applies ground potential from the contacts 473 to the conductor C259 in order to prepare a locking circuit for the lower winding of the timing relay R510.

Following the answering of the call by the subscriber at substation B1, a conversational connection is established between the calling subscriber at substation A1 and the called subscriber at substation B1, over a path which may be traced from the calling subscriber at substation A1, the line circuit 20, the conductors C31 and C32, the wipers 312 and 313, the finder 300, the negative and positive conductors C41 and C42, the contacts 313′ and 315′, the condensers 385 and 386, the contacts 321 and 323, 331 and 334, 452 and 454, 413 and 416, 552 and 554, the wipers 572 and 573, the negative and positive conductors extending to the line circuit 50, the called party line 54, and the substation B1 of the called subscriber. In this regard it will also be noted that talking battery is applied to the conductors of the calling subscriber line through the windings of the line relay R250 and that talking battery is applied to the conductors of the called party line through the windings of the answer relay R270.

From the foregoing explanation of operation of the connector 200 it will be understood that when the first digit of the directory number is the digit "2" and the last digit is an odd numbered digit, the relay R460 is in its normal position so that the ringing code will be transmitted over the negative conductor of the called subscriber line. It will also be understood that if the first digit is the digit "2" and the last digit is an even numbered digit, the relay R460 is in its operated position so that ringing code will be transmitted over the positive conductor of the called subscriber line. In the event that the first digit dialed by the calling subscriber is the digit "3" and the last digit is odd, the pickup select relay R220 is operated and the busy test relay R460 is in its normal position, whereby the ground pulse transmitted over the PU—2 conductor C258 is utilized to control the pickup relay R530. Inasmuch as the PU—2 conductor is utilized to control the pickup relay R530, the second group of ten ringing codes is applied to the contacts associated with the wiper 563 of the minor switch 560 and ringing current is thus transmitted over the negative conductor of the selected called line. In the event the first digit dialed by the calling subscriber is the digit "3" and the last digit is an even numbered digit, in addition to the foregoing relays the relay R460 is also operated so that the selected ringing code will be transmitted over the positive conductor of the selected called line.

Attention is also directed to the fact that when the first digit of a called subscriber directory number is either the digit "2" or the digit "3," the wiper switching relay R550 remains in its normal position so that the connection is extended by way of the wipers 571 to 575, inclusive, of the connector 200 to called lines which are terminated in the first hundred group 570 of associated bank contacts. In the event that the first digit of the called subscriber number is either the digit "4" or "5," the ringing code is transmitted in the same manner as has been described above in connection with the dialing of the respective digits "2" and "3," but in addition to the relays mentioned in the previous description the wiper switching relay R550 is also operated so that the connection established with a called line will be extended by way of the wipers 576 to 578, inclusive, and the second hundred group 580 of bank contacts instead of by way of the wipers 571 to 575, inclusive. It should also be understood that when the pickup relay R530 is controlled by the ground pulse transmitted over the PU—1 conductor C257, a selected one of the ten ringing codes will be transmitted to a called subscriber line, and that when the relay R530 is controlled by a ground pulse transmitted over the PU—2 conductor C258, since the last-mentioned pulse occurs a short preliminary ringing period before the remaining portion of the code is transmitted by the ringing apparatus, the short ringing interval, which precedes the main portion of the selected code, is introduced in order to provide a different ringing code. Accordingly, ten ringing codes may be selected by the minor switch R560 when the pickup relay R530 is controlled over the PU—1 conductor C257, and ten different ringing codes may be selected by the minor switch 560 when the pickup relay R530 is controlled over the PU—2 conductor C258. With this arrangement, twenty different ringing codes may be transmitted to signal twenty different subscriber substations located on a twenty party line.

*Release*

The release of the connection as set up between the calling subscriber at substation A1 and the called subscriber at substation B1 is entirely under control of the calling subscriber. Thus, if the connection is released at the called subscriber substation B1 prior to its release by the calling subscriber at substation A1, the only resulting operation in the connector 200 is the restoration of the answer relay R270 to its normal position. More particularly, when the called subscriber at substation B1 interrupts the loop circuit thereat, including the positive and negative line conductors of the party line 54, by restoring the receiver at the substation upon the associated switchhook, the energizing circuit, traced hereinbefore, for the answer relay R270 is interrupted and the relay restores to normal. Upon restoring, the relay R270, at its contacts 271 to 274, inclusive, again reverses the battery potential and ground potential connected to the negative and positive talking conductors C41 and C42 in order to give disconnect supervision in the event that the connection originated from an operator position. In the present call, however, the reversal of battery has no function to perform. As a further result of the restoration of relay R270, at its contacts 275, it interrupts a point in a circuit for controlling the ring cutoff slave relay R450, but this relay in the present call is retained in its operated position over a locking circuit, including its lower winding.

When the calling subscriber at substation A1 releases the connection by restoring the receiver upon the switchhook of the associated telephone instrument, the loop circuit, including the negative and positive talking conductors C41 and C42, is interrupted and thereby causes the line relay R250 in the connector 200 to restore to normal. Upon restoring, the relay R250, at its contacts 253, interrupts a point in the circuit for controlling the lock-pulse relay R240 but this relay at the present time is in its restored position, as has been previously noted. Also, at its contacts 252, the relay R250 interrupts a point in the energizing circuit for the release control relay R260 which slowly restores to normal.

When the release control relay R260 restores, at its contacts 261, it interrupts the circuit for the control relay R370, whereupon the holding ground potential applied to the control conductor C43 is removed therefrom and the control relay R370 restores to normal. Furthermore, when the ground potential is removed from the conductor C43, the previously described circuit including the contacts 311″, 345, 262, and in multiple therewith the contacts 437, the contacts 222 if the relay R220 is in its restored position or the winding of the relay R220 in the event it is in its operated position, and the lower winding of the hold relay R430, is interrupted. Thus, as soon as the release control relay R260 restores to normal, it interrupts the circuit for the hold relay R430 and, in the event the pickup select relay R220 is operated, these two relays will now restore to normal.

When the hold relay R430 restores to normal, at its contacts 431, it interrupts the previously described preenergizing circuit for the upper winding of the line relay R250; at its contacts 432, it interrupts a point in the previously described impulsing circuit for controlling the minor switch stepping magnet 561, the vertical magnet 380 and the rotary magnet 382; and, at its contacts 433, it interrupts a point in the circuit for applying ground potential by way of the wiper 574 to the cutoff relay (not shown) in the line circuit 50, thereby to permit the last-mentioned relay to restore and to remove the busy marking condition from the calling line. Also, at its contacts 434, the relay R430 reapplies ground potential to the conductor C254; and at its contacts 438, it removes ground potential from the conductor C481, thereby interrupting the locking circuits for the last digit relay R410, the control relay R540, and the wiper switching relay R550 in the event that it has been operated, and any other relays which may be locked to this conductor. As a further result of the restoration of the relay R430, at its contacts 432', it prepares a point in an incomplete circuit for controlling the minor switch release magnet 562 and, at its contacts 433' to 436', inclusive, it interrupts points in the circuits for respectively controlling the timing relay R510, the supervisory start conductor C484, the motor start conductor C486, and the generator start conductor C485. As soon as the last digit relay R410 restores to normal, at its contacts 411', it completes a circuit including the contacts 314'', 411', 432', and 453', the minor switch off-normal contacts 565, and the winding of the minor switch release magnet 562, whereby the latter magnet is operated in order to restore the wipers 563 and 564 to their normal resting positions. Also, at its contacts 413 and 416, the relay R410 interrupts a point in the previously traced talking circuit, including the calling and called lines involved in the connection.

As soon as the wipers 563 and 564 of the minor switch 560 are restored to their normal positions the minor switch off-normal contacts 565 are opened, thereby to interrupt the above-traced energizing circuit for the release magnet 562 which now restores to normaal. As a further result of the restoration of the minor switch wipers to their normal positions, the minor switch off-normal contacts 566 are opened thereby to interrupt the previously traced locking circuits for the lower windings of the vertical transfer relay R420 and the ring cutoff slave relay R450, which relays now restore to normal. As soon as the relay R420 restores to normal, at its contacts 428, it interrupts a further point in the locking circuit for the above-mentioned relays R420 and R450 and, at its contacts 421', it interrupts a further point in the circuit for controlling the pickup relay R530. As soon as the ring cutoff slave relay R450 restores to normal, at its contacts 452', it interrupts a further point in its locking circuit and, at its contacts 454', it completes a circuit including the contact 314'', 411', 432' and 454', the vertical off-normal contacts 491, and the winding of the release magnet 490. The release magnet 490 now operates and causes the wipers 571 to 578, inclusive, of the connector 200 to be restored to their normal vertical and rotary positions, in a well known manner. As soon as the wipers are restored to normal the vertical off-normal contacts 491 are opened, thereby to interrupt the above-traced energizing circuit for the release magnet 490, which now restores to normal; the vertical off-normal contacts 394 are opened, thereby to interrupt the energizing circuit for the rotary transfer relay R350 which also restores to normal; and the vertical off-normal contacts 492 are reclosed in order to prepare a point in the circuit for transmitting the dial tone signal to a calling subscriber. Attention is also directed to the fact that as soon as the wipers of the connector 200 are restored to normal in a rotary direction, the rotary off-normal contacts 569 are opened, thereby to interrupt a further point in the previously traced locking circuit for the control relay R540 which, at the present time, is in its restored position. When the rotary transfer relay R350 restores to normal, at its contacts 358, it interrupts a further point in its locking circuit and, at its contacts 357, it reapplies battery potential by way of the upper non-inductive resistance winding of the relay R530 to the control conductor C43, thereby to mark the connector as idle in the event it is used in a selector system employing selectors of the battery searching type. In the present system the connector 200 constitutes the connector portion of a finder-connector link and the battery potential applied to the conductor C43 has no function to perform. Following the restoration of the relay R350 the connector 200 is fully restored to normal and is available for the next call.

Referring now to the schematically illustrated finder 300 and the schematically illustrated line circuit 20, attention is directed to the fact that when ground potential is removed from the conductor C43, the finder 300 and the cutoff relay (not shown) in the line circuit 20 are restored to normal, in the manner described in detail in the above-mentioned Lomax application, and the busy marking ground potential is also removed from the line circuit 20, thereby to render the party line, including the substations A1 to A20, inclusive, accessible to connectors having access thereto. The apparatus involved in the connection established between the calling subscriber at substation A1 and the called subscriber at substation B1 has now been restored to normal and may be utilized in the extension of further calls.

*Private branch exchange calls*

The manner in which calls may be routed through the finder-connector link, comprising the finder 300 and the connector 200, to an idle P. B. X trunk in a group of trunks, extending to the operator switchboard in the private branch exchange 65, is substantially the same as the operation thereof when a connection is extended to a called subscriber line. In considering this type of service it may be assumed that a group of P. B. X trunks, including the trunk 55, is terminated in the tenth level of the contact bank in the first hundred group 570 of bank contacts associated with the connector 200. It may also be assumed that the subscriber at substation A1 desires to extend a connection over an idle one of the P. B. X trunks to the P. B. X operator and, in accordance with the usual procedure, the operator at the P. B. X switchboard will extend the connection manually to the desired called subscriber whose line is terminated in the P. B. X switchboard. Consequently, when the calling subscriber at substation A1 removes his receiver, the finder 300 is operated, in the manner previously described, and the connector 200 is conditioned to respond to the directory number designating the P. B. X group of trunks. For the purpose of describing the operation of the connector 200 to extend the connection to an idle P. B. X trunk, it will be assumed that the group consists of ten trunks extending to the P. B. X switchboard and that the directory number thereof is "2011."

When the two impulses of the first digit "2" are dialed into the connector 200, the minor switch stepping magnet 561 operates, in the manner previously described, to position the wipers 563 and 564 into engagement with the second contacts in the associated contact banks. At the end of the digit, and when the transfer control relay R230 restores to normal, the vertical transfer relay R420 is operated, in the manner previously described, in order to transfer the impulsing circuit, including the conductor C259, from the minor switch stepping magnet 561 to the vertical magnet 380.

When the ten impulses of the second digit "0" are dialed into the connector 200 the vertical magnet 380 is operated ten times and thus elevates the wipers 571 to 578, inclusive, to a position opposite the tenth level of the associated contact banks, that is to the level in which the ten trunks in the P. B. X group are terminated. Shortly following the last impulse of the second digit "0" the transfer control relay R230 restores to normal and completes the previously described circuit including the vertical off-normal contacts 394, whereby the rotary transfer relay R350 is operated to transfer, at its contacts 353 and 354, the impulsing circuit, including the conductor C259, from the vertical magnet 380 to the rotary magnet 382. As a further result of the operation of the relay R350, at its contacts 351', it completes the previously described operating circuit for the minor switch release magnet 562, whereupon the wipers 563 and 564 of the minor switch 560 are restored to their normal resting positions. As soon as the wipers 563 and 564 restore to their normal resting positions, the minor switchoff-normal contacts 565 are opened in order to interrupt the circuit for the minor switch release magnet 562 which restores to normal, and the minor switch off-normal contacts 566 are opened, thereby to interrupt the initial circuit for the vertical transfer relay R420, but this relay remains in its operated position over a locking circuit which includes its lower winding, and the contacts 547', 436' and 357'.

When the one impulse of the third digit "1" is dialed into the connector 200, a single impulse is transmitted over the impulsing conductor C259 to the rotary magnet 382, in the manner previously described. The rotary magnet 382, upon operating, rotates the wipers 571 to 578, inclusive, of the connector 200 into engagement with the first set of contacts in the associated contact banks. In the present example it is assumed that the first trunk of the P. B. X trunk group is terminated in the set of bank contacts engaged by the wipers 571 to 575, inclusive. Incident to the rotary off-normal movement of the above-mentioned wipers, the rotary off-normal contacts 569 are closed in order to prepare a point in the circuit for the control relay R540. Shortly following the single impulse of the third digit "1" dialed into the connector 200, the transfer control relay R230 restores to normal and completes, at its contacts 232, a circuit including the conductor C256, the contacts 435 and 544, and the rotary off-normal contacts 569 for operating the control relay R540. The latter relay, at its contacts 545, completes a locking circuit for itself including the grounded conductor C481. As a further result of the operation of the control relay R540, at its contacts 542, it prepares a point in a test circuit, including the wiper 574, and, at its contacts 547', it interrupts the previously mentioned locking circuit for the lower winding of the vertical transfer relay R420, which now restores to normal. When the vertical transfer relay R420 restores to normal, at its contacts 423, it again prepares the impulsing circuit for controlling the minor switch stepping magnet 561; at its contacts 424, it interrupts a point in the impulsing circuit over which the vertical magnet 380 and the rotary magnet 382 were controlled; finally, at its contacts 426, it completes the previously mentioned test circuit, including the wiper 574, for controlling the trunk hunting relay R440.

In the event the first P. B. X trunk in the tenth level engaged by the wipers 571 to 575, inclusive, is idle at the time it is selected, the C conductor terminating in the bank contact engaged by the C wiper 574 is marked with negative battery potential so that the test circuit, including the contacts 556, 318', 542, 461', 426 and 365 for the upper winding of the trunk hunting relay R440 is ineffective to operate the last-mentioned relay. Attention is directed to the fact that the above-mentioned contact engaged by the wiper 574 is jumpered by means of the "X" jumper to the corresponding EC contact engaged by the EC wiper 575. These contacts of each of the first nine trunks in the P. B. X trunk group are jumpered, by means of an "X" jumper as described above, in order to control automatic step-by-step movement of the wipers in the event the trunks are busy. The last or tenth trunk in the P. B. X group is not jumpered, in the manner described above, in order to prevent further rotation of the wipers when all of the ten trunks in the P. B. X group are busy. Consequently, if all ten P. B. X trunks are busy, the wipers of the connector 200 will be automatically rotated to the last trunk in the group and the connector 200 will be controlled to transmit a busy tone signal to the calling subscriber.

Since it has been assumed that the first P. B. X trunk in the selected group is idle, the trunk hunting relay R440 remains in its restored position and the final digit "1" may be dialed into the connector 200 in order to select the particular ringing code to be utilized to signal the P. B. X operator.

Before describing the operation of the connector 200 as a result of the dialing of the fourth digit "1," it will now be assumed that the first P. B. X trunk in the selected group is busy when the wipers 574 and 575 engage the respective C and EC contacts thereof. Ground potential will be encountered by the wipers 574 and 575 when the selected P. B. X trunk is busy, and a circuit will be completed, as traced above, for energizing the upper winding of the trunk hunting relay R440. When the trunk hunting relay R440 is operated from the ground potential supplied from the busy P. B. X trunk, at its contacts 441, it interrupts a point in the incomplete circuit for transmitting a busy tone signal to the calling subscriber; at its contacts 442, it prepares a point in an alternative circuit for controlling the rotary magnet 382; and, at its contacts 444, it completes a circuit for operating the upper winding of the busy test relay R460, which may be traced from the grounded wiper 574 by way of the contacts 556, 318', 542 and 444, and the upper winding of the relay R460, to battery. A branch of this circuit also extends by way of the contacts 461', 426 and 365 and the upper winding of the relay R440, to battery. The contacts 461' of the relay R460 are so adjusted that these contacts are the last to be opened when the relay R460 operates, and thus maintain the above-traced holding circuit for the relay R440 until the remaining contacts of the relay R460 have been actuated. Furthermore, the relay R440 is a slow-to-release type relay and thus maintains its contacts closed for a short interval of time after its circuit is opened, at the contacts 461'. As soon as the relay R460 operates and closes its contacts 469, the busy marking ground potential applied to the bank contact engaged by the wiper 574 is extended by way of the "X" jumper to the bank contact engaged by the wiper 575, and then by way of the contacts 551', 469, 447 and 221, one branch extending by way of the lower winding of the relay R440, to battery, in order to maintain the latter relay in its operated position, and the other branch extending by way of the contacts 383 and the upper winding of the rotary interrupter relay R210, to battery, thereby to operate the last-mentioned relay.

The rotary interrupter relay R210, upon operating, at its contacts 213, completes a locking circuit for itself and for the lower winding of the relay R440 which may be traced from ground, by way of the contacts 438, to the conductor C481 and the contacts 545 and 213, one branch extending to the lower winding of the relay R440 and the other branch extending by way of the contacts 383 to the upper winding of the relay R210. As a further result of the operation of the relay R210, at its contacts 212, it completes a circuit for operating the rotary magnet 382 which may be traced from ground by way of the contacts 232, 212 and 442, and the winding of the rotary magnet 382, to battery. When the rotary magnet 382 is thus energized it steps the wipers of the connector 200 into engagement with the second set of contacts in the selected level terminating the second trunk in the P. B. X trunk group. Furthermore, at its contacts 383, the rotary magnet 382 interrupts a point in the above-traced circuit for the rotary interrupter relay R210, which now restores to normal. Upon restoring to normal, the relay R210, at its contacts 213, interrupts a point in the previously traced locking circuit for itself and for the lower winding of the trunk hunting relay R440 and, at its contacts 212, interrupts a point in the above-mentioned circuit for operating the rotary magnet 382 which also restores to normal. Incident to the restoration of the rotary magnet 382, at its contacts 383, it again prepares a point in the circuit for operating the rotary interrupter relay R210 and the lower winding of the trunk hunting relay R440, in the event the second trunk in the P. B. X group is busy.

In the event that the second P. B. X trunk in the selected group is also busy, ground potential is again encountered by the wipers 574 and 575, thereby to reoperate the busy test relay R460, in the event it has restored to normal, and to maintain the trunk hunting relay R440 in its operated position. Consequently, the rotary interrupter relay R210 is reoperated to cause an additional operation of the rotary magnet 382, in the manner previously described. Thus, the wipers of the connector 200 are advanced an additional step in the rotary direction into engagement with the third set of contacts terminating the third trunk in the selected P. B. X trunk group. The above-described sequence of operations is repeated each time a busy P. B. X trunk is encountered as the wipers are advanced step by step in a rotary direction, and when an idle trunk is encountered the battery potential applied to the contact engaged by the wiper 574 prevents reoperation of the busy test relay R460 and short-circuits the upper winding of the trunk hunting relay R440. Further rotation of the wipers of the connector 200 is thus prevented.

When the fourth digit "1" of the directory number of the P. B. X group of trunks is dialed into the connector 200, a single pulse is transmitted over the impulsing conductor C259 by way of the contacts 317', 432, 456 and 423 to the minor switch stepping magnet 561. The magnet 561 now operates to rotate the wipers 563 and 564 into engagement with the first set of contacts in the associated contact banks. When the wipers of the minor switch 560 are moved from their normal resting positions the minor switch off-normal contacts 565 are closed in order to prepare a point in the circuit for the minor switch release magnet 562, and the minor switch off-normal contacts 566 are closed in order to again prepare a point in the circuit for the lower winding of the vertical transfer relay R420. At the end of the fourth digit the relay R230 restores and reapplies ground to the conductor C256 and relay R420 operates. Upon operating, the relay R420, at its contacts 421, prepares a point in the circuit for transmitting a busy tone signal to the calling subscriber, but inasmuch as the particular P. B. X trunk is idle at the present time, the relay R460 is in its deenergized position and the busy tone circuit is opened at the contacts 465. Also, at its contacts 423, the relay R420 interrupts a point in the above-described circuit for controlling the minor switch stepping magnet 561 and, at its contacts 427, it completes a circuit for operating the last digit relay R410. This circuit may be traced from ground by way of the contacts 433 and 443, the lower winding of the relay R410, the contacts 327, 356, 427, 461', 542, 318' and 556, and battery potential applied to the bank contact engaged by the wiper 574 through the winding of the cutoff relay (not shown) in the line circuit 51 individual to the selected idle P. B. X trunk. Upon operating, the relay R410, at its contacts 419, completes a locking circuit for its upper winding, including the grounded conductor C481. Also, at its contacts 417, the relay R410 applies ground potential by way of the contacts 433, 443, 417, 418' and 556 to the wiper 574 in order to mark the selected P. B. X trunk busy to all other connectors having access thereto. At its contacts 413 and 416, the relay R410 prepares points in the talking circuit of the connector 200; at its contacts 412 and 414, it prepares points in the circuit for the answer relay R270; and, at its contacts 415, it interrupts a further point in the circuit over which busy tone is transmitted to the calling subscriber. From this point the manner in which the selected ringing code is transmitted over the P. B. X trunk to energize the drop or other signal, individual thereto and provided at the P. B. X switchboard, is exactly the same as described hereinbefore with reference to the signaling of the called subscriber at substation B1. Since the final digit dialed into the connector 200 has positioned the minor switch wiper 563 into engagement with the first contact in its associated contact bank, the first ringing code, which is usually a long single ring, is transmitted over the selected P. B. X trunk to the signaling device at the P. B. X switchboard.

When the P. B. X operator answers the call the ring cutoff relay R520, the ring cutoff slave relay R450 and the answer relay R270 are operated in order to terminate the transmission of the ringing signal and to complete the talking connection between the calling subscriber at substation A1 and the P. B. X operator position. The calling subscriber now informs the P. B. X operator that he desires to talk to a particular subscriber whose line is terminated in the P. B. X switchboard, whereupon the operator, by means of a cord circuit (not shown) signals the desired subscriber in the P. B. X exchange and completes the connection in a well known manner.

In describing the operation of the connector 200 the automatic trunk hunting feature was described prior to the detailed description of the operation as a result of the dialing of the final digit "1." However, it should be understood that these two operations may be performed simultaneously without interfering with each other. In other words, the calling subscriber may dial the final digit of the P. B. X directory number and thus control the minor switch 560 at the same time the rotary interrupter relay R210 and the rotary magnet 382 cooperate to advance the wipers step by step to select an idle P. B. X trunk. Thus, if all of the trunks in a selected group are busy, and the wipers of the connector engage the last or tenth busy trunk in the group, the busy test relay R460 remains in its operated position and the trunk hunting relay R440 restores to normal. If the final digit "1" has been dialed prior to the time that the wipers of the connector engage the last busy trunk in the selected P. B. X group, the vertical transfer relay R420 will also be in its operated position but the last digit relay R410 will remain in its deenergized position. The relay R410 is not operated when a busy condition is encountered by the wiper 574 of the connector 200 and, consequently, the busy tone signal applied to the conductor C487 is extended by way of the contacts 465, 441, 415 and 421, and the lower winding of the answer relay R270, and then over the previously traced path to the calling subscriber. On the other hand if the trunk hunting operation is completed before the final digit "1" is dialed into the connector 200, the busy tone signal will not be transmitted until the vertical transfer relay R420 operates shortly after the single impulse of the last digit is received. From the foregoing it will be understood that the busy tone signal is transmitted to the calling subscriber either at the end of an unsuccessful P. B. X trunk hunting operation or upon the completion of the dialing of the fourth digit, depending upon which of these two operations happens last.

*Night service*

In the foregoing description of the operation of the connector 200 an idle trunk extending to the P. B. X switchboard was automatically selected in response to the dialing of the directory number "2011" designating the group of ten P. B. X trunks extending to the P. B. X switchboard 65. Furthermore, the P. B. X operator at this switchboard completed the connection, by means of the cord circuit provided at her position, to the particular called subscriber line terminating in the said switchboard. Since P. B. X facilities are usually provided in business establishments having a greater number of subscriber lines than trunks terminating in the switchboard, a considerable saving is made to the business establishment by handling the calls to and from said subscriber lines by way of the P. B. X trunks. It is also the usual practice in this type of arrangement that the P. B. X switchboard be attended by an operator during the business hours of the day, and before going off duty at the end of the day the operator plugs her cord circuits to the ten P. B. X trunks terminating in the switchboard and to ten subscriber lines serving certain key individuals in the business establishment, whereby night service is provided for such lines. In order to permit direct connections to such preferred subscriber lines the connector 200 is arranged so that calls may be selectively extended over the different trunks in the P. B. X group to a particular called subscriber line arranged for night service. This permits different directory numbers to be utilized for day and night service respectively, the first directory number being utilized when the P. B. X operator is attending the P. B. X switchboard and the latter directory numbers being assigned to the individual subscriber lines provided with night service. In the present example, the directory number of the P. B. X group, as noted above, is "2011" and when night service is provided the directory numbers of the ten P. B. X trunks are respectively "3011," "3021," "3031," "3041," "3051," "3061," "3071," "3081," "3091" and "3001."

If the first digit "3" is dialed into the connector 200, the wipers of the minor switch 560 are positioned into engagement with the third contacts in the associated contact banks and the pickup relay R220 is operated, in the manner previously described, to transfer, at its contacts 223 and 224, the control of the pickup relay R530 from the PU—1 conductor C257 to the PU—2 conductor C258. In addition to the above, at its contacts 221, the relay R220 interrupts the previously traced circuit including the EC wiper 575, whereby the rotary interrupter relay R210 was controlled to cause the rotary magnet 382 to advance the wipers of the connector 200 to select an idle trunk in a selected P. B. X group. Since the relay R220 has been operated by the first digit "3" dialed into the connector 200, the automatic trunk hunting action of the connector 200 is suppressed. Consequently, the connector 200 will respond to the second digit "0" to advance the wipers to the tenth level and will respond to the variable third digit to rotate the wipers into engagement with the particular set of contacts in the selected tenth level corresponding to the third dialed digit. The fourth and final digit is the digit "1" and the minor switch 560 responds, in the manner previously described, to cause the first code of the second group of ten ringing codes to be transmitted over the selected P. B. X trunk in order to signal the particular subscriber connected thereto via the P. B. X switchboard 65. In the event the particular selected P. B. X trunk line is busy when the wipers of the connector 200 are positioned into engagement therewith, the busy tone signal will be transmitted to the calling subscriber in the same manner as when a call is extended to a busy regular subscriber line.

*Trunk calls*

In considering the operation of the connector 200 automatically to select an interoffice trunk and to switch a calling loop circuit through to the repeater associated with the selected trunk, it will be assumed that the above-described call originating at the substation A1 is intended to be extended to a toll operator position in the central office 61. It will be further assumed that the directory number "0" is assigned to the group of toll trunks interconnecting the instant exchange with the central office 61. After a call is extended from the calling subscriber at substation A1 to the connector 200, in the manner previously described, and when the single digit "0" is dialed thereinto, ten current pulses are transmitted to the line relay R250. The line relay R250 and the lock-pulse relay R240 function, in the manner previously described, to transmit ten current pulses over the impulsing circuit including the conductor C259 to the minor switch stepping magnet 561. The first six pulses transmitted over the impulsing conductor C259 control the magnet 561 to advance the minor switch wipers 563 and 564 into engagement with the sixth contacts in their respective banks. During the transmission of the above-mentioned six impulses and during the transmission of the remaining four of the ten impulses the transfer control relay R230 remains in its operated position, but the minor switch stepping magnet 561 responds only to the first six impulses while the vertical magnet 380 responds to the last four of the ten impulses. More specifically, when the magnet 561 energizes in response to the sixth impulse and advances its wipers into engagement with the sixth contacts in their associated contact banks, a circuit is prepared for energizing the upper winding of the vertical transfer relay R420 in series with the lower winding of the rotary interrupter relay R210. As soon as the line relay R250 operates at the end of the sixth impulse, at its contacts 252, it completes the above-mentioned circuit for the relays R420 and R210, which may be traced from ground by way of the contacts 473, 252 and 543', the sixth contacts in the banks of the minor switch 560 bridged by the wiper 564, the contacts 546, the upper winding of the relay R420, and the lower winding of the relay R210, to battery. When this circuit is completed the relays R420 and R210 operate in series and the relay R420, at its contacts 428, immediately completes a locking circuit for itself which may be traced from ground by way of the contacts 428, the minor switch off-normal contacts 566, and its lower winding, to battery. As a further result of its operation, the relay R420, at its contacts 423, interrupts the impulsing circuit for the minor switch stepping magnet 561 and completes, at its contacts 424, the impulsing circuit for the vertical magnet 380. The rotary interrupter relay R210 operates and restores each time the above-traced series circuit, including its lower winding and the upper winding of the relay R420, is completed. The remaining four impulses of the ten impulses dialed by the calling subscriber are now transmitted to the vertical magnet 380. Each time the vertical magnet 380 is energized over the previously traced impulsing circuit it completes, at its contacts 381, the previously described circuit for controlling the lock-pulse relay R240. In addition thereto the vertical magnet 380 advances the wipers of the connector 200 step by step in a vertical direction so that at the end of the fourth impulse transmitted thereto the wipers 571 to 578, inclusive, are positioned opposite the fourth level of contacts in the associated contact banks. The fourth level of the associated contact banks accessible to the wipers 571 to 575, inclusive, terminates the group of trunks extending to the toll operator position at the central office 61. At the end of the tenth impulse of the digit "0" transmitted by the calling subscriber, the line relay R250 reoperates and, at its contacts 252, completes the previously traced series circuit for the upper winding of the vertical transfer relay R420 and the rotary interrupter relay R210. Shortly following the last impulse of the digit "0" transmitted over the impulsing conductor C259 to the multiply connected vertical magnet 380 and the transfer control relay R230, the last-mentioned relay restores to normal and, at its contacts 232, it completes a circuit for energizing the lower winding of the trunk hunting relay R440 in multiple with the upper winding of the rotary interrupter relay R210. This circuit may be traced from ground by way of the contacts 232, the conductor C256, and the contacts 435, 544 and 213, one branch extending by way of the lower winding of the trunk hunting relay R440, to battery, and the other branch extending by way of the contacts 383 and the upper winding of the rotary interrupter relay R210, to battery. The relay R440 operates when the above-traced circuit is completed and, at its contacts 444, prepares a busy test circuit including the wiper 574 and the upper winding of the busy test relay R460; at its contacts 447, it prepares a point in the previously traced circuit including the EC wiper 575; and, at its contacts 442, it completes a circuit for operating the rotary magnet 382, thereby automatically to rotate the wipers of the connector into engagement with the first set of contacts in the fourth level. The last-mentioned circuit may be traced from ground by way of the contacts 232, the conductor C256, the contacts 212 and 442, and the winding of the rotary magnet 382, to battery. The rotary magnet, upon operating, rotates the wipers of the connector 200 into engagement with the first set of contacts in the associated contact banks, whereupon a test circuit will be completed to determine whether or not the first trunk extending to the central office 61 is idle and available for use or is busy. As a further result of the operation of the rotary magnet 382, at its contacts 383, it interrupts a circuit for the lower winding of the trunk hunting relay R440 and it interrupts a point in the previously traced circuit for the upper winding of the relay R210, but this relay remains in its operated position over the previously traced circuit including its lower winding. As soon as the wipers of the connector 200 are advanced in a rotary direction away from their normal rotary resting positions, the rotary off-normal contacts 569 are closed and a circuit is immediately completed for operating the control relay R540, which may be traced from ground by way of the contacts 232, the conductor C256, the contacts 435 and 544, the rotary off-normal contacts 569, and the winding of the relay R540, to battery. Upon operating, the relay R540, at its contacts 544, interrupts its initial energizing circuit and, simultaneously therewith, it completes a locking circuit for itself, which includes its contacts 545, and the grounded conductor C481. As a further result of its operation, the relay R540, at its contacts 546, interrupts a point in the previously traced series circuit including the upper winding of the vertical transfer relay R420 and the lower winding of the rotary interrupter relay R210. Since the relay R420 is retained in its operated position over a circuit including its lower winding, it does not restore when the circuit including its upper winding is interrupted. The rotary interrupter relay R210, however, now restores to normal and, at its contacts 212, interrupts the previously traced circuit for the rotary magnet 382 which also restores to normal. Incident to the restoration of the rotary magnet 382, at its contacts 383, it again prepares a point in the previously traced circuit for reoperating the relay R210 over a circuit including its upper winding.

If the first toll trunk in the selected fourth level extending to the central office 61 is busy, a busy marking ground potential will be encountered by the C wiper 574 and the EC wiper 575. The ground potential encountered by the wiper 574 is extended by way of the contacts 556, 318', 542, 461', 427 and 355, and the upper winding of the trunk hunting relay R440, to battery. In this manner the slow-to-release trunk hunting relay R440 is retained in its operated position in the event the first trunk is marked with a ground potential to indicate that it is busy. It may be well to mention at this time that in the event the selected trunk is idle a battery potential will be applied to the wiper 574, thereby shunting the upper winding of the relay R440 to cause the relay to restore to its normal position. In its operated position the trunk hunting relay R440, at its contacts 444, extends the busy marking ground potential applied to the wiper 574 by way of the contacts 556, 318′, 542 and 444, and the upper winding of the busy test relay R460, to battery, in order to operate the last-mentioned relay. Upon operating, the relay R460, at its contacts 469, completes a circuit for maintaining the trunk hunting relay R440 in its operated position and for reoperating the rotary interrupter relay R210. This circuit may be traced from the busy marking ground potential applied to the contact engaged by the wiper 574, the associated "X" jumper connected to the EC contact engaged by the wiper 575, and the contacts 551′, 469, 447 and 221, one branch extending by way of the lower winding of the trunk hunting relay R440, to battery, and the other branch extending by way of the contacts 383 and the upper winding of the rotary interrupter relay R210, to battery. As a further result of the operation of the busy test relay R460, at its contacts 461′, which are the last contacts of the relay to be opened, the initial energizing circuit for the upper winding of the trunk hunting relay R440 is interrupted, but the latter relay remains operated over the circuit including its lower winding. Incident to the reoperation of the rotary interrupter relay R210, at its contacts 212, it again completes the previously traced energizing circuit for the rotary magnet 382, whereby the wipers are advanced an additional step into engagement with the second set of contacts in the associated contact bank. Thus, it will be seen that under control of the trunk hunting relay R440 and the busy test relay R460, the rotary interrupter relay R210 and the rotary magnet 382 interact, as described above, to advance the wipers of the connector 200 step by step over the contacts in the selected level to search for an idle toll trunk extending to the central office 61. When an idle toll trunk is selected the relays R440 and R460 will restore to normal, thereby to terminate the trunk hunting operation of the connector 200. Incident to the restoration of the relays R460 and R440, a circuit is completed for operating the trunk switch-through relay R310, which may be traced from ground by way of the contacts 433, 443, 543, 353′ and 462′ and the lower winding of the relay R310, to battery. The trunk switch-through relay R310 immediately operates and, at its contacts 312″, completes a locking circuit for its upper winding which includes the contacts 337 and the grounded conductor C43. As a further result of the operation of the trunk switch-through relay R310, at its contacts 311′, 314′, 316′ and 319′, it extends the conductors C40, C41, C42 and C43 through the connector 200 to the respective wipers 571, 572, 573 and 574. These wipers now stand in engagement with a toll trunk extending to the central office 61 which, in the present example, is assumed to be the one illustrated in Fig. 6 which includes the line circuit 53, the repeater 101 and the toll trunk 62 which terminates in the toll operator position in the central office 61. When the calling subscriber loop circuit, including the line circuit 20, the finder 300, the conductors C41 and C42, the contacts 314′ and 316′, 332 and 335, 552 and 554, and the wipers 572 and 573, is switched through to the toll line repeater 101, certain relays in the repeater are operated in order to signal the toll operator in the central office and to return ground potential over the C conductor to the bank contact engaged by the wiper 574. This ground potential applied to the wiper 574 is further extended by way of the contacts 556 and 319′ to the conductor C43 in order to maintain the switch-through relay (not shown) in the finder 300 and the cutoff relay (not shown) in the line circuit 20 in their operated positions. A branch of this circuit is also extended by way of the contacts 261 in order to short-circuit the control relay R370 which now restores to normal. In view of the foregoing, the finder-connector link, comprising the finder 300 and the connector 200, is retained in its operated position under control of the toll operator at the central office 61 through the medium of the repeater 101.

As a further result of the operation of relay R310, at its contacts 313′ and 315′, it interrupts the previously traced loop circuit for the line relay R250 which now restores to normal; at its contacts 317′, it interrupts a point in the previously described impulsing circuit, including the conductor C259; at its contacts 318′, it interrupts a point in the previously traced testing circuit for the relays R440 and R460; at its contacts 311″, it disconnects the grounded conductor C43 from the circuit including the lower winding of the hold relay R430, thereby to cause the latter relay to restore; at its contacts 313″, it completes a circuit for energizing the rotary transfer relay R350; and, finally, at its contacts 314″, it interrupts a point in the circuit for controlling the release magnet 490.

The circuit for operating the rotary transfer relay R350 may be traced from ground by way of the contacts 313″, 331′, 346 and 359, the vertical off-normal contacts 394, and the winding of the relay R350, to battery. Upon operating, the relay R350, at its contacts 358 and 359, simultaneously completes a locking circuit for itself and interrupts its initial energizing circuit. As a further result of the operation of relay R350, at its contacts 351′, it completes a circuit for operating the minor switch release magnet 562 in order to cause the wipers 563 and 564 to be restored to their normal resting positions. This circuit may be traced from ground by way of the contacts 313″, 331′, 346 and 351′, the minor switch off-normal contacts 565, and the winding of the release magnet 562, to battery. Incident to the restoration of the minor switch wipers to their normal resting positions, the minor switch off-normal contacts 565 are opened in order to interrupt the circuit for the release magnet 562, which now restores to normal, and to open the minor switch off-normal contacts 566, thereby to interrupt the previously traced locking circuit for the lower winding of the vertical transfer relay R420, which also restores to normal. Finally, the relay R350, at its contacts 353′, interrupts a point in the previously traced energizing circuit for the lower winding of the trunk switch-through relay R310, but this relay is retained in its operated position over the previously traced locking circuit, including its upper winding.

Incident to the restoration of the line relay R250, at its contacts 253, it interrupts the circuit for the lock-pulse relay R240 which also restores to normal. As a further result of the restoration of the relay R250, at its contacts 252, it interrupts a point in the multiple circuit for the release control relay R260, and when the remaining point in the multiple circuit for the relay R260 is interrupted, at the contacts 242, the release control relay R260 slowly restores to normal.

When the hold relay R430 restores to normal, as a result of the operation of the trunk switch-through relay R310, at its contacts 431, it interrupts a point in the previously described pre-energizing circuit for the upper winding of the line relay R250; at its contacts 432, it interrupts an additional point in the previously described impulsing circuit including the conductor C259; at its contacts 433, it interrupts a point in the circuit for controlling the last digit relay R410; at its contacts 434, it reapplies ground potential to the conductor C254; and, at its contacts 435, it interrupts a point in the initial energizing circuit for the control relay R540. As a further result of the restoration of the hold relay R430, at its contacts 436, it removes the holding ground potential from the conductor C481, thereby to cause any relays locked to this conductor to restore to normal; and, finally, at its contacts 432′, it prepares a point in the incomplete circuit for controlling the release magnet 490. This circuit remains interrupted, at the contacts 314″, until the trunk switch-through relay R310 restores to normal when the established connection is released by the toll operator at the central office 61. As soon as ground potential is removed from the conductor C481, as noted above, the control relay R540 restores to normal.

In view of the foregoing it will be understood that only two relays in the connector 200 remain in their operated positions when a connection is extended over one of the toll lines to the central office 61. More particularly, the trunk switch-through relay R310 is retained in its operated position over the previously described holding circuit including the grounded conductor C43, and the rotary transfer relay R350 is retained in its operated position over a locking circuit which includes the vertical off-normal contacts 394.

The toll operator at the central office 61 completes the connection between the calling subscriber at substation A1 and a desired called subscriber, in a well known manner, through the medium of the equipment provided at the central office exchange. When the calling subscriber at substation A1 releases the connection by replacing the receiver upon the switchhook of the associated telephone instrument, the calling line loop circuit, which is now extended to the repeater 101, is interrupted and the toll operator is given a disconnect signal. In order to release the finder-connector link involved in the connection the toll operator withdraws the plug from the toll trunk 62 terminating at her switchboard and, in this manner, causes the repeater 101 to remove ground potential from a circuit including the wiper 574 and the conductor C43. As soon as ground potential is removed from the conductor C43 the previously traced circuit for the upper winding of the trunk switch-through relay R310 is interrupted, thereby to cause the relay to restore. Also, incident to the removal of ground potential from the conductor C43, the finder 300 and the line circuit 20 are restored to normal, in the manner described in detail in the previously mentioned Lomax application. Incident to the restoration of the trunk switch-through relay R310, at its contacts 314″, it completes a circuit including the contacts 411′, 332′ and 454′, and the vertical off-normal contacts 491 for energizing the release magnet 490 of the connector 200. The release magnet 490 now operates and causes the wipers of the connector 200 automatically to be restored to normal, first in a rotary direction and then in a vertical direction, in a well known manner. As soon as the wipers restore to their normal resting positions the vertical off-normal contacts 491 are opened, thereby to interrupt the circuit for the release magnet 490 which also restores. The vertical off-normal contacts 394 are also opened as soon as the wipers of the connector 200 are restored to normal, thereby to interrupt the locking circuit for the rotary transfer relay R350 which also restores to normal. Inasmuch as the trunk switch-through relay R310 and the rotary transfer relay R350 are the only relays in the connector 200 which are in their operated positions on a trunk call, the connector is now fully restored to normal and is available for further use.

The manner in which calls may be routed through the illustrated connector 200, to other interoffice trunks terminating in the bank contacts thereof, is exactly the same as has been described above with reference to the selection and seizure of an idle toll trunk terminated in the fourth level of the first hundred group 570 of bank contacts. An idle trunk in this group, as has been described above, is automatically selected by dialing the single digit "0." Three other groups of interoffice trunks may be terminated respectively in the third, second and first levels of the first hundred group 570 of bank contacts and may be selected by dialing, respectively, the single digits "9," "8" and "7." Each of the last-mentioned group of trunks may be individual to automatic suboffices, whereby interexchange connections may be established between the subscribers in the instant tandem exchange and the subscribers in the various suboffices. Furthermore, these trunk lines may be utilized by the suboffice subscribers to extend connections through the switching apparatus in the tandem office either to other suboffices or to the toll operator at the central office 61.

From the foregoing it will be understood that if the calling subscriber at substation A1 dials the single digit "9" the connector 200 will operate, in the manner described above in connection with the description of the operation thereof when the single digit "0" is dialed, but instead of advancing the wipers in a vertical direction to the fourth level the wipers are now raised to a position opposite the third level of the associated bank contacts. The wipers are then automatically rotated over the contacts in the selected level until an idle trunk line, such as the trunk 1596 illustrated in Fig. 6, is selected. The connector 200 will then switch through and complete a connection between the calling subscriber at substation A1 and the trunk 1596 extending to the automatic suboffice 60. The repeater 100 included in this connection functions in the same manner as the corresponding repeater illustrated in the above-mentioned Lomax application to cause ground potential to be returned over the C conductor to the wiper 574 in order to retain the connector 200, the finder 300 and the cutoff relay in the line circuit 20 in their operated positions.

The calling subscriber at substation A1 may now dial the remaining digits of the directory number of the called subscriber located in the exchange area served by the automatic suboffice 60. The impulses constituting the digits of the directory number of the called subscriber are repeated by the repeater 100 over the trunk 1596 to the switching apparatus in the suboffice 60, in the manner explained in the above-mentioned Lomax application, and a connection is thus established with the desired called subscriber line. When the conversation between the calling and called subscribers involved in the connection has been completed and their receivers have been replaced upon the switchhooks of their associated telephone instruments, the repeater 100 is controlled to remove ground potential from the conductor C43, thereby to cause the connector 200, the finder 300 and the line circuit 20 to restore to normal, in the same manner as has been described above.

*Calls from the toll operator at the central office 61*

When a toll operator at the central office 61 desires to extend a connection to a subscriber in the illustrated tandem exchange, the toll trunk 62 is seized in a well known manner thereby to control the repeater 101 and the line circuit 53. The conductors shown above the line circuit 53 terminate in the banks accessible to the wipers of the finder 300, in the same manner as a regular subscriber line, and the finder 300 is controlled, by means of the distributor 600, to find the incoming conductors of the line circuit 53 which is individual to the toll trunk seized by the toll operator. As soon as the finder 300 engages the terminals terminating the incoming toll line, ground potential is forwarded over the conductor C43 of the connector 200. The conductors C41 and C42 of the connector 200 are also connected through to the repeater 101, thereby to cause the operation of the line relay R250, in the manner previously described. As soon as the line relay R250 is operated over the loop circuit including the conductors C41 and C42 and the repeater 101, the previously traced circuits for operating the lock-pulse relay R240 and the release control relay R260 are completed. Since this call has originated at a toll operator position, the repeater 101 maintains a ground potential on the conductor C43, whereupon the hold relay R430 is operated over the circuit, traced hereinbefore, and when the release control relay R260 operates, to close its contacts 261, the ground potential maintained on the conductor C43 prevents operation of the control relay R370. Since the control relay R370 is prevented from operating when a call is initiated by the toll operator, a circuit is prepared, at its contacts 371, whereby the operator relay R360 may be controlled, in a manner to be explained hereinafter. With this arrangement the operator may perform certain controls in the connector 200 which are prohibited to ordinary calling subscribers.

The toll operator at the central office 61 may now dial the four digits comprising the directory number of the desired called subscriber in the tendem exchange, and for this purpose it will be assumed the call is to be extended to the subscriber at substation B1 whose directory number is "2543." In response to the dialing of the first digit "2" of the called subscriber number, the minor switch stepping magnet 561 advances the wipers 563 and 564 into engagement with the second contacts in the associated contact banks. At the end of the first digit "2" the transfer control relay R230 restores to normal and completes the previously traced circuit for operating the vertical transfer relay R420, which immediately completes a locking circuit for itself, including the contacts 428. In response to the dialing of the second digit "5" the vertical magnet 380 is controlled, in the manner previously described, to position the wipers of the connector 200 opposite the fifth level of the associated contact banks. At the end of the second digit "5" the transfer control relay R230 restores and now completes a circuit for the rotary transfer relay R350 which operates and, at its contacts 358, completes a locking circuit for itself. As a further result of the operation of the relay R350, at its contacts 351′, it completes the previously described circuit for operating the minor switch release magnet 562, thereby to cause the minor switch wipers 563 and 564 to be restored to their normal positions. The connector is now conditioned to receive the next digit of the called subscriber number, which is the digit "4," and as a result thereof the rotary magnet 382 is controlled to rotate the wipers over the contacts of the selected fifth level into engagement with the fourth set of contacts terminating the called party line 54. At the end of the third digit "4" the transfer control relay R230 restores to normal and at this time completes a circuit by way of its contacts 232, the conductor C256, the contacts 435 and 544, and the rotary off-normal contacts 569 for energizing the control relay R540. The latter relay now operates and, at its contacts 545, locks to the grounded conductor C481. As a further result of the operation of the relay R540, at its contacts 547′, it interrupts a point in the alternative locking circuit for the relay R420 which now restores to normal, and, at its contacts 543, it prepares a point in the circuit for operating the operator relay R360. This circuit includes the contacts 443 of the trunk hunting relay R440 and, consequently, if the called line is busy at this time the relay R440 is operated, which relay in turn causes the operation of the busy test relay R460, and the latter relay thereafter causes the restoration of the trunk hunting relay R440. On the other hand if the called line is idle, the relay R440 will not operate and thus prevents operation of the busy test relay R460.

Assuming that the called line is idle when the wipers engage the conductors thereof, battery potential will be applied to the wiper 574 and then over a circuit which includes the contacts 556, 318′, 542, 461′, 426 and 365 and the upper winding of the relay R440, to battery. Thus the relay R440 is shunted and prevented from operating. Since the relay R440 is not operated when the called line is idle, a circuit is now completed for energizing the slow-to-operate operator relay R360. This circuit may be traced from ground by way of the contacts 433, 443, 543, 347 and 371 and the winding of the relay R360, to battery. Incident to the operation of the relay R360, at its contacts 366, it completes a circuit for operating the last digit relay R410 prior to the receipt of the last digit dialed into the connector 200. In this connection it will be recalled that when a connection is established between the calling subscriber at substation A1 and the called subscriber at substation B1, the last digit relay R410 was not operated until the relay R230 restored to normal at the end of the fourth digit. In the present call, however, the operator relay R360 is in its operated position at the end of the third digit and a circuit is now completed from ground by way of the contacts 433 and 443, the lower winding of the last digit relay R410, the contacts 327, 356, 366, 426, 461′, 542, 318′ and 556, the wiper 574, the C conductor extending to the line circuit 50 and then through the winding of the cutoff relay (not shown), to battery. The last digit relay R410 operates when the above-traced circuit is completed and, at its contacts 419, it completes a locking circuit for its upper winding from ground at the contacts 438. Also, at its contacts 417, the relay R410 applies a direct ground potential to the wiper 574, thereby to mark the called line as busy to all other connectors having access thereto and to control the operation of the cutoff relay (not shown) in the line circuit 50. This circuit may be traced from ground by way of the contacts 433, 443, 417, 318' and 556, the wiper 574 and the winding of the cutoff relay (not shown), to battery.

In view of the foregoing it will be understood that the toll operator at the central office 61 may seize an idle called line and mark the same busy to all other connectors having access thereto without signaling the desired called subscriber. This enables the operator to hold the called line while she extends a connection back to the original calling subscriber. If this is a delayed toll call, the operator obtains the original calling subscriber in the connection and then dials the last digit into the connector 200 in order to signal the desired called subscriber at substation B1.

During the time the operator has marked the desired called line as busy to all other connectors having access thereto, and prior to the time the operator dials the final or fourth digit, any subscriber on the called party line 54 may remove his receiver. In order to signal this condition to the toll operator the connector 200 has been arranged to reverse the current flow over the conductors C41 and C42 and to switch through the connector to the called line to enable the operator to converse with the subscriber who has removed his receiver. More particularly, the removal of the receiver at any substation on the party line 54 completes a circuit for operating the ring cutoff relay R520. This circuit may be traced from ground by way of the contacts 466, 453, 416 and 554, the wiper 573, the positive conductor of the called line, the line circuit 50, the loop circuit including the party line 54, and the substation at which the receiver has been removed, and returning by way of the line circuit 50, the negative conductor, the wiper 572, the contacts 552, 413, 451 and 463, the winding of the ring cutoff relay R520, and the contacts 531 to resistance battery. The ring cutoff relay R520 operates when this circuit is completed and, at its contacts 521, completes an operating circuit for the ring cutoff slave relay R450, which may be traced from ground by way of the contacts 232, the conductor C256, the contacts 435 and 521 and the upper winding of the relay R450, to battery. Incident to the operation of the ring cutoff slave relay R450, at its contacts 451 and 453, it interrupts the previously traced circuit for operating the ring cutoff relay R520, but this relay is somewhat slow to release and does not immediately restore. Furthermore, the relay R450, at its contacts 452 and 454, transfers the previously traced loop circuit, including the substation at which the receiver was removed, to a circuit including the upper and lower windings of the answer relay R270. This circuit may be traced from ground by way of the contacts 414 and 363, the vertical off-normal contacts 493, the contacts 422, the lower winding of the answer relay R270, the contacts 334 and 454, and then over the previously traced loop circuit, and returning by way of the contacts 452, 331 and 412, and the upper winding of the answer relay R270, to battery. The answer relay R270 operates when this circuit is completed and, at its contacts 275, completes a holding circuit for the ring cutoff slave relay R450 so that the latter relay will remain in its operated position after the relay R520 interrupts the initial energizing circuit at its contacts 521. The locking circuit for the relay R450 may be traced from ground by way of the contacts 438, the conductor C431, the contacts 457 and 425, the conductor C254, the contacts 275, and the upper winding of relay R450, to battery. As a further result of the operation of the relay R270, at its contacts 271 to 274, inclusive, it reverses the current flow over the conductors C41 and C42 to the repeater 101, and the repeater 101 in turn transmits a signal over the toll trunk 62 to the toll operator at the central office 61. At the present time, the relays R410 and R450 are in their operated positions and thus enable the operator at the central office 61 to converse with the subscriber on the party line that has removed the receiver from the switchhook of his associated telephone instrument. Thus the operator may inform this subscriber that she is holding the called party line for a toll call, to be completed to a particular subscriber thereon, and request the party to replace his receiver upon the switchhook. Consequently, when the subscriber replaces his receiver the loop circuit for maintaining the answer relay R270 in its operated position is interrupted and the relay restores to normal. At its contacts 275, the relay R270 interrupts the circuit for the ring cutoff slave relay R450 which also restores to normal. Restoration of the relay R270 also reverses the current flow over the conductors C41 and C42 back to its original condition, thus informing the toll operator at the central office 61 that she may now proceed to dial the final or fourth digit of the called subscriber directory number.

The toll operator may now dial the last digit "3" of the called subscriber number, whereupon the minor switch stepping magnet 561 is again controlled to advance the wipers 563 and 564 into engagement with the third contacts in the associated contact banks. The desired ringing code indicative of the subscriber at substation B1 is now automatically transmitted, in the manner previously described, in order to actuate the ringer at the called subscriber substation. At the end of the last digit "3" dialed into the connector 200, the transfer control relay R230, upon restoring to normal, at its contacts 232, recompletes the previously traced circuit, including the minor switch off-normal contacts 566, for reoperating the vertical transfer relay R420. This circuit may be traced from ground by way of the contacts 232, 211 and 429, the minor switch off-normal contacts 566, and the lower winding of the vertical transfer relay R420, to battery, and a branch of this circuit also extends by way of the contacts 367 and the winding of the toll switch relay R330, to battery. In response to the operation of the relay R420, at its contacts 428 and 429, it interrupts its initial energizing circuit and, simultaneously therewith, completes a locking circuit for its lower winding in multiple with the winding of the relay R330. As a result of the operation of the relay R330, at its contacts 331 and 334, it disconnects the circuits including the windings of the answer relay R270 from the wipers 572 and 573; at its contacts 333 and 336, it prepares points in the talking circuit, including the wipers 572 and 573; at its contacts 337, it interrupts a point in the incomplete locking circuit for the upper winding of the trunk switch-through relay R310; and, at its contacts 338, it completes a multiple holding circuit for the lower winding of the hold relay R430, which may be traced from the grounded conductor C43 by way of the contacts 338, 345, 437 and 222 and the lower winding of the relay R430, to battery. As a further result of the operation of relay R330, at its contacts 339, it interrupts a point in the incomplete circuit for the reverting call relay R340; at its contacts 331', it interrupts a point in the circuit for the minor switch release magnet 562; and, finally, at its contacts 332', it completes an operating circuit for the lower winding of the trunk switch-through relay R310. The circuit for operating the lower winding of the trunk switch-through relay R310 may be traced from ground by way of the contacts 438, the conductor C481, and the contacts 419, one branch including the upper winding of the last digit relay R410 which, at the present time, is in its operated position, and the other branch including the contacts 332' and the lower winding of the trunk switch-through relay R310, to battery. Incident to the operation of the relay R310, at its contacts 311', 314', 316' and 319', it connects the conductors C40, C41, C42 and C43 through to the respective wipers 571, 572, 573 and 574 of the connector 200. In this connection it is to be noted, however, that if the called subscriber has not answered the call at this time the conductors C41 and C42 will not be connected through to the respective wipers 572 and 573, due to the fact that the contacts 452 and 454 of the ring cutoff slave relay R450 are not closed. As a further result of the operation of relay R310, at its contacts 313' and 315', it interrupts the previously traced loop circuit including the conductors C41 and C42, and the windings of the line relay R250, whereupon the relay R250 restores to normal. At its contacts 317', the relay R310 interrupts a point in the previously described impulsing circuit, including the conductor C259; at its contacts 319', it connects the grounded conductor C43 through to the wiper 574 in order further to maintain the called line busy to all connectors having access thereto; at its contacts 318', it interrupts a point in the initial energizing circuit for the lower winding of the relay R410, but this relay remains in its operated position over a locking circuit including its upper winding; and, at its contacts 311'', 312'', 313'' and 314'', it performs no functions at the present time.

Incident to the restoration of the line relay R250, as noted above, at its contacts 252, it interrupts a point in the multiple circuit for the release control relay R260 and, at its contacts 253, it interrupts a point in the circuit for the lock-pulse relay R240. The lock-pulse relay R240 now restores and, at its contacts 242, it interrupts a further point in the multiple circuit for the release control relay R260, which now restores to normal. The connector 200 is now retained in its operated position by ground potential applied to the conductor C43, under control of the toll operator at the central office 61.

If the called subscriber at substation B1 answers the call after the foregoing operations of the connector have taken place, the ring cutoff relay R520 operates, in the manner previously described, and, at its contacts 521, completes an operating circuit for the upper winding of the ring cutoff slave relay R450. The latter relay, at its contacts 452', completes a locking circuit, including its lower winding, from ground at the contacts 428, and is thus retained in its operated position in multiple with the relays R420 and R330. As a further result of the operation of relay R450, at its contacts 451 and 453, it interrupts the circuit over which ringing code is transmitted to the called line, and thus the circuit for the ring cutoff relay R520 which now restores. Also, at its contacts 452 and 454, the relay R450 completes the above-mentioned talking circuit through the connector 200, which includes the conductors C41 and C42 and the wipers 572 and 573. Conversation between the toll operator at the central office 61 and the called subscriber at substation B1 may now take place and the operator may withdraw from the connection after she has completed the same to the particular calling subscriber whose line is terminated at her switchboard. Talking battery for the called end of the connection is fed from the repeater 101 through the line circuit 53, the finder 300 and the conductors C41 and C42 of the connector 200 through to the called subscriber line.

When the called subscriber at substation B1 hangs up his receiver, the battery feed circuit is interrupted in the usual manner and thus causes the repeater 101 to give a disconnect signal to the toll operator at the central office 61. The toll operator may now release the apparatus involved in the connection by withdrawing her cord circuit from the toll trunk 62. This operation causes the repeater 101 to remove the ground potential from the conductor C43, whereupon the finder 300 restores to normal, in the manner previously described. Referring to the connector 200, it is noted that removal of ground potential from the conductor C43 causes the restoration of the hold relay R430 and causes the busy marking ground potential to be removed from the called subscriber line. This renders the party line 54 available for additional calls. Incident to the restoration of the hold relay R430, at its contacts 431, it interrupts the preenergizing circuit for the upper winding of the line relay R250; at its contacts 433, it interrupts the circuit including the contacts 443, 543, 347 and 371, thereby to cause the restoration of the operator relay R360; at its contacts 438, it removes ground potential from the conductor C481, thereby to interrupt the holding circuits for the switch-through relay R310, the last digit relay R410, the control relay R540, and any other relays which may be locked to this conductor at this time. The operator relay R360, upon restoring, at its contacts 367, interrupts a point in the circuit for the toll switch-through relay R330, which also restores to normal. Incident to the restoration of the relay R310, as noted above, at its contacts 314'', it completes a circuit including the contacts 411', 432' and 453', the minor switch off-normal contacts 565 and the winding of the minor switch release magnet 562, whereupon the wipers of the minor switch 560 are restored to their normal positions, in the manner previously described. The restoration of the minor switch wipers 563 and 564 to their normal resting positions opens the minor switch off-normal contacts 565, thereby to interrupt the circuit for the release magnet 562, which now restores, and opens the minor switch off-normal contacts 566, thereby to interrupt the locking circuit for the multiply connected lower windings of the vertical transfer relay R420 and the ring cutoff slave relay R450. Incident to the restoration of the relay R450, at its contacts 454', it completes a circuit including the contacts 314'', 411', 432' and 454', and the vertical off-normal contacts 491, whereby the release magnet 490 is operated to cause the wipers 571 to 578, inclusive, to be restored to their normal vertical and rotary positions. As soon as the wipers are restored to their normal positions the vertical off-normal contacts 491 are opened in order to cause the restoration of the release magnet 490. Furthermore, the vertical off-normal contacts 394 are opened, thereby to interrupt the previously traced locking circuit for the rotary transfer relay R350, which now restores to normal. The connector 200 has now been fully restored to normal and is again available for the extension of additional calls.

In the foregoing description of operation of the connector 200 under control of the toll operator at the central office 61, it was assumed that the called line was idle when a connection was established therewith and, consequently, at the end of the third dialed digit of the directory number the wipers 572, 573 and 574 stand in engagement with the busy called line. As soon as the transfer control relay R230 restores at the end of the third digit, the control relay R540 is operated, in the manner previously described, and completes, at its contacts 543, a circuit which may be traced from ground by way of the contacts 433, 443, 543, 347 and 371 for operating the operator relay R360. Simultaneously, at its contacts 542, the relay R540 extends the busy marking ground potential applied to the wiper 574 by way of the contacts 556, 318', 542, 461', 426 and 365, and the upper winding of the trunk hunting relay R440, to battery. These two circuits are simultaneously completed and, since the operator relay R360 is of the slow-to-operate type, its contacts 365 are not opened prior to the energization of the relay R440. The latter relay immediately operates and, at its contacts 443, interrupts the circuit for the relay R360 before it has had time to operate. Also, at its contacts 444, the relay R440 completes an energizing circuit for the upper winding of the busy test relay R460 which includes the busy marking ground potential applied to the wiper 574, the contacts 556, 318', 542 and 444, and the upper winding of the busy test relay R460, to battery. As a further result of the operation of relay R460, at its contacts 468, it prepares a point in a locking circuit for itself and, at its last-to-break contacts 461', it interrupts a point in the previously traced circuit for the relay R440, which now restores to normal. Incident to the restoration of the relay R440, at its contacts 444 and 445, it interrupts the initial energizing circuit for the upper winding of the busy test relay R460 and, simultaneously therewith, it completes a locking circuit for the upper winding thereof. This circuit may be traced from ground by way of the contacts 438, the conductor C481, the contacts 468, 326, 418 and 445, and the upper winding of the relay R460, to battery. This locking circuit is independent of the busy marking potential applied to the wiper 574. As a further result of the restoration of the relay R440, at its contacts 443, it recompletes the previously traced circuit for the slow-to-operate operator relay R360. Incident to the operation of the relay R360, at its contacts 362, it prepares a point in the circuit for transmitting a 60 I. P. M. flashing signal to the toll operator and, at its contacts 363, it prepares a point in the circuit for transmitting an audible busy tone signal to the toll operator. Referring again to the busy test relay R460, it is noted that, at its contacts 462, a circuit is completed from the 60 I. P. M. conductor C382 by way of the contacts 352, 312', 362, 462 and 411 and the upper winding of the answer relay R270, to battery. The answer relay R270 is thereby operated sixty times per minute and each time it is operated the current flow over the conductors C41 and C42 is reversed in order that the repeater 101 may give a corresponding flashing signal to the toll operator to indicate that the called subscriber line is busy. As a further result of the operation of the relay R460, at its contacts 465, an audible busy tone signal is transmitted by way of the conductor C487, the contacts 465, 441, 415 and 363, the vertical off-normal contacts 493, the contacts 422, the lower winding of the answer relay R270, the contacts 323, the condenser 386, and the contacts 315', and then by way of the conductor C42 to the repeater 101, in order that the toll operator may receive an audible busy tone signal as well as a flashing signal.

In view of the foregoing operations of the connector 200, it is apparent that the busy tone signal is transmitted to the toll operator prior to the time that the last digit of the called subscriber directory number has been dialed into the connector 200. It will be recalled that when a connection is extended from a regular calling subscriber line to a busy called line the busy tone signal is withheld from being transmitted to the calling subscriber until he has dialed the final digit of the called subscriber directory number.

The toll operator has two alternative actions which she may exercise when a busy condition on a called subscriber line is encountered. She may release the connection in the manner described above, by causing ground potential to be removed from the conductor C43, and attempt to establish the connection with the desired called subscriber at some later time, or she may dial the last digit of the directory number of the called subscriber line plus an additional single digit "1" in order to condition the connector 200 to camp on the busy called line and automatically signal the desired called subscriber as soon as the busy condition is removed.

Assuming that the toll operator desires to camp on the busy called line until it becomes idle, she now dials the fourth digit "3" of the called subscriber directory number, whereupon the line relay R250 and the lock-pulse relay R240 cooperate to transmit three pulses over the impulsing conductor C259 to the minor switch stepping magnet 561 and the transfer control relay R230, in the manner previously described. At the end of the third impulse of the digit "3," the wipers 563 and 564 of the minor switch 560 are positioned into engagement with the third contacts in their associated contact banks and the third code ringing signal of the group of ten codes is selected for signaling the called subscriber at substation B1. This signal is not transmitted, however, at the present time, inasmuch as the pickup relay R530 has not been energized and is prevented from operating until the last digit relay R410 is operated. Also, at the end of the last impulse of the digit "3," the transfer control relay R230 restores to normal and, at its contacts 232, extends ground potential by way of the conductor C256, the contacts 211 and 429, and the minor switch off-normal contacts 566, which are closed as soon as the wipers of the minor switch are stepped from their normal resting positions, one branch including the lower winding of the vertical transfer relay R420, to battery, and the other branch including the contacts 367 and the winding of the toll switching relay R330, to battery. These relays operate when the above-mentioned circuit is completed and the relay R420, at its contacts 428, completes a locking circuit therefor which is independent of the contacts 232 of the transfer control relay R230. As a further result of the operation of the relay R420, at its contacts 421 and 422, it transfers the audible busy tone signal from a circuit including the contacts 465, 441, 415 and 363, the vertical off-normal contacts 493, the contacts 422, and the lower winding of the answer relay R270, to a circuit including the contacts 465, 441, 415 and 421, and the lower winding of the answer relay R270. Furthermore, at its contacts 423, the relay R420 interrupts a point in the previously traced impulsing circuit for the minor switch stepping magnet 561; at its contacts 424, it prepares a point in the previously traced impulsing circuit for the vertical magnet 380 and the rotary magnet 382, but this circuit is ineffective at this time since it is interrupted at the contacts 541. Finally, at its contacts 427, the relay R420 prepares a point in the circuit for the lower winding of the last digit relay R410.

Incident to the operation of the toll switching relay R330, at its contacts 333 and 336, it prepares points in the circuits including the talking conductors of the connector 200; at its contacts 338, it completes a multiple holding circuit for the lower winding of the hold relay R430, which circuit is independent of the contacts 311″; at its contacts 339, it interrupts a point in the circuit for the reverting call relay R340; and, at its contacts 332′, it prepares a point in a circuit for the lower winding of the trunk switch-through relay R310.

In order to establish the camp-on busy condition in the connector 200, whereby the busy test relay R460 will be automatically restored to normal as soon as the busy called line becomes idle, and thus initiate automatic signaling of the desired called subscriber, the toll operator now dials the suffix digit "1." At the beginning of the single pulse the line relay R250 restores to normal and, at its contacts 253, interrupts the circuit for the lock-pulse relay R240 which also restores. Incident to the restoration of the relay R240, at its contacts 241, it completes a circuit from ground by way of the contacts 473 and 241, the impulsing conductor C259, the contacts 317′, 432 and 456, and the lower winding of the transfer control relay R230, to battery. The relay R230 now operates and, at its contacts 233, completes a circuit for operating the monitoring relay R320 over a circuit which may be traced from ground by way of the contacts 463′ of the busy test relay R460, the contacts 422′, 356′, 233 and 369, the lower winding of the monitoring relay R320, the conductor C254, the contacts 253, and the lower winding of the lock-pulse relay R240, to battery. Attention is directed to the fact that the line relay R250, upon operating at the end of the single pulse, completes the above-traced circuit, at its contacts 253, so that the lock-pulse relay R240 and the monitoring relay R320 may operate in series. Incident to the operation of the monitoring relay R320, at its preliminary make contacts 328, it completes a locking circuit for its upper winding which may first be traced from the grounded conductor C481, by way of the contacts 468, 326, 418 and 445, one branch extending to the upper winding of the busy test relay R460 and the other branch extending by way of the contacts 328 to the upper winding of the monitoring relay R320. As soon as the relay R320 fully operates, and simultaneously actuates its contacts 325 and 326, the above-traced multiple locking circuit for the relays R320 and R460 is transferred from the circuit including the grounded conductor C481 to a circuit including the contacts 542, 318′ and 556 and the busy marking ground potential applied to the wiper 574. In this manner the operated condition of the relays R320 and R460 is dependent upon the busy condition of the called subscriber line. As a further result of the operation of the relay R320, at its contacts 327, it interrupts a point in the circuit for the lower winding of the relay R410 and, at its contacts 322 and 324, it connects the negative and positive conductors C41 and C42 to the conductors of the busy called line and thus enables the operator at the toll switchboard to converse with the subscribers involved in the talking connection over the busy called line and inform them that they should hang up their receivers to permit a toll call to be extended to a subscriber on the called party line 54. On the other hand, the operator may allow the subscribers on the busy called line to continue their conversation and wait for them to disconnect.

When the subscribers involved in the connection on the busy called line replace their receivers upon their associated switchhooks, the party line 54 becomes available for further calls. More particularly, as soon as the party line 54 is released, the busy marking ground potential is removed from the bank contact engaged by the wiper 574 of the connector 200 and battery potential is substituted in place thereof through the winding of the cutoff relay (not shown) of the line circuit 50. As soon as ground potential is removed from the wiper 574, the previously traced multiple circuit for retaining the busy test relay R460 and the monitoring relay R320 in their energized positions is interrupted, and these relays now restore to normal. As soon as the above-mentioned relays restore to normal the battery potential which is now applied to the wiper 574 through the winding of the cutoff relay, as noted above, is extended by way of the contacts, 556, 318′, 542, 461′, 427, 356 and 327, the lower winding of the last digit relay R410, and the contacts 443 and 433, to ground. The relay R410 immediately operates and, at its contacts 419, completes a locking circuit which includes the grounded conductor C481. As a further result of the operation of relay R410, at its contacts 419, the ground potential applied to the conductor C481 is extended by way of the contacts 332′ and the lower winding of the trunk switch-through relay R310, to battery. The relay R310 now operates and, at its contacts 319′ connects the grounded conductor C43 through to the winding of the cutoff relay of the line circuit 50, by way of the contacts 556 and the wiper 574, thereby to retain the cutoff relay (not shown) in its operated position and to mark the party line 54 busy to all other connectors having access thereto. At its contacts 313′ and 315′, the relay R310 disconnects the line relay R250 from the negative and positive conductors C41 and C42, thereby causing the restoration of the relay R250 and, at its contacts 314′ and 316′, it connects the conductors C41 and C42, by way of the contacts 333 and 336, to the contacts 452 and 454. The last-mentioned contacts will not be closed until the ring cutoff slave relay R450 is operated, as will be subsequently described.

Referring again to the operation of the last digit relay R410, it is noted that, at its contacts 412', the previously described circuit, including the PU—1 conductor C257, is completed for operating the pickup relay R530 at the beginning of a ringing code cycle. The remaining operations of the connector, whereby the selected ringing code is transmitted to signal the desired called subscriber at substation B1, are exactly the same as have been described previously. In response to the called subscriber answering the call, the ring cutoff relay R520 and the ring cutoff slave relay R450 operate in the previously described manner. Incident to the operation of the ring cutoff slave relay R450, at its contacts 451 and 453, it disconnects the circuit whereby the ringing code signal is transmitted to the called subscriber line and, at its contacts 452 and 454, it further extends the above-mentioned negative and positive conductors C41 and C42 by way of the contacts 413 and 416, 552 and 554, and the wipers 572 and 573, to the negative and positive conductors of the called party line 54, thus completing a loop circuit through the connector 200 to the repeater 101 included in the connection from the toll operator at the central office 61. The last-mentioned repeater signals the toll operator to indicate that the called subscriber has responded to the ringing signal and the repeater provides the talking current for the called end of the connection.

Incident to the restoration of the line relay R250, at its contacts 252, it interrupts the circuit for the release control relay R260. Inasmuch as the lock-pulse relay R240 was restored in response to the removal of ground potential from the conductor C255 upon the operation of the ring cutoff slave relay R450, the multiple circuit for the release control relay R260 is opened, at the contacts 242, and the relay R260 slowly restores to normal. The conversation between the toll operator at the central office 61 and the called subscriber at substation B1 may now take place. The connector 200 is retained in its operated position under control of the ground potential applied to the conductor C43 from the repeater 101. The trunk switch-through relay R310, the toll switching relay R330, the rotary transfer relay R350, the operator relay R360, the last digit relay R410, the vertical transfer relay R420, the hold relay R430, the ring cutoff slave relay R450, and the control relay R540 in the connector 200 are retained in their operated positions during conversation. These relays are restored to normal, in the manner previously described, as soon as the toll operator at the central office 61 controls the repeater 101 to remove the holding ground potential from the conductor C43. Consequently, when the toll connection is terminated the toll operator controls the release of the equipment involved in the connection.

In the foregoing description of operation of the connector 200, it was assumed that the toll operator at the central office 61 desired to extend a toll call to the subscriber at substation B1 on the party line 54. It will now be assumed that the toll operator has extended a connection to the connector 200, in the manner previously described, and desires to control the connector to further extend the connection to a subscriber in the automatic sub-office 60 by dialing the single digit "9." As soon as the connector 200 is seized, the line relay R250 operates, in the manner previously described, and ground potential is applied to the conductor C43 from the repeater 101, as has been noted. Incident to the operation of the line relay R250 the lock-pulse relay R240 and the release control relay R260 are operated. The latter relay, at its contacts 261, completes a circuit for shunting the control relay R370, thereby to prevent its operation when a call has been extended by a toll operator. As a further result of the operation of the release control relay R260, the previously traced circuit including the grounded conductor C43, the contacts 311'', 345, 262 and 222, is completed for operating the hold relay R430. The toll operator now receives the dial tone signal, in a well known manner, and dials the single digit "9," whereupon the line relay R250, in cooperation with the lock-pulse relay R240, transmits nine current pulses over the impulsing conductor C259. The first six impulses transmitted over the impulsing conductor C259 control the minor switch stepping magnet 561 to position the wipers 563 and 564 into engagement with the sixth contacts in the associated contact banks. As soon as the wiper 564 engages its associated sixth contacts, the previously described circuit is completed for operating the vertical transfer relay R420 in series with the rotary interrupter relay R210. Upon operating, the vertical transfer relay R420, at its contacts 428, completes a locking circuit for itself which includes the minor switch off-control contacts 566. As a further result of its operation the relay R420, at its contacts 423, interrupts the impulsing circuit for the minor switch stepping magnet 561 and, at its contacts 424, completes a circuit whereby the remaining three impulses transmitted over the impulsing conductor C259 control the vertical magnet 380. The vertical magnet 380, upon operating, advances the wipers of the connector 200 step by step in a vertical direction until they are positioned opposite the third level of the associated contact banks. At the end of the ninth impulse transmitted over the conductor C259, the line relay R250 is retained in its operated position, thereby to complete the previously traced circuit including the upper winding of the vertical transfer relay R420 and the lower winding of the rotary interrupter relay R210. Also, at the end of the ninth impulse transmitted over the conductor C259, the transfer control relay R230 restores to normal and, at its contacts 232, applies ground potential to the conductor C256. A circuit is thus completed by way of the contacts 435, 544 and 213, one branch including the lower winding of the trunk hunting relay R440 and the other branch including the contacts 383 and the upper winding of the rotary interrupter relay R210. Incident to the operation of the relay R440, at its contacts 444, it prepares a point in the test circuit for the upper winding of the busy test relay R460 and, at its contacts 442, it completes a circuit for operating the rotary magnet 382 over a circuit which includes the contacts 212 and the grounded conductor C256. Upon operating, the rotary magnet 382 rotates the wipers of the connector 200 into engagement with the first set of contacts in the associated contact bank terminating the first trunk extending to the automatic suboffice 60. As soon as the wipers are moved from their normal rotary positions, the rotary off-normal contacts 569 are closed to complete an energizing circuit for the control relay R540, which circuit includes the contacts 544 and 435 and the grounded conductor C256. Incident to this operation, the relay R540, at its contacts 545, locks itself to the grounded conductor C481. As a further result of its operation, the relay R540, at its contacts 546 and 543', interrupts a point in the previously traced series circuit including the upper winding of the vertical transfer relay R420 and the lower winding of the rotary interrupter relay R210. The relay R210 now restores to normal since the energizing circuit for its upper winding has been opened at the contacts 383 responsive to the operation of the rotary magnet 382. Upon restoring, the relay R210, at its contacts 212, interrupts the circuit for the rotary magnet 382 which now restores to normal and recloses its contacts 383. If the first trunk in the group terminating in the third level of the connector 200 is busy, ground potential will be applied to the wiper 574, thereby to complete a circuit including the contacts 556, 318' and 542, one branch extending by way of the contacts 461', 427 and 355 for retaining the trunk hunting relay R440 in its operated position, and another branch extending by way of the contacts 444 to the upper winding of the busy test relay R460, which operates. As a further result of the operation of the relay R460, at its last-to-break contacts 461', it interrupts a point in the previously traced circuit for the upper winding of the relay R440. The latter relay is of the slow-to-release type and, consequently, remains in its operated position for a short interval of time after its energizing circuit is opened. The ground potential applied to the contact in the bank engaged by the wiper 574 is now extended by way of the associated "X" jumper, the EC wiper 575, and the contacts 551', 469, 447 and 221, one branch extending to the lower winding of the relay R440 which is retained in its operated position, and another branch extending by way of the contacts 383 to the upper winding of the rotary interrupter relay R210, which operates. The relay R210, at its contacts 212, now recompletes the previously traced circuit for the rotary magnet 382, thereby to advance the wipers into engagement with the second trunk extending to the suboffice 60. In this manner the wipers are automatically rotated step by step over the associated bank contacts until an idle trunk in the selected group is found, whereupon the ground potential is removed from the wiper 574 and battery potential is applied thereto.

When battery potential is encountered by the wiper 574 the busy test relay R460 and, shortly thereafter, the trunk hunting relay R440, restore to normal. As soon as the relay R440 restores, at its contacts 443, a circuit is completed for operating the slow-to-operate operator relay R360 in multiple with the trunk switch-through relay R310. This circuit may be traced from ground by way of the contacts 433, 443 and 543, one branch extending by way of the contacts 347 and 371 and the winding of the relay R360, and the other branch extending by way of the contacts 353' and 462' and the winding of the trunk switch-through relay R310. Since the operator relay R360 is of the slow-to-operate type, it does not close its contacts 367 until some time after the operation of the relay R310. The relay R310, upon operating, at its contacts 312', completes a locking circuit which includes its upper winding, the contacts 337 and the grounded conductor C43, thereby to place the relay under control of the toll operator. As a further result of the operation of the relay R310, at its contacts 311'', it interrupts the circuit including the contacts 345 and 262 and, in multiple therewith, the contacts 437 and 222 and the lower winding of the hold relay R430, to battery. The hold relay R430 immediately restores to normal and, at its contacts 433, opens the previously traced multiple circuit for the operator relay R360 and the lower winding of the relay R310, before the relay R360 has had sufficient time to operate. As a further result of the operation of the trunk switch-through relay R310, at its contacts 313'', a circuit is completed by way of the contacts 331', 346 and 359, the vertical off-normal contacts 394 and the winding of the rotary transfer relay R350, to battery. This relay operates and completes a locking circuit for itself, at its contacts 358. Furthermore, at its contacts 351', the relay R350 completes a circuit from ground by way of the contacts 313'', 331', 346 and 351', the minor switch off-normal contacts 565 and the winding of the release magnet 562, to battery. The minor switch release magnet 562, upon operating, causes the wipers 563 and 564 to be restored to their normal resting positions, whereupon the minor switch off-normal contacts 565 are opened to interrupt the circuit for the release magnet 562, and the minor switch off-normal contacts 566 are opened, thereby to interrupt the locking circuit for the lower winding of the vertical transfer relay R420, which now restores to normal. Referring again to the hold relay R430 it is noted that, upon restoring, at its contacts 438, it removes ground potential from the conductor C481, thereby to interrupt the locking circuit for the control relay R540 which restores to normal and, at its contacts 432', it prepares a point in the incomplete circuit for the release magnet 490.

Referring again to the trunk switch-through relay R310, it is noted that, at its contacts 319', it extends the grounded conductor C43 through to the wiper 574, thereby to mark the selected trunk line as busy to all other connectors having access thereto and to place the line circuit 52 and the repeater 100 under control of the toll operator at the central office 61. Furthermore, at its contacts 311', the relay R310 connects the restricted service conductor C40 through to the wiper 571, for the purpose described in the above-mentioned Lomax application; at its contacts 312', it interrupts a point in the flash busy circuit; and at its contacts 313' and 315', it disconnects the line relay R250 from the circuit including the conductors C41 and C42, thereby to cause this relay to restore to normal. At its contacts 314' and 316', the relay R310 extends the talking conductors C41 and C42, by way of the contacts 332 and 335, 552 and 554, and the wipers 572 and 573, to the repeater 100 of the selected trunk line extending to the automatic suboffice 60. Finally, at its contacts 317', the relay R310 interrupts a point in the previously described impulsing circuit, including the conductor C259.

Incident to the restoration of the line relay R250 the circuit for the lock-pulse relay R240 is opened, at its contacts 253, and as a result of the restoration of these two relays the circuit for the release control relay R260 is interrupted and the latter relay restores to normal. The connection between the toll operator at the central office 61 and the selected trunk line extending to the automatic suboffice 60 is now completed so that the toll operator may now dial the remaining digits of the directory number of the desired called subscriber terminated in the suboffice 60. In the connector 200 the relays R310 and R350 are the only ones which remain in their operated positions during the connection established over the selected trunk line, and when the toll operator disconnects by removing ground potential from the conductor C43, the connector 200 and the remaining switching apparatus involved in the connection are restored to normal, in the manner previously explained.

*Restricted service*

In the present system it may become necessary to prevent the subscribers from obtaining connections to certain trunk lines extending to other exchanges while permitting the toll operator at the central office 61 to extend connections via these trunk lines. Accordingly, it will be assumed that the trunk lines terminating in the second level of the connector accessible to the wipers 571 to 575, inclusive, are to be used only by the toll operator at the central office and not by the regular subscribers. When this condition exists the normal post contacts 391 are provided and arranged to be closed when the wipers of the connector 200 are raised in a vertical direction to a position opposite the second level of the associated bank contacts. With the normal post contacts 391 arranged in this manner a calling subscriber will receive a busy tone signal when an attempt is made to extend a connection to the trunks terminating in the second level of the connector 200. More specifically, if the calling subscriber should dial the single digit "8," the line relay R250 and the lock-pulse relay R240 operate, in the manner previously described, whereby eight impulses are transmitted over the impulsing conductor C259. The first six impulses control the minor switch stepping magnet 561, thereby to advance the wipers 563 and 564 into engagement with the sixth contacts in the associated contact banks. A circuit is then immediately completed over the previously described path, including the wiper 564, for operating the upper winding of the vertical transfer relay R420 in series with the lower winding of the rotary interrupter relay R210. The vertical transfer relay R420 immediately operates and locks itself over a circuit including its lower winding and, at its contacts 423 and 424, it transfers the impulsing circuit from the minor switch stepping magnet 561 to the vertical magnet 380 which now responds to the remaining two impulses of the eight transmitted over the impulsing conductor C259. At the end of the eighth impulse the transfer control relay R230 restores to normal, in the manner previously described, and, at its contacts 232, completes a circuit including the conductor C256, and the contacts 435, 544 and 213 for energizing the trunk hunting relay R440 and, in multiple therewith, by way of the contacts 383, a circuit for energizing the upper winding of the relay R210. The relay R440, upon operating, at its contacts 442, completes the previously traced circuit, including the contacts 232 and 212, for energizing the rotary magnet 382. Thus the wipers of the switch are rotated into engagement with the first contacts in the selected second level. As soon as the wipers are rotated away from their normal vertical positions, the rotary off-normal contacts 569 are closed to complete a circuit for the control relay R540, which may be traced from the grounded conductor C256 by way of the contacts 435 and 544, the rotary off-normal contacts 569, and the winding of the control relay R540, to battery. This relay immediately operates and, at its contacts 545, completes a locking circuit for itself which includes the grounded conductor C481. Furthermore, as soon as the relay R540 operates the ground potential applied to the conductor C481 is extended by way of the contacts 545, the rotary off-normal contacts 569, the contacts 372 and 355', the normal post contacts 391, the contacts 544', the sixth contact in the minor switch 560 engaged by the wiper 564, the contacts 547 and the lower winding of the busy test relay R460, to battery. The busy test relay R460 operates as soon as the above-traced circuit is completed, and prepares a point in the circuit, at its contacts 465, for transmitting a busy tone signal to the calling subscriber. As a further result of the operation of the control relay R540, at its contacts 546 and 543', it interrupts the previously traced circuit, including the upper winding of the relay R420 and the lower winding of the relay R210. If the first trunk in the group is busy, ground potential will be applied to the wipers 574 and 575. The ground potential applied to the wiper 574 will have no effect at the present time because the busy test relay R460 is in its operated position and thus prevents the circuit from being completed, by way of its contacts 461', to the upper winding of the relay R440. However, the relay R440 is slow to release and the ground potential applied to the wiper 575 is extended by way of the contacts 551', 469, 447 and 221, one branch including the lower winding of the relay R440 and the other branch including the contacts 383 and the upper winding of the rotary interrupter relay R210. The rotary interrupter relay, upon reoperating, again completes a circuit for the rotary magnet 382 to advance the wipers into engagement with the second trunk in the selected level. Consequently, as long as a busy trunk is engaged by the wipers of the connector 200 the trunk hunting operation described above continues until an idle trunk is reached, at which time battery potential is applied to the wipers 574 and 575, thereby to cause the restoration of the trunk hunting relay R440, in the manner described hereinbefore. Since the busy test relay R460 is retained in its operated position over the circuit described above, including its lower winding, a busy tone signal is now transmitted to the calling subscriber over a circuit which includes the conductor C487, the contacts 465, 441, 415 and 421, the lower winding of the answer relay R270, the contacts 323, the condenser 306, the contacts 315', and the conductor C42. The trunk switch-through relay R310 is prevented from operating inasmuch as the contacts 462' are opened by the busy test relay R460.

In view of the foregoing it will be understood that when a calling subscriber is prevented from extending calls over certain trunk lines, the closing of the normal post contacts 391 retains the busy test relay R460 in its operated position and, while the connector 200 may search for an idle trunk in the restricted level, it is prevented from switching through in the usual manner to seize a selected idle trunk.

It will be recalled that when the toll operator at the central office 61 seizes the connector 200, ground potential is forwarded over the conductor C43 and thus prevents operation of the control relay R370. Consequently, when the toll operator dials the single digit "8" to extend a connection via the trunks terminating in the second level of the connector, as noted above, the previously traced circuit, including the normal post contacts 391, is not completed due to the fact that the circuit is opened at the contacts 372. Consequently, the busy test relay R460 is controlled in conjunction with the trunk hunting relay R440 over the wipers 574 and 575 of the connector 200, in the same manner as has been described in connection with the normal trunk hunting facilities provided in the connector 200. In view of the foregoing it will be understood that the toll operator may obtain connections via the trunk lines terminating in the second level of the connector 200, but that subscriber lines attempting such connections will receive a busy tone signal to indicate that the connection cannot be completed.

If the capacity of the exchange system is such that it is not necessary to provide groups of trunks on each of the first four levels of the connector 200 accessible to the wipers 571 to 575, inclusive, and, for example, one of the levels is entirely vacant, a signal should be given to the calling subscriber or toll operator in the event the vacant level is inadvertently dialed. Accordingly, it will be assumed that the first level is vacant and that the normal post contacts 391 and 390 are provided and arranged to be closed when the wipers of the connector are raised to the first level in response to the dialing of the single digit "7." With this arrangement the connector is controlled, in the manner previously described, to first position the minor switch 560 in response to the first six impulses of the seven dialed, and the last impulse controls the vertical magnet 380 to raise the wipers 571 to 578, inclusive, opposite the first level of the associated bank contacts. Immediately thereafter the rotary magnet 382 is operated, in the manner previously described, to rotate the wipers into engagement with the first set of contacts in the selected level. As a result of the last-mentioned operation the control relay R540 is operated and a circuit is thus completed from the grounded conductor C481 by way of the contacts 545, the rotary off-normal contacts 569, the normal post contacts 390, the contacts 355', the normal post contacts 391, the contacts 544', the sixth contact of the minor switch 560 engaged by the wiper 564, the contacts 547 and the lower winding of the busy test relay R460, to battery. The busy test relay is thus locked in its operated position, in the manner previously described, and as soon as the trunk hunting relay R440 restores to normal the busy tone signal is transmitted to the calling subscriber or operator, as the case may be, indicating that the call cannot be completed. Thus, it will be understood that when any one or more of the trunk levels one, two, three or four, accessible to the wipers 571 to 575, inclusive, of the connector 200, is unequipped with trunk lines, the normal post contacts 390 and 391 will be closed on such trunk levels and a busy tone signal will be transmitted to indicate that the connection cannot be completed.

*Reverting calls*

The arrangement of the illustrated finder-connector link, comprising the finder 300 and the connector 200, is such that reverting call connections may be established between subscriber substations served by the same party line, by dialing the directory number. In considering this type of call, it may be assumed that a call is initiated by the subscriber at substation A1, which is to be extended to another subscriber served by the same party line conductors. It will also be assumed that the calling subscriber at substation A1 has removed his receiver and has dialed the four digits of the called subscriber directory number into the connector 200. In response to the dialing of the four digits of the called subscriber directory number the connector 200 is operated, in the same manner as has been described in the setting up of a connection from substation A1 to substation B1, and, consequently, the wipers of the connector are positioned into engagement with the bank contacts which terminate the negative conductor C31', the positive conductor C32' and the connector normal conductor C34' extending from the line circuit 20. These conductors are individual to the party line to which the substations A1 to A20 are connected and, consequently, when a call is initiated the line circuit 20 functions, in the manner described in the previously mentioned Lomax application, to apply ground potential to the conductor C34', thereby to mark the calling party line as busy in the banks of all the connectors having access thereto. When the wiper 574 of the connector 200 engages the ground potential indicative of the busy calling line, the ringing code of the called subscriber on the busy calling line is not transmitted and the busy test relay R460 is operated to transmit a busy tone signal to the calling subscriber at substation A1. Upon receiving the busy tone signal the calling subscriber at substation A1 restores his receiver upon the switchhook of his associated telephone instrument and thus interrupts the loop circuit extending from the calling line to the line relay R250 and causes the line circuit 20 to remove the busy marking ground potential from the conductor C34'.

When the relay R250 restores to normal, at its contacts 253, it interrupts a circuit for the lock-pulse relay R240 which also restores to normal. As soon as both the line relay R250 and the lock-pulse relay R240 are in their restored positions the multiple circuit, including the contacts 252 and 242, is interrupted, thereby to cause the release control relay R260 to slowly restore to normal. As soon as the relay R240 restores, it closes its contacts 241, thereby completing a circuit for operating the transfer control relay R230, which may be traced from ground by way of the contacts 473 and 241, the conductor C259, the contacts 317', 432 and 456, and the winding of the relay R230, to battery. Upon operating, the relay R230, at its contacts 233, extends ground to the calling line circuit 20 over a path which may be traced from ground by way of the contacts 463', 422', 356', 233 and 368, the resistor 393, the contacts 556, and the wiper 574 engaging the connector normal conductor C34' extending to the line circuit 20. As soon as ground potential is connected to the conductor C34', in the manner described above, the cut-off relay (not shown) in the line circuit 20 operates to clear the calling line of attachments and to further extend the ground potential by way of the conductor C33 and the wiper 314 of the finder 300 to the conductor C43, and the contacts 311'', 345 and 437, one branch of which now includes the contacts 222 and the lower winding of the hold relay R430, and the other branch of which includes the contacts 263 and 339 and the winding of the reverting call relay R340, to battery. As soon as the reverting call relay R340 operates, at its contacts 343 and 344, it completes a locking circuit for itself in multiple with the lower winding of the hold relay R430, which may be traced from ground by way of the contacts 343, 477, 344 and 437, one branch including the contacts 222 and the lower winding of the relay R430, and the other branch including the contacts 263 and 339 and the winding of the relay R340. Thus, these two relays are now retained in their operated positions while the called party is being signaled. As a further result of the operation of the relay R340, at its contacts 341, it prepares a point in a circuit, traced hereinafter, for transmitting a reverting call tone signal applied to the conductor C389 over the calling line in order to indicate to the subscriber who answers the reverting call that another subscriber on his line desires to converse with him and that he should not hang up if he does not get an immediate response. Also, at its contacts 342, the relay R340 interrupts a point in the ring-back tone circuit; at its contacts 347, it interrupts a point in the circuit for the operator relay R360; and, at its contacts 349, it completes a circuit for operating the last digit relay R410 and the circuit, including the contacts 348, for energizing the lower winding of the trunk switch-through relay R310. The last digit relay R410, upon operating, at its contacts 419, completes a multiple locking circuit for its upper winding including the grounded conductor C481, and the trunk switch-through relay R310, upon operating, at its contacts 312'', locks itself to the grounded conductor C43. As a further result of the operation of relay R310, at its contacts 313' and 315', it disconnects the line relay R250 from the conductors C41 and C42.

Incident to the operation of the last digit relay R410, at its contacts 413 and 416, it prepares the circuits whereby the selected code ringing signal is transmitted to the called subscriber. Particular attention, however, is called to the fact that the last digit relay R410, at its contacts 418, interrupts a point in the locking circuit for the upper winding of the busy test relay R460, which relay now restores to normal and, at its contacts 463 and 466, completes the above-mentioned circuits whereby the selected ringing code signal is transmitted to signal the desired called party.

When the called subscriber on the same party line with the calling subscriber at substation A1 answers the call, a direct current loop circuit is completed whereby the ring cutoff relay R520 and the ring cutoff slave relay R450 are operated in order to terminate the transmission of the ringing code signal. Incident to the operation of the ring cutoff slave relay R450, at its contacts 452, the reverting call tone signal applied to the conductor C389 is extended by way of the contacts 341, 452, 413 and 552, to the called subscriber in order to indicate to the answering party that the call is of the revertive type and that he should remain connected until the calling party on the same line returns to the connection. As a further result of the operation of relay R450, at its contacts 455', it completes a circuit from the reverting call pickup conductor C392 by way of the contacts 341' and 455' and the lower winding of the timing disconnect relay R470, to battery. The conductor C392 is periodically grounded so that the next time a ground pulse is applied thereto the relay R470 operates and immediately locks itself over a circuit including its upper winding, the contacts 471' and the grounded conductor C481. As a further result of the operation of the relay R470, at its contacts 477 and 478, it transfers the previously traced locking circuit for the reverting call relay R340 and the hold relay R430 from ground, at the contacts 343, to the grounded reverting call release conductor C494. Shortly after the reverting call release conductor C494 is connected, in the manner described above, ground potential is removed therefrom in order to interrupt the circuits for the reverting call relay R340 and the hold relay R430, which now restore to normal. Incident to the restoration of the hold relay R430, ground potential is removed from the conductor C481 thereby to cause the relays which are locked thereto to be restored to normal and, incident to the restoration of the reverting call relay R340, the direct ground potential applied, by way of the contacts 343, to the wiper 574 is removed therefrom, thus causing the restoration of the cutoff relay (not shown) in the line circuit 20 and the removal of ground potential from the conductor C43. When ground potential is removed from the conductor C43 the locking circuit for the trunk switch-through relay R310 is interrupted, thereby causing the latter relay to restore. Upon restoring, the trunk switch-through relay R310, at its contacts 314'', completes a circuit including the contacts 411', 432' and 453' and the minor switch off-normal contacts 565 for energizing the minor switch release magnet 562. The minor switch 550 now restores its wipers to normal, thereby to cause the minor switch off-normal contacts 565 to interrupt the circuit for the release magnet 562 and to cause the minor switch off-normal contacts 566 to interrupt the locking circuits for the vertical transfer relay R420 and the ring cutoff slave relay R450. These relays now restore to normal and the relay R450, at its contacts 454', now completes the previously traced circuit for operating the release magnet 490, whereupon the wipers of the connector 200 are restored to their normal vertical and rotary resting positions. Further release of the connector 200 and the finder 300 is exactly the same as has been described hereinbefore, and when the release is completed the finder 300 and the connector 200 may be utilized in extending additional connections. The calling subscriber at substation A1 and the called subscriber upon the same party line may now converse, and talking battery is supplied to the connection through the winding of the line relay (not shown) of the line circuit 20.

*Forced release and conversation timing*

The connector 200 is provided with timing relays which function to forcibly release the connector in the event (1) the subscriber fails to dial any digits after the connector has been seized, (2) the subscriber dials an incomplete directory number, (3) the called subscriber fails to answer the connection within a predetermined elapsed time interval and (4) the conversational connection between two subscribers is maintained for a predetermined elapsed time interval. Before discussing the detailed operation of the timing relays R470 and R510, it should be understood that when the connector 200 is seized the timing relays begin to function and further operation thereof depends upon whether the connector is seized by a regular subscriber or by the toll operator. More specifically, when the connector is seized by a regular subscriber over the conductors C40 to C43, inclusive, the line relay R250, the lock-pulse relay R240, the release control relay R260, the control relay R370 and the hold relay R430 are operated, in the manner previously described. However, when the toll operator seizes the connector, in the manner mentioned above, the control relay R370 is prevented from operating. As soon as the hold relay R430 operates it closes its contacts 433', thereby to prepare a circuit for the lower winding of the timing relay R510. At this point attention is directed to the fact that ground pulses are periodically applied to the timing conductor 50A by a timer (not shown) so that the next ground pulse applied to this conductor, after the contacts 433' are closed, is extended by way of the contacts 516, 433' and 472' and the lower winding of the timing relay R510, to battery, Upon operating, the relay R510, at its contacts 515, completes a locking circuit for its upper winding which includes the contacts 475, 364, 459 and 435, the conductor C256, and the contacts 232. Also, at its contacts 516 and 517, the relay R510 disconnects the conductor 50A from the circuit including its lower winding. Attention is directed to the fact that the above-traced locking circuit for the timing relay R510 includes the contacts 364 of the operator relay R360. Since the operator relay R360 is energized to open its contacts 364 after the third digit of a directory number and after the single digit of a trunk number on calls initiated by an operator, it will be understood that the timing relay R510 cannot be maintained in its locked position after the relay R360 is operated.

If a first digit is not dialed into the connector 200 within a predetermined elapsed time interval after it is seized, a ground pulse will be applied to the conductor 51B by the timer (not shown) and extended by way of the contacts 514 and 579 to the upper winding of the timing disconnect relay R470. Upon operating, the relay R470, at its contacts 479 and 471', simultaneously interrupts its initial energizing circuit and completes a locking circuit for its upper winding, including the grounded conductor C481. As a further result of the operation of relay R470, at its contacts 475 and 476, it transfers the locking circuit for the upper winding of the timing relay R510 from the grounded conductor C256 to the normally grounded conductor 52C extending to the timer (not shown). As a further result of the operation of relay R470, at its contacts 473, it removes ground potential from the circuit for maintaining the release control relay R260 in its operated position. Since the alternative circuit for the relay R260, including the contacts 252 or 242 and the contacts 474 and 512, is opened at the contacts 451' of the ring cutoff slave relay R450, the release control relay R260 now restores to normal and, at its contacts 261, it interrupts the circuit for applying ground potential to the conductor C43. Incident to the removal of ground potential from the conductor C43, the finder 300 and the connector 200 are restored to normal in the manner previously explained. More particularly, when ground is removed from the conductor C43 the holding circuit for the lower winding of the hold relay R430 is thus interrupted and the relay restores to normal. Incident to the restoration of the relay R430, at its contacts 438, it removes ground potential from the conductor C481, thereby interrupting the locking circuit for the upper winding of the timing disconnect relay R470 which now restores to normal, and this relay in turn, at its contacts 476, interrupts the locking circuit for the upper winding of the timing relay R510 which also restores to normal.

With the above-mentioned timing arrangement, it will be understood that a calling subscriber is prevented from monopolizing the finder 300 and the connector 200 for any extended period of time, in the event he fails to dial the digits of a called subscriber number. In view of the fact that the transfer control relay R230 removes ground potential from the conductor C256 during each digit dialed into the connector 200, the locking circuit for the relay R510 is interrupted and the relay restores. The ground pulse transmitted over the conductor 50*a* causes the relay R510 to reoperate between successive digits dialed into the connector 200. From the foregoing it will be understood that the timing relays will be restored to normal to initiate a new timing interval at the beginning of each inter-digital pause. Consequently, if there is an unnecessary delay between the dialing of any successive digit of a directory number, the finder 300 and the connector 200 will be automatically restored to normal under control of the timing relays R470 and R510, as explained.

When a regular subscriber seizes the connector 200 the above-mentioned timing operation is performed prior to the dialing of each of the four digits of a called subscriber directory number. However, when the operator controls the connection the timing operation takes place prior to the dialing of the first, second and third digits and then is disabled due to the operation of the operator relay R360. More specifically, when a toll operator has dialed the third digit of a called subscriber directory number, the control relay R540 operates, in the manner previously described, and thereby completes a circuit, at its contacts 543, for operating the relay R360. In response to its operation, the relay R360, at its contacts 364, interrupts a point in the previously traced locking circuit for the upper winding of the timing relay R510. Inasmuch as its locking circuit is now interrupted the timing relay R510 will momentarily operate each time a ground pulse is applied to the conductor 50A, but the timing disconnect relay R470 is now prevented from operating to forcibly release the connector 200.

After the final digit of a called subscriber number is dialed by a regular subscriber, the cycle of operation of the timing relays R470 and R510 is again initiated. Ringing code is now transmitted to the called subscriber line, in the manner previously described, and in the event the called subscriber fails to answer the call within a predetermined elapsed time interval the relay R470, upon operating, will again actuate its contacts 473 and 474, thereby to cause the removal of ground potential from the energizing circuit for the release control relay R260. Consequently, the ground potential is removed from the conductor C43 thereby to cause the forcible release of the connection, in the manner previously described.

If the called subscriber answers the call before the relay R470 has been operated, the ring cutoff slave relay R450 operates, in the manner previously described, and, at its contacts 459, interrupts the locking circuit for the timing relay R510 which now restores to normal to initiate the cycle of operation of the conversation timing. The next time the ground pulse is applied to the conductor 50A the relay R510 operates and, at its contacts 517, transfers its initial energizing circuit from the conductor 50A to a circuit which includes the contacts 455 of the ring cutoff slave relay R450, the contacts 432 and 317', the conductor C259, the contacts 241 and ground at the contacts 473. As a further result of the operation of relay R510, at its contacts 512, it prepares a point in a circuit, traced hereinafter, for maintaining the release control relay R260 in its operated position after the timing disconnect relay R470 operates. Subsequently the ground pulse applied to the conductor 51B is extended by way of the contacts 514 and 479 to the upper winding of the relay R470. Upon operating, the relay R470, at its contacts 471', locks itself to the grounded conductor C481 and, at its contacts 473 and 474, it transfers the circuit for the relay R260 from ground at the contacts 473 to ground at the contacts 232. Thus, the circuit for the release control relay R260 is now traced from ground by way of the contacts 232, the conductor C256, the contacts 435, 451', 512, 474 and 252, and the winding of the release control relay R260, to battery. As a further result of the operation of the relay R470, at its contacts 472' and 473', it interrupts the above-traced locking circuit for the lower winding of the relay R510 which now restores to normal. The relay R510, upon restoring, at its contacts 511 and 512, transfers the holding circuit for the release control relay R260 from ground at the contacts 232 to the grounded conductor 53C extending to the timer (not shown). As a further result of the operation of relay R470, at its contacts 472, it prepares a point in a circuit for transmitting a warning tone signal to the called and calling subscribers involved in the connection, and finally, at its contacts 474', it completes a circuit from the conductor 54C to the pickup relay R530. After the timer (not shown) has operated for a predetermined elapsed time after the called subscriber has answered the call, a ground pulse is applied by way of the conductor 54C, the contacts 518, 474' and 412', and the winding of the relay R530, to battery. Upon operating, the pickup relay R530, at its contacts 533, completes the above-mentioned warning tone signal to the subscribers in order to indicate that the connection will be forcibly released shortly thereafter. This circuit extends from the dial tone conductor C482 by way of the contacts 472 and 533, the tone condenser 581 and the contacts 342, one branch extending therefrom by way of the contacts 452, 413 and 552 and the wiper 572 to the called subscriber, and the other branch extending, by way of the contacts 331 and 321, the condenser 385 and the contacts 313', to the calling subscriber. If the calling subscriber has failed to release the connection at this time, ground potential is removed from the conductor 53C by the timer, thereby to interrupt the holding circuit for the release control relay R260. The release control relay R260 now restores to normal and, at its contacts 261, interrupts the circuit for the control relay R370 and thus removes the holding ground potential from the conductor C43. The finder-connector link, comprising the finder 300 and the connector 200 is accordingly forcibly restored to normal, in the manner previously described.

*Seizure of the connector 200 and release thereof by a calling subscriber prior to the dialing of any digits*

After the connector 200 is seized the relays R240, R250, R260, R370 and R430 are in their operated positions. If the calling subscriber now hangs up without dialing any digits, and prior to the forcible release of the connector 200 in the manner previously described, the line relay R250 restores to normal. Incident to the restoration of the relay R250, the lock-pulse relay R240 restores to normal. The lock-pulse relay R240, upon restoring, at its contacts 241, completes a circuit from ground by way of the contacts 473 and 241, the impulsing conductor C259, the contacts 317', 432, 456 and 423, and the winding of the minor switch stepping magnet 561, to battery. The magnet now operates and advances the wipers 563 and 564 into engagement with the first set of contacts in the associated contact banks. Also, incident to the advancement of the wipers 563 and 564 from their off-normal positions, the minor switch off-normal contacts 565 and 566 are closed, the former to prepare a circuit for the minor switch release magnet 562 and the latter to prepare a point in the circuit for energizing the lower winding of the vertical transfer relay R420 in multiple with the lower winding of the ring cutoff slave relay R450. In addition to the foregoing circuit for the minor switch magnet 561, a multiple circuit is also completed for operating the transfer control relay R230, whereupon the last-mentioned relay operates and, at its contacts 232, removes ground potential from the conductor C256. Inasmuch as both the line relay R250 and the lock-pulse relay R240 are now in their restored positions, the circuit for the release control relay R260 is opened to cause its restoration. Incident to the restoration of the relay R260, at its contacts 261, it interrupts the circuit for the control relay R370, thereby to remove ground potential from the conductor C43. As soon as the ground potential is removed from the conductor C43 the previously described circuit for the lower winding of the hold relay R430 is interrupted and this relay now restores to normal. Upon restoring, the relay R430, at its contacts 432, interrupts the previously traced multiple circuit for the minor switch stepping magnet 561 and the transfer control relay R230, thereby to cause the magnet 561 and the relay R230 to restore to normal. As a further result of the restoration of the hold relay R430, the contacts 439 are closed to prepare a point in the circuit for the lower winding of the relay R450. Attention is directed to the fact that the contacts 439 are so adjusted that they are last to open when the relay R430 operates, and are the first to be closed when the relay restores. Consequently, when the transfer control relay R230 applies ground potential to the conductor C256, a circuit is completed by way of the contacts 211 and 429 and the minor switch off-normal contacts 566, one branch of which includes the lower winding of the relay R420, and battery, and the other branch of which includes the contacts 439 and the lower winding of the relay R450 and battery. The relays R420 and R450 are immediately operated, and the former relay, at its contacts 428, completes a locking circuit for itself and for the relay R450 which is independent of the circuit including the grounded conductor C256. Incident to the operation of relay R450, at its contacts 452', it completes a locking circuit for its lower winding which is in multiple with the contacts 439 and, at its contacts 453', it completes a circuit for the minor switch release magnet 562. This circuit may be traced from ground by way of the contacts 314'', 411', 432' and 453', the minor switch off-normal contacts 565 and the winding of the minor switch release magnet 562, to battery. Upon operating, the magnet 562 causes the wipers 563 and 564 of the minor switch to be restored to their normal positions, whereupon the minor switch off-normal contacts 565 and 566 are opened, in the manner previously explained. The minor switch off-normal contacts 565, upon opening, interrupt the energizing circuit for the magnet 562 which now restores to normal, and the minor switch off-normal contacts 566 interrupt the previously traced locking circuit for the lower windings of the relays R420 and R450, thereby to cause these relays now to restore to normal. In this manner it will be seen that, upon release of the connector 200 prior to the dialing of any digits, or even after the dialing of a single digit, the ring cutoff slave relay R450 is operated in order to provide a circuit whereby the minor switch 560 is restored to normal, and the restoration of the minor switch controls the final release of the remaining operated relays R420 and R450 in the connector 200.

While one embodiment of the invention has been disclosed, it will be understood that various modifications may be made therein which are within the true spirit and scope of the invention.

What is claimed is:

1. In a telephone system, first and second class calling lines, a called party line, a connector having access to said called party line and including signal selecting means for selecting different signals which are utilized to selectively signal different subscribers on said party line, means controlled over either one of said calling lines for operating said connector to select said called party line and for thereafter operating said signal selecting means to select the signal of the particular called subscriber on said party line, class test means for determining the class of said one calling line, busy test means for determining the busy or idle condition of said called party line, and means governed jointly by said class test means and said busy test means and controlled in the event said called party line is busy for transmitting a busy signal to said calling line prior to the operation of said signal selecting means or after the operation of said signal selecting means, depending upon the class of said calling line.

2. In a telephone system, calling lines of different classes, a called party line, a connector having access to said party line and including signal selecting means for selectively signaling different subscribers on said party line, means controlled over either one of said calling lines for operating said connector to select said called party line, class test means for determining the class of said one calling line, busy test means for determining the busy or idle condition of said called party line, means governed jointly by said class test means and said busy test means and thereafter controlled in the event said called party line is busy and said call originated on a calling line of one class for transmitting a busy tone signal, and means for rendering said last-mentioned means ineffective to transmit said busy signal until said signal selecting means has been operated in the event said call originated on a calling line of another class.

3. In a telephone system, a calling operator position, a calling line, a called line, means including switching apparatus for extending a connection either from said operator position to said called line or from said calling line to said called line in response to the dialing of a plurality of digits, means in said switching apparatus operated in response to the dialing of the last digit of the called subscriber number for transmitting a busy tone signal to the subscriber on said calling line in the event said called line is busy, and means in said switching apparatus controlled in the event said connection is extended from said operator position for transmitting a busy tone signal to said operator position at the end of the penultimate digit of the called subscriber number in the event the said called line is busy.

4. In a telephone system, a calling operator position, a calling line, a called line, means including switching apparatus for extending a connection either from said operator position to said called line or from said calling line to said called line in response to the dialing of a plurality of digits, means in said switching apparatus operated in response to the dialing of the last digit of the called subscriber number for transmitting a busy tone signal to the subscriber on said calling line in the event the called line is busy, means in said switching apparatus controlled in the event said connection is extended from said operator position for transmitting a busy tone signal to said operator position at the end of the penultimate digit of the called subscriber number in the event the said called line is busy, and means responsive to the dialing of the last digit of the called subscriber directory number and a suffix digit for establishing a monitoring connection between said operator position and said busy called line.

5. In a telephone system, a calling operator position, a calling line, a called line, means including a switching apparatus for extending a connection either from said operator position to said called line or from said calling line to said called line in response to the dialing of a plurality of digits, means in said switching apparatus operated in response to the dialing of the last digit of the called subscriber number for transmitting a busy tone signal to the subscriber on said calling line in the event the called line is busy, means in said switching apparatus controlled in the event said connection is extended from said operator position for transmitting a busy tone signal to said operator position at the end of the penultimate digit of the called subscriber number in the event the said called line is busy, means responsive to the dialing of the last digit of the called subscriber directory number and a suffix digit for establishing a monitoring connection between said operator position and said busy called line, and means in said switching apparatus controlled from said busy called line when the same becomes idle for automatically signaling the subscriber on said called line.

6. In a telephone system, a calling operator position, a calling line, a called line, means including a switching apparatus for extending a connection either from said operator position to said called line or from said calling line to said called line in response to the dialing of a plurality of digits, means in said switching apparatus operated in response to the dialing of the last digit of the called subscriber number for transmitting a busy tone signal to the subscriber on said calling line in the event the called line is busy, means in said switching apparatus controlled in the event said connection is extended from said operator position for transmitting a busy tone signal to said operator position at the end of the penultimate digit of the called subscriber number in the event the said called line is busy, means responsive to the dialing of the last digit of the called subscriber directory number and a suffix digit for establishing a monitoring connection between said operator position and said busy called line, means in said switching apparatus controlled from said busy called line when the same becomes idle for automatically transmitting a ringing signal over said called line, an answer relay, and means operated over said called line when the called subscriber thereon answers for terminating the transmission of said ringing signal and for operating said answer relay to transmit an answering supervisory signal to said operator position.

7. In a telephone system, a calling operator position, a called line, means including a switching mechanism for extending a connection from said operator position to said switching mechanism, means responsive to the dialing of a portion of a called subscriber directory number for extending a connection from said switching mechanism to said called line and for marking the same busy, means in said switching mechanism operated in response to the dialing of the remaining portion of said directory number for signaling the subscriber on said called line, and means in said switching mechanism operated in the event a subscriber on said called line removes his receiver prior to the dialing of said remaining portion of said directory number for signaling said operator position and for preventing said last mentioned means from responding to the remaining portion of said directory number.

8. In a telephone system, a calling operator position, a called party line, means including a switching mechanism for extending a connection from said operator position to said switching mechanism, means responsive to the dialing of a portion of a called subscriber directory number for extending a connection from said switching mechanism to said called party line and for marking the same busy, means in said switching mechanism operated in the event any subscriber on said called party line removes his receiver for signaling said operator position whereby a talking connection may be established between said operator position and said subscriber, and means in said switching mechanism thereafter controlled from said operator position in response to the dialing of the remaining portion of said directory number for transmitting a ringing signal to the desired subscriber on said called line.

9. In a telephone system, a calling operator position, a called party line, means including a switching mechanism for extending a connection from said operator position to said switching mechanism, means responsive to the dialing of a portion of a called subscriber directory number for extending a connection from said switching mechanism to said called party line and for marking the same busy, means in said switching mechanism operated in the event any subscriber on said called party line removes his receiver for signaling said operator position whereby a talking connection may be established between said operator position and said subscriber, means in said switching mechanism thereafter controlled from said operator position in response to the dialing of the remaining portion of said directory number for transmitting a ringing signal to the desired subscriber on said called party line, and means controlled by said operator signaling means for preventing said last-mentioned means from being operative until the subscriber on said called line has replaced his receiver.

10. In a telephone system, an operator position, a called party line, means including a switching mechanism for extending a connection from said operator position to said switching mechanism, means in said switching mechanism controlled from said operator position in response to the dialing of a portion of the directory number of a called subscriber on said party line for extending said connection from said operator position to said called party line and for marking said called line busy, means in said switching mechanism operated in the event any subscriber on said called party line removes his receiver for signaling the operator at said position and for preventing said switching mechanism from responding to the remaining portion of the directory number of the desired called subscriber, a ringing current selecting switch, and means controlled from said operator position after the subscriber on said called party line has replaced his receiver for operating said ringing selecting switch to transmit the ringing current of the desired called subscriber on said called party line.

11. In a telephone system, an operator position, a called party line, means including a switching mechanism for extending a connection from said operator position to said switching mechanism, means in said switching mechanism controlled from said operator position in response to the dialing of a portion of the directory number of a called subscriber on said party line for extending said connection from said operator position to said called party line and for marking said called line busy, answering means in said switching mechanism operated in the event any subscriber on said called party line removes his receiver for signaling the operator at said position and for preventing said switching mechanism from responding to the remaining portion of the directory number of the desired called subscriber, a ringing current selecting switch, means controlled from said operator position after the subscriber on said called party line has replaced his receiver for operating said ringing selecting switch to transmit the ringing current of the desired called subscriber on said called party line, and means thereafter controlled over said called party line for terminating the transmission of said ringing current and for reoperating said answering means to signal the operator at said position to indicate that the desired called subscriber has answered.

12. In an automatic switch, an incoming channel, an outgoing channel, a line relay normally connected to and adapted to be operated over said incoming channel, an answer relay normally disconnected from and adapted to be operated over said outgoing channel, a tone signal source, means controlled responsive to the operation of said line relay for transmitting a tone signal from said source to said incoming channel via said answer relay, means including said line relay thereafter controlled over said incoming channel for terminating the transmission of said tone signal and for operating said switch and for connecting said answer relay to said outgoing channel, and means including said outgoing channel for operating said answer relay to complete a connection between said channels.

13. In a telephone system, a calling line, a called line, an automatic switch, a line relay, means responsive to the initiation of a call on said calling line for operating said line relay to seize said switch, an answer relay adapted to be controlled over said called line, a dial tone source, means controlled responsive to the operation of said line relay for transmitting a dial tone signal from said source to said calling line via a winding of said answer relay to indicate to the subscriber on said calling line that said switch has been seized, means including said line relay for thereafter controlling said switch to extend a connection from said switch to said called line, a ringing source, means for transmitting a ringing signal from said source to said called line, and means controlled by the subscriber on said called line for terminating the transmission of said ringing signal and for operating said answer relay to complete a connection from said calling line to said called line.

14. In a telephone system, a calling line, a called line, means including a switch adapted to be operated to establish a connection between said lines, an answer relay in said switch, means in said switch operated responsive to the seizure thereof over said calling line for transmitting a dial tone signal over a circuit including the winding of said answer relay and said calling line, means in said switch thereafter controllable over said calling line for terminating the transmission of said dial tone signal and for operating said switch to extend a connection from said switch to said called line, and means in said switch controlled over said called line for operating said answer relay to establish said connection between said calling and called lines.

15. In a telephone system, a calling line, a called line, means including a switch adapted to be operated to establish a connection between said lines, an answer relay in said switch, means in said switch operated responsive to the seizure thereof over said calling line for transmitting a dial tone signal over a circuit including the winding of said answer relay and said calling line, means in said switch thereafter controllable over said calling line for terminating the transmission of said dial tone signal and for operating said switch to extend a connection from said switch to said called subscriber line, means in said switch controlled over said called line for operating said answer relay to establish said connection between said calling and called lines, and means responsive to the operation of said answer relay for transmitting an answer supervisory signal over said calling line.

16. In an automatic switch, an incoming channel, an outgoing channel, a first relay adapted to be operated over said incoming channel, a second relay adapted to be operated over said outgoing channel, a first tone signal source, means including said incoming channel for operating said first relay, means responsive to the operation of said first relay for transmitting a tone signal from said first source to said incoming channel via said second relay, means including said first relay thereafter controlled over said incoming channel for terminating the transmission of said tone signal and for operating said switch to select said outgoing channel, a second tone signal source, means controlled in the event said outgoing channel is busy for transmitting a tone signal from said second source to said incoming channel via said second relay, and means controlled over said outgoing channel in the event the same is idle for disabling said last named means, and means controlled over said outgoing channel for operating said second relay to complete a connection between said channels.

17. In a switch, an incoming path, an outgoing path, a dial tone signal source, a busy tone signal source, an answer relay adapted to be operated over said outgoing path, means operated responsive to the seizure of said connector over said incoming path, means controlled responsive to the operation of said seizure means for transmitting a signal from said dial tone source to said incoming path over a circuit including a winding of said answer relay, means in said connector thereafter controlled over said incoming path for terminating the transmission of said dial tone signal and for extending a connection over said outgoing path, means operated in the event a busy condition is encountered over said outgoing path for transmitting a signal from said busy tone source to said incoming path over a circuit including the said winding of said answer relay, means operated in the event an idle condition is encountered over said outgoing path for transmitting a ringing signal thereover, and means thereafter controlled over said outgoing path for terminating the transmission of said ringing signal and for operating said answer relay to interconnect said incoming and outgoing paths.

18. In a telephone system, a calling line, a called line, an operator position, a connector, means for operating said connector to extend a connection from said calling line or from said operator position to said called line, means in said connector operated in the event said called line is busy when a connection is extended thereto from said calling line for transmitting a busy tone signal to said calling line thereby to give the subscriber thereon an audible busy signal, and means in said connector operated in the event said called line is busy when a connection is extended thereto from said operator position for transmitting a busy tone signal and a flashing signal to said operator position thereby to give the operator thereat an audible and a visual busy signal.

19. In a telephone system, a calling line, a called line, an operator position, a connector controlled from said calling line or from said operator position to extend a connection to said called line, an answer relay in said connector adapted to be operated when the subscriber on said called line answers, a circuit including a winding of said answer relay for transmitting a busy tone signal to the subscriber on said calling line or to said operator position in the event said called line is busy, and means in said connector operated only in the event the call has been extended from said operator position for transmitting a flashing signal in the event said called line is busy, whereby said calling subscriber receives an audible busy tone signal and said operator receives an audible busy tone signal and a visual flashing signal in the event said called line is busy.

20. In a telephone system, a calling line, an operator position, a connector, a called line, a group of trunk lines, means in said connector controlled either from said calling line or from said operator position for extending a connection either to said called line or to an idle trunk line in said group, means in said connector operated in the event said called line is busy or in the event all of the trunks in said group are busy for transmitting an audible busy tone signal to said calling line or to said operator position, and means in said connector also operated in the event the connection originated at said operator position for transmitting a flashing signal to said operator position in the event said called line is busy and for transmitting a different flashing signal in the event all of the trunk lines in said group are busy.

21. In a connector having access to multiparty lines arranged for selective signaling, means for selecting one of said lines, means including a busy test relay for testing the busy condition of said selected line, selective signaling means thereafter operated to select a signal for transmission over said selected line, means governed by said busy test relay and operated responsive to the operation of said selective signaling means for transmitting a busy tone signal in the event a busy condition is encountered on said selected line, means including said selective signaling means for selectively controlling said busy test relay in the event an idle condition is encountered on said selected line, and additional means governed by said busy test relay for transmitting the selected signal over a particular one of the conductors of said selected line.

22. In a connector having access to multiparty lines arranged for selective signaling, means for selecting one of said lines, means including a busy test relay for testing the busy or idle condition of said selected line, a signal selecting switch thereafter operated to any one of a plurality of positions to select a signal individual to a particular one of the subscribers on said selected line, means governed by said busy test relay and operated responsive to the operation of said signal selecting switch for transmitting a busy tone signal in the event a busy condition is encountered on said selected line, means including said signal selecting switch for selectively controlling said busy test relay in the event an idle condition is encountered on said selected line, and additional means governed by said busy test relay for transmitting the selected signal over either the negative or the positive conductor of said selected line, depending upon the operated position of said signal selecting switch.

23. In a connector, a plurality of groups of trunks, impulse-controlled means operative to different settings, primary selecting means operative to different settings respectively to select said groups of trunk lines, secondary selecting means operative to different settings respectively to select the individual trunks in a selected one of said groups of trunks, means responsive to a predetermined digit transmitted to said connector for imparting a predetermined setting to said predetermined portion of the impulses of said digit, means responsive to the operation of said impulse-controlled means to said predetermined setting for directing the remaining impulses of said predetermined digit to said primary selecting means to select a particular one of said groups of trunks, a rotary interrupter relay, and means for controlling said relay while said primary selecting means is selecting said one group of trunks to thereafter initiate the operation of said secondary selecting means to select the first trunk in said one selected group of trunks.

24. In a connector, a plurality of groups of trunks, impulse-controlled means operative to different settings, primary selecting means operative to different settings respectively to select said groups of trunk lines, secondary selecting means operative to different settings respectively to select the individual trunks in a selected one of said groups of trunks, means responsive to a predetermined digit transmitted to said connector for imparting a predetermined setting to said impulse-controlled means in accordance with a predetermined portion of the impulses of said digit, means responsive to the operation of said impulse-controlled means to said predetermined setting for directing the remaining impulses of said predetermined digit to said primary selecting means to select a particular one of said groups of trunks, a rotary interrupter relay, means for controlling said relay while said primary selecting means is selecting said one group of trunks to thereafter initiate the operation of said secondary selecting means to select the first trunk in said one selected group of trunks, and means controlled each time a busy trunk is encountered in said one selected group of trunks for controlling said interrupter relay to reoperate said secondary selecting means to select another trunk in said one selected group of trunks.

IMRE MOLNAR.

REFERENCES CITED

The following references are of record in the file of this patent:

UNITED STATES PATENTS

| Number | Name | Date |
|---|---|---|
| 1,497,423 | Willis | June 10, 1924 |
| 1,577,083 | Sperry | Mar. 16, 1926 |
| 1,688,656 | Ray | Oct. 23, 1928 |
| 1,763,157 | King | June 10, 1930 |
| 1,970,337 | Pope | Aug. 14, 1934 |
| 2,377,453 | Rhoads | June 5, 1945 |

Certificate of Correction

Patent No. 2,524,131 October 3, 1950

IMRE MOLNAR

It is hereby certified that error appears in the printed specification of the above numbered patent requiring correction as follows:

Column 73, line 52, before "predetermined" insert the words *impulse-controlled means in accordance with a*;

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*